(12) United States Patent
Okajima et al.

(10) Patent No.: US 7,881,250 B2
(45) Date of Patent: Feb. 1, 2011

(54) PACKET COMMUNICATION SYSTEM

(75) Inventors: Ichiro Okajima, Kanagawa (JP); Takehiro Ikeda, Nara (JP); Takuya Shinozaki, Kanagawa (JP); Koji Omae, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 1577 days.

(21) Appl. No.: 10/466,518

(22) PCT Filed: Jan. 18, 2002

(86) PCT No.: PCT/JP02/00350

§ 371 (c)(1),
(2), (4) Date: Jan. 1, 2004

(87) PCT Pub. No.: WO02/058342

PCT Pub. Date: Jul. 25, 2002

(65) Prior Publication Data

US 2004/0114554 A1   Jun. 17, 2004

(30) Foreign Application Priority Data

Jan. 18, 2001   (JP) .............................. 2001-010585

(51) Int. Cl.
*H04W 4/00* (2009.01)
(52) U.S. Cl. .................. 370/328; 370/338; 370/389
(58) Field of Classification Search .................. 370/338, 370/328, 332, 389; 455/435.1, 436, 438
See application file for complete search history.

(56) References Cited

U.S. PATENT DOCUMENTS

| 6,519,461 | B1 * | 2/2003 | Andersson et al. .......... 455/453 |
| 7,173,651 | B1 * | 2/2007 | Knowles .................. 348/207.1 |
| 7,333,451 | B1 * | 2/2008 | Khalil et al. ................ 370/331 |
| 2003/0096611 | A1 * | 5/2003 | Cooper ....................... 455/434 |

(Continued)

FOREIGN PATENT DOCUMENTS

WO   WO 99/31855   6/1999

OTHER PUBLICATIONS

Perkins, IP Mobility Support; RFC 2002;Network Working Group ; Oct. 1996.*

(Continued)

*Primary Examiner*—Donald L Mills
*Assistant Examiner*—Henry Baron
(74) *Attorney, Agent, or Firm*—Oblon, Spivak, McClelland, Maier & Neustadt, L.L.P.

(57) ABSTRACT

The present invention provides a packet communication system including a mobile host, a home agent, a correspondent host, and a mobility agent, where the mobility agent operates in such a way that when the mobile host is in an active mode and has no need for buffering packets, the mobility agent forwards packets received from the home agent or the correspondent host to the mobile host; and alternatively, in the case when the mobile host is in an active mode, but requires buffering of packets, the mobility agent buffers the packets, and further in the case when the mobile host is in an idle mode, the mobility agent buffers the packet and notifies the mobile host of arrival of the packet, in order to prevent the loss of a packet addressed to a mobile host thus decreasing the traffic and the transmission frequency of Binding Update packets.

21 Claims, 64 Drawing Sheets

U.S. PATENT DOCUMENTS

2004/0106431 A1* 6/2004 Laroia et al. ............. 455/552.1

OTHER PUBLICATIONS

The Evolution of Packet Switching; Dr. Lawrence G. Roberts; Member, IEEE; Invited Paper; Nov. 1978.*
McPherson, Internet Routing Architecture, Chapter 4, pp. 93-95.*
Das, et al. Implementation and Performance Evaluation of TeleMIP, Communications, 2001. ICC 2001. IEEE International Conference vol. 8, pp. 2488-2493 vol. 8.*
David B. Johnson et al.: "Mobility support in IPv6" Internet-Draft, draft-ietf-mobile-ipv6-14.txt, IETF Mobile IP Working Group Jul. 2, 2000, Section. 5.1, 5.2 (with partial English translation).
Naoki Imai et al.: "overlay network ni okeru proactive data tenso" Kenkyu Hokoku, vol. 2000, No. 14, p. 91, 2000-MBL-12-14. Information Processing Society of Japan Feb. 4, 2000, (CS-NG-2001-00324-011), Paragraph No. 3.1 (parial English translation).
Hiroaki Hagino et al.: "Idotal keisan kankyo ni okeru renzoku media haiso no tame no tsushin hoshiki" Transactions of Information Processing Society of Japan, vol. 41, No. 2, p. 363 Information Processing Society of Japan, Feb. 15, 2000 (CS-NG-2001-00141-011), Paragraph No. 3, figs. 1,2 (partial English translation).
Ichiro Okajima et al.: "Ido suru network o support sunitame no mobile Ipv6 no kakucho" The Institute of Electronics, Information and Communication Engineers, Gijutsu Kenkyu Hokoku, vol. 101, No. 62, p. 105, IN2001-15, May 11, 2001 (partial English translation).
Takuya Shinozaki et al.: "Ido tsushin o koryo shita mobile Ipv6 no kakucho" 2001nen The Institute of Electronics, Information and Communication Engineers Sogo Taikai Koen Ronbunshu, Tsushin 1, p. 584, B-5-186, Mar. 7, 2001 (with English translation).
Govind Krishnamurthi, et al., "Buffer Management for Smooth HandOvers in Mobile IPv6; draft-krishnamurthi-mobileip-buffer6-00.txt", IETF Standard-Working-Draft, Internet Engineering Task Force, XP015031213, Jul. 13, 2000, 26 Pages.
Mohamed Khalil, et al., "Buffer Management for Mobile IP", Internet Engineering Task Force Internet Draft, XP002962377, Oct. 16, 1999, pp. 1-20.
William Woo, et al., "Handoff Enhancement in Mobile-IP Environment", Universal Personal Communications, vol. 2, XP010198524, Sep. 29, 1996, pp. 760-764.
C. Perkins, et al., "IP Mobility Support ;draft-ietf-mobileip-protocol-15.txt" IETF Standard-Working-Draft, Internet Engineering Task Force, vol. rnobileip, No. 15, XP015023457, Feb. 9, 1996, 84 Pages (Submitting Working Draft of reference previously cited by the Examiner on Apr. 19, 2007.

* cited by examiner

SUBNET-PREFIXES·PAGING·REQUEST·PACKET

SUBNET-PREFIXES·PAGING·NOTIFICATION·PACKET

PACKET COMMUNICATION SYSTEM

TECHNICAL FIELD OF THE INVENTION

The present invention relates to packet communication systems capable of transmitting packets to mobile nodes.

RELATED BACKGROUND ARTS

A configuration of a conventional packet communication system will be described. The configuration of the packet communication system is shown in FIG. 1. As shown in FIG. 1, the conventional packet system comprises a router R, a home agent HR, an access router AR, a Mobile Host MH, and a Correspondent Host CH and they are connected among them.

The packet communication system is comprised of nodes and links. The nodes are devices for sending and receiving packets according to TCP/IP. The links are communication paths for transmitting packets from a node to another node by wire transmission or wireless transmission. How to determine the numbers of links and nodes and the connection layout thereof is optional, and requirements are only that each node is directly or indirectly connected to all the other nodes by at least one link. This connection layout is called a network, which is depicted as a cloudlike illustration in FIG. 1. The links and nodes are identified by their respective addresses (addresses defined by IPv6) An address is comprised of a Subnet-prefix and a node identifier, wherein the Subnet-prefix identifies a link to which a node is connected and wherein the node identifier identifies a node connected to a link.

Each node is classified under a router, an access router, a home agent, a mobile host, and a correspondent host. The router is a node for forwarding a packet whose destination address is different from its own address, to another appropriate node. The access router is a router for providing a link to which the mobile host can obtain access. The home agent is a router that can forward a packet directed to the mobile host, to a link at which the mobile host is located. The routers, access routers, and home agent regularly exchange information indicating connection relations of links with the routers, access routers, and home agent necessary for routing processing, by a routing protocol such as OSPF (Open Shortest Path First) or BGP (Border Gateway Protocol). The mobile host is a node that implements communications with the correspondent host while moving from link to link. The correspondent host is a node that implements communications with the mobile host.

Each link is classified under a home link and a foreign link. The home link is a link to which the mobile host belongs, and the foreign link is a link except for the home link. When there exist a plurality of mobile hosts, the home and foreign links are defined for every mobile host. The mobile host is assigned a home address by the home link and a c/o (care of) address by the foreign link. The home address is an address used when the mobile host is present at the home link and at the foreign links. The c/o address is an address used when the mobile host is present at the foreign links. This c/o address is a forwarding destination address of a packet directed to the home address.

The operation of the conventional packet communication system will be described. After the mobile host has moved from its home link to a foreign link, it acquires a c/o address used at the foreign link and then sends a packet including a Binding Update option, to the home agent. In the description hereinafter, this packet will be called simply a Binding Update packet. The Binding Update packet includes the home address and the c/o address of the mobile host, and a correspondence between the home address and the c/o address will be called binding. When receiving the Binding Update packet from the mobile host, the home agent stores the binding and sends a packet including a Binding Acknowledgement option as an acknowledgement response to the mobile host. In the description hereinafter, this packet will be called simply a Binding Acknowledgement packet. When receiving the Binding Acknowledgement packet from the home agent, the mobile host recognizes the storage of the binding at the home agent.

When the correspondent host sends a packet directed to the home address of the mobile host, the packet is routed from the correspondent host to the home link by the routers in the network. When the destination of the packet is the home address of the binding, the home agent receives the packet instead of the mobile host, generates a packet a destination of which is the c/o address of the binding, puts the received packet in a payload of the generated packet, and forwards the packet. The method of putting a certain packet into a payload of another packet and forwarding the packet is called tunneling and such a packet is called a tunneling packet. This tunneling packet is routed from the home agent to the mobile host by the routers in the network. The mobile host receives the tunneling packet and takes the packet out of the payload of the tunneling packet, thus finally receiving the packet the destination of which is its own home address.

The mobile host receiving the tunneling packet may send a Binding Update packet to the correspondent host. Receiving the Binding Update packet, the correspondent host stores the binding. When the correspondent host sends a packet whose destination is the home address indicated by the stored binding, it sets the c/o address to the destination of the packet and sends the packet provided with a routing header option in which the home address of the binding is set. When receiving the packet with the routing header option, the mobile host replaces the c/o address of the destination with the home address, thereby receiving the packet the destination of which is the home address, at last.

After that, every time the mobile host moves to another foreign link and acquires a new c/o address, it notifies the home agent and the correspondent host of new binding by a Binding Update packet. Through this operation of the mobile host, the packet sent from the correspondent host is forwarded via the home agent or directly from the correspondent host to the mobile host located at a foreign link.

The foregoing packet communication system of the prior art, however, has the problem that there occurs a packet loss where the mobile host moves quickly between foreign links far off from the home link or the correspondent host. When the mobile host moves to a foreign link far off from the home link or the correspondent host, the number of passing nodes and links during transmission of a packet, i.e., the number of hops increases. Since the increase in the number of hops between the home link or the correspondent host and the foreign link results in increasing a packet transmission delay, the time becomes longer for the transmission of the Binding Update packet from the mobile host to the home agent or the correspondent host.

The quick movement of the mobile host between foreign links results in shortening stay periods at the respective links, because the mobile host stays at each foreign link for a shorter time. If a stay period is shorter than the transmission period, there will occur a phenomenon in which the mobile host has already moved to another foreign link at the time of arrival of the Binding Update packet at the home agent or the correspondent host. In this case, a packet addressed to the mobile host is forwarded to the foreign link where the mobile host stayed before, and the packet is lost without being received by the mobile host. A conceivable example of such quick movement of the mobile host between foreign links is a situation in which cells in a cellular mobile telecommunications system are foreign links.

In association with the foregoing problem, the packet communication system of the prior art further has the problem that when the mobile host moves between foreign links far off from the home link or the correspondent host, the number of hops that one Binding Update packet passes becomes large, so as to consume a lot of resources of links.

The packet communication system of the prior art also has the problem that, while there occurs no packet transmission between the mobile host and the correspondent host for a long time, the mobile host must also send the Binding Update packet to the home agent at every time of its movement between links because of characteristics of an application employed. This increases the load for processing of Binding Update packets and Binding Acknowledgement packets at the home agent and also poses the problem of consuming the resources of links by transmission of Binding Update packets and Binding Acknowledgement packets.

The present invention has been accomplished under the circumstances as described above, and an object of the present invention is to provide mobility agent, mobile host, home agent and packet communication systems capable of preventing the loss of packets addressed to the mobile host, reducing the traffic volume of Binding Update packets, reducing the transmission frequency of Binding Update packets in the case where a long time has passed without transmission of a packet at the mobile host, and transmitting a packet whose destination is a node located in a mobile network, a method of controlling them and a computer program for executing the method.

DISCLOSURE OF THE INVENTION

The mobility agent used in the packet communication system according to the present invention is a mobility agent for forwarding a received packet to a mobile host on the basis of the destination address included in the received packet, comprising memory means for storing data includes in a signal sent from the mobile host, the data representing the correspondence between the home address and the forwarding destination address, operation mode, and whether or not buffering of a packet is necessary every the mobile host, and sending a reception acknowledgement signal to the mobile host which sent the signal, when the memory means has stored the data. In the arrangement, under the control of the transmission/reception of the received packet according to the status of the mobile host and the status of whether or not buffering of packet is necessary, the resource of the packet communication system may be effectively utilized.

Further the mobile host used in the packet communication system according to the present invention is a mobile host which performs the packet communication between the mobile host and the correspondence host, featured by forwarding of data representing the correspondence between home address of the mobile host and the forwarding destination address, data representing the operation mode, either one of active mode or idle mode of itself, and data instructing necessity of buffering or no necessity with respect to the packet to be received to the mobility agent and reception of a reception acknowledgement signal regarding the sent data. Thus, by sending the operation mode and a request for whether or not buffering is necessary, the mobility agent receiving them can realize the effective packet transmission/reception in the packet communication system. Further, by switching over the operation mode, when the mobility agent is in the idle status, the power consumption of the mobility agent decrease and it is possible to realize low power consumption in the mobile host.

Further, a mobile router used in the packet communication according to the present invention is a mobile transmitting a packet of which forwarding destination address is not the address, to another proper node in a mobile network or a stationary network or between mobile networks, characterized by sending data representing the operation mode, either one of active mode or idle mode, and data instructing whether or not buffering of a packet is necessary with respect to a packet to be received to the mobility agent to the mobility agent, and reception of a reception acknowledgement data with respect to the sent data.

Further, the present invention realizes the effective realization of the resource of the packet communication system by providing a method of controlling these mobility agent, mobile host and the mobile router, and a computer program for executing process of the method.

Further, a packet communication system according to the present invention is a packet communication system comprising a home agent for providing a home link for a mobile host, a plurality of access routers for providing foreign links for the mobile host, and a mobility agent including a plurality of access routers in an area thereof, in which a home address is used when the mobile host is present at the home link and in which the home address and a c/o address are used when the mobile host is present at a foreign link, wherein the mobile host comprises: first notifying means for notifying the mobility agent of a correspondence between the home address and the c/o address, an operating mode indicating either an active mode or an idle mode, and whether or not buffering of a packet is necessary; and second notifying means for notifying the home agent of a correspondence between the home address and an address of the mobility agent, wherein the home agent comprises first forwarding means for forwarding a packet directed to the home address, received from a correspondent host, to the address of the mobility agent notified of by the mobile host, wherein the correspondent host comprises sending means for sending a packet directed to the home address, to the address of the mobility agent notified of by the mobile host, wherein the mobility agent comprises: second forwarding means for forwarding a packet received from the home agent or the correspondent host, to the mobile host; and buffering means for buffering a packet; and third notifying means for notifying the mobile host of arrival of a packet, and wherein the mobility agent is configured so that in the active mode and without necessity for buffering of a packet, the mobility agent forwards a packet received from the home agent or the correspondent host, to the mobile host, so that in the active mode and with necessity for buffering of a packet, the mobility agent buffers a packet, and so that in the idle mode the mobility agent buffers a packet and notifies the mobile host of arrival of the packet.

The system may also employ a configuration comprising a plurality of mobility agents.

The system may also employ such a configuration that in the active mode, where the mobile host moves between foreign links in the area of the mobility agent, the mobile host notifies the mobility agent of the correspondence between the home address and the c/o address, the operating mode indicating the active mode, and the necessity for buffering of a packet, before moving between the foreign links, and the mobile host notifies the mobility agent of a correspondence between the home address and a c/o address used at the destination foreign link, the operating mode indicating the active mode, and no necessity for buffering of a packet, after having moved between the foreign links.

The system may also employ such a configuration that in the idle mode, where the mobile host moves between foreign links in the area of the mobility agent, the mobile host notifies neither of the mobility agent, the home agent, and the correspondent host of anything.

The system may also employ such a configuration that in the active mode, where the mobile host moves from a foreign link in an area of a certain mobility agent to a foreign link in an area of another mobility agent different therefrom, the mobile host notifies the mobility agent of the correspondence between the home address and the c/o address, the operating mode indicating the active mode, and the necessity for buffering of a packet, before moving between the foreign links, and the mobile host notifies the mobility agent of a correspondence between the home address and a c/o address used at the destination foreign link, the operating mode indicating the active mode, and no necessity for buffering of a packet and also notifies the home agent and the correspondent host of a correspondence between the home address and an address of the mobility agent, after having moved between the foreign links.

The system may also employ such a configuration that in the idle mode, where the mobile host moves from a foreign link in an area of a certain mobility agent to a foreign link of another mobility agent different therefrom, the mobile host notifies the mobility agent of a correspondence between the home address and a c/o address used at the destination foreign link, the operating mode indicating the idle mode, and the necessity for buffering of a packet and also notifies the home agent and a correspondent host of the correspondence between the home address and an address of the mobility agent, after having moved between the foreign links.

The system may also employ such a configuration that the home agent and access routers are base stations, the home link and foreign links are radio communication links, and the mobile host is a mobile station.

Another packet communication system comprising a stationary network and a mobile network, may also adopt a configuration wherein the stationary network comprises a home agent adapted to the mobile network, a mobility agent, a correspondent host, and an access router, wherein the mobile network comprises at least one mobile router and a plurality of access routers, and wherein the mobile network moves between foreign links provided by the stationary network or another mobile network.

Still another packet communication system comprising a stationary network and a mobile network, may also adopt a configuration wherein the stationary network comprises a home agent adapted to the mobile network, a mobility agent, a correspondent host, and an access router, wherein the mobile network comprises at least one mobile router and a plurality of stationary hosts, and wherein the mobile network moves between foreign links provided by the stationary network or another mobile network.

The system may also employ such a configuration that the mobile router comprises: first notifying means for notifying the mobility agent of a correspondence between a home address and a c/o address, an operating mode indicating either an active mode or an idle mode, and whether or not buffering of a packet is necessary; second notifying means for notifying the home agent of a correspondence between the home address and an address of the mobility agent; and Subnet-prefix notifying means for notifying the mobility agent and the home agent of a Subnet-prefix for identifying a link included in the mobile network.

The system may also employ such a configuration that the mobile network comprises at least one mobility agent.

The system may also employ such a configuration that, when an access router exists in an area where service areas of a plurality of mobility agents overlap with each other, the access router is free to select either one of the plurality of mobility agents.

When the packet communication system is constructed employing either of the configurations as described above, the mobility agent works to buffer packets so as to be able to prevent the loss of packets sent from the correspondent host to the mobile host even if the mobile host frequently moves between foreign links. A conceivable case where the mobile host frequently moves between foreign links is a situation in which the access routers in the packet communication system are base stations in a mobile telecommunications system, the mobile host is a mobile station, and the foreign links are radio links between the base stations and the mobile station. In this case, movement of the mobile station between base stations, i.e., between radio links is called handover. When the present invention is applied to the mobile telecommunications systems, it is feasible to prevent the loss of packets sent from the correspondent host to the mobile station.

Even if the mobile host frequently moves between foreign links the mobile host is required merely to send the Binding Update packet to only the mobility agent, which can reduce the traffic of Binding Update packets appearing in the packet communication system, where the mobility agent is located nearer to the mobile host than the home agent and the correspondent host are. This effect is also achieved in the foregoing mobile telecommunications systems.

The idle mode is used where the mobile host sends or receives no packet for a long period of time, which can reduce the traffic of Binding Update packets appearing in the packet communication system. Further, since it is feasible to reduce the transmission frequency of Binding Update packets from the mobile host, the invention also presents the effect of reducing power consumption of the battery at the mobile host. This effect is also achieved in the aforementioned mobile telecommunications systems.

Further, the invention provides the effect of permitting the correspondent host to send a packet addressed to a stationary host or a mobile host present in a mobile network. This effect is not enjoyed with only packets addressed to nodes present in mobile networks connected to the stationary network, but is also enjoyed similarly with packets addressed to stationary hosts and mobile hosts present in a mobile network connected to another mobile network.

When the mobile network is provided with at least one mobility agent, it can provide such operating modes as the buffering of packet, the active mode, and the idle mode for the mobile host or another mobile network moving between foreign links provided by the mobile network.

When an access router is present in an area in which service areas of a plurality of mobility agents overlap with each other, it is free to select either of the mobility agents, whereby in the event of abnormal stop of one mobility agent because of some trouble or the like, the mobile host can continue communications by switching the mobility agent to another mobility agent. It also becomes feasible to distribute the traffic to a plurality of mobile hosts present at foreign links of one access router, among a plurality of mobility agents.

DETAILED DESCRIPTION OF THE PREFERRED EMBODIMENTS

Embodiments of the present invention will be described below on the basis of the drawings.

First Embodiment

Figure 1:
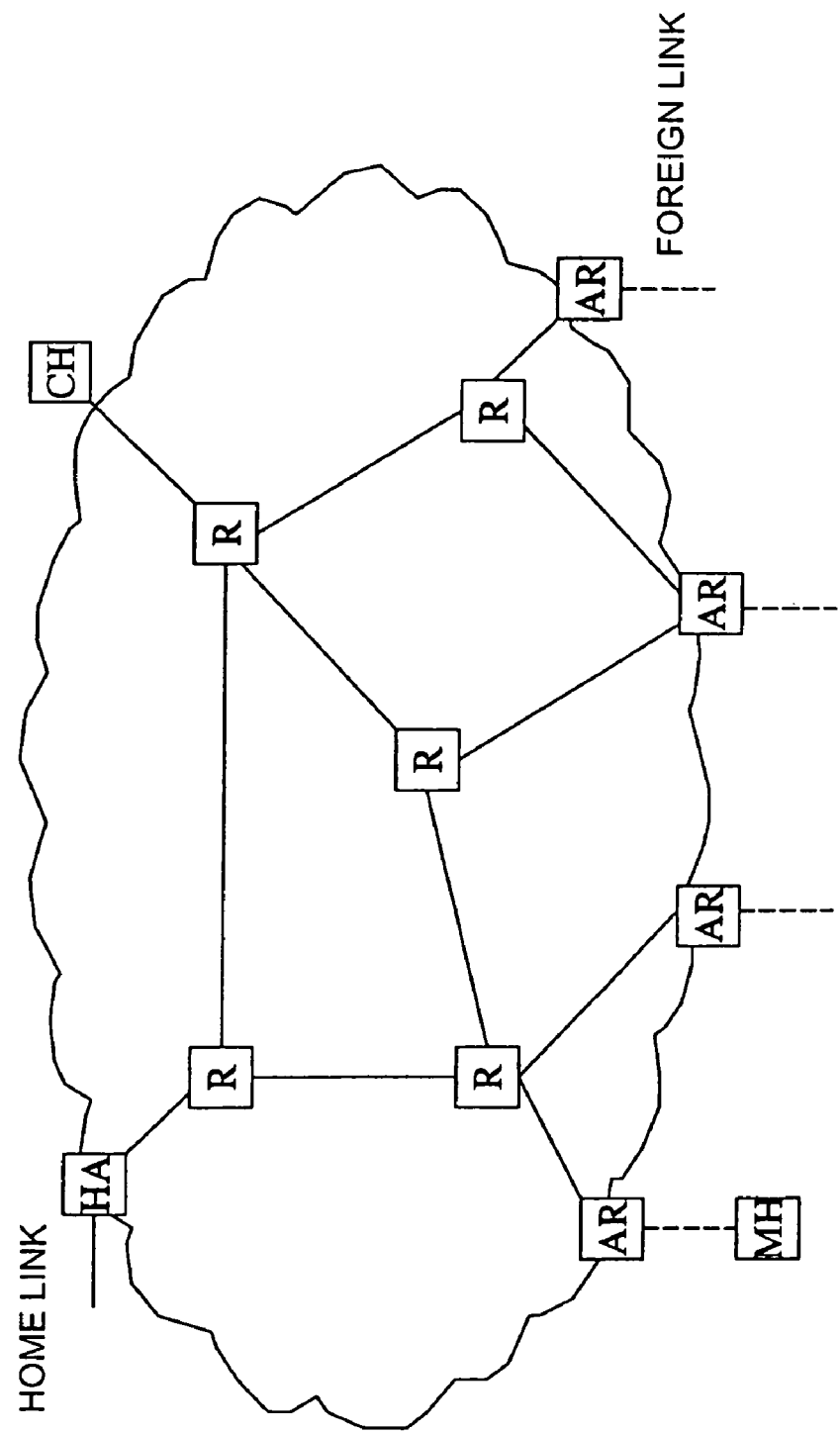
FIG. 1 is a diagram showing a configuration of a conventional packet communication system.
Figure 2:
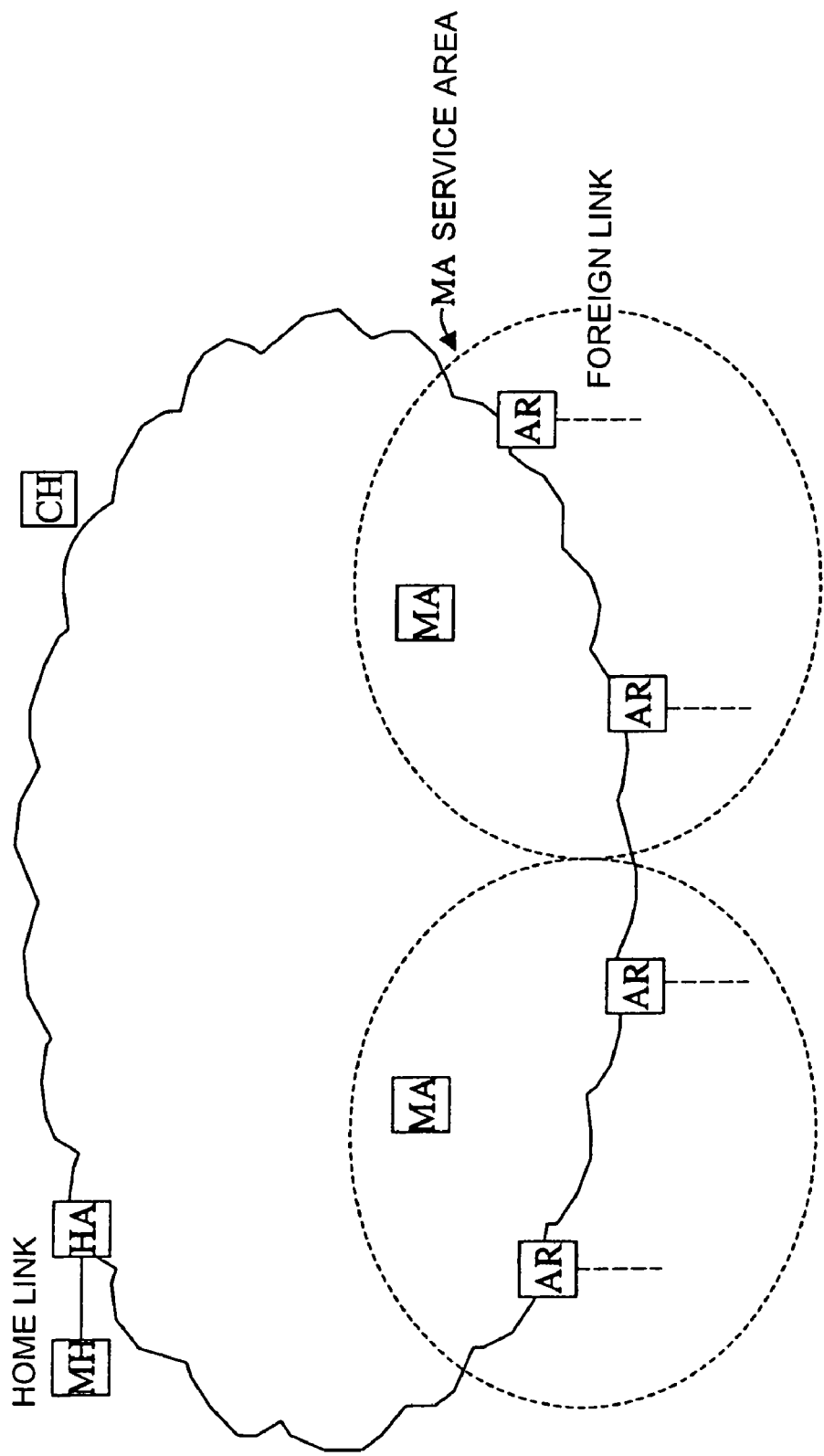
FIG. 2 is a diagram showing a configuration example of a packet communication system according to the present invention.

FIG. 2 is a configuration example of a packet communication system according to the present invention. In FIG. 2, HA represents a home agent, each MA a mobility agent, each AR an access router, MH a Mobile Host, and CH a Correspondent Host. Although FIG. 2 shows no router, the network includes an arbitrary number of routers as the packet communication system of the prior art did. The packet communication system of the present invention has the configuration obtained by adding the mobility agents to the packet communication system of the prior art. The mobility agents are routers having functions that will be described hereinafter, and an arbitrary number of mobility agents exist in the network. Each mobility agent provides a service of relaying a packet from the home agent to the mobile host and a packet from the correspondent host to the mobile host, for the mobile host located in an area including one or more access routers. Further, each mobility agent provides a service of buffering a packet addressed to the mobile host, received from the home agent or from the correspondent host, for the mobile host. Each access router is included in an area of at least one mobility agent and functions to notify the mobile host of an address of the mobility agent where the mobile host uses a foreign link.

The packet communication system of the present invention, different from the packet communication system of the prior art, has two operating modes. One is an idle mode defining a state in which no packet is transmitted between the mobile host and the correspondent host, and the other an active mode defining a state in which a packet is transmitted between the mobile host and the correspondent host.

Figure 3:
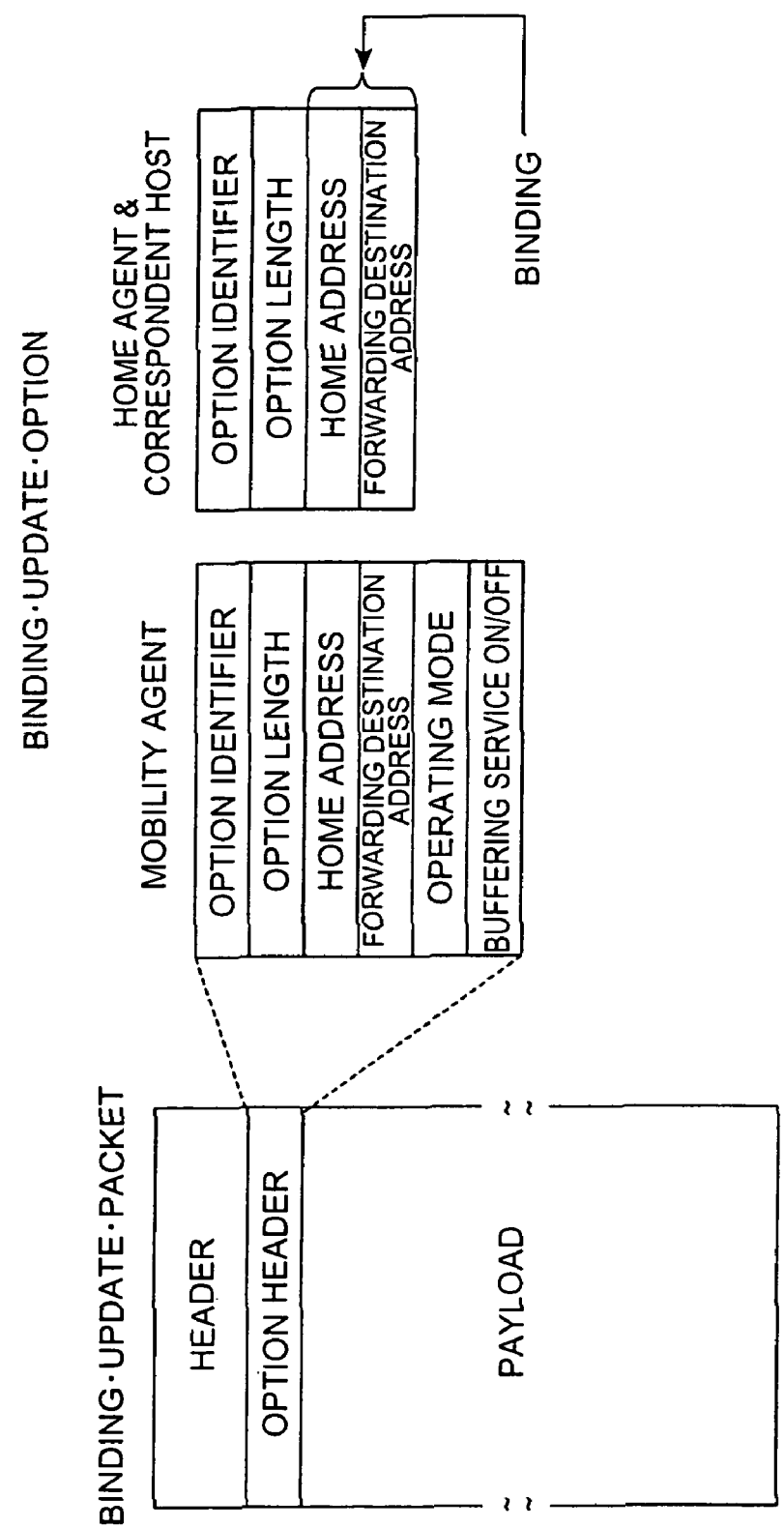
FIG. 3 is a diagram showing a configuration of a Binding Update packet.

FIG. 3 is a configuration example of a Binding Update packet in the present invention. The Binding Update packet includes a Binding Update option in an option header of an IP packet. The Binding Update option is of either a format sent from the mobile host to the mobility agent or a format sent from the mobile host to the home agent and the correspondent host.

The format for the mobility agent is comprised of an option identifier, an option length, a home address, a forwarding destination address, an operating mode, and buffering service on/off. The option identifier indicates that the option is Binding Update. The option length indicates the length of the option. The home address indicates the home address of the mobile host that sends the Binding Update packet. The forwarding destination address indicates an address of a forwarding destination of a packet directed to the home address of the mobile host, in which a c/o address used at a foreign link by the mobile host or the home address is set. The operating mode indicates either the idle mode or the active mode. The buffering service on/off indicates whether the buffering of packet is necessary or not at the mobility agent.

The format for the home agent and the correspondent host is comprised of an option identifier, an option length, a home address, and a forwarding destination address. These are the same as those in the format for the mobility agent, but the address of the mobility agent or the home address of the mobile host is set in the forwarding destination address.

The Binding Update packet is used when the mobile host notifies the mobility agent of the binding being a correspondence between the home address and the c/o address, the operating mode, and the buffering service on/off, and is also used when the mobile host notifies the home agent and the correspondent host of the binding between the home address and the mobility agent address.

In FIG. 3, the header includes a destination address, a source address, and so on. Set in the forwarding destination address is either of the c/o address used at the foreign link by the mobile host, the mobility agent address, and the home address.

Figure 4:
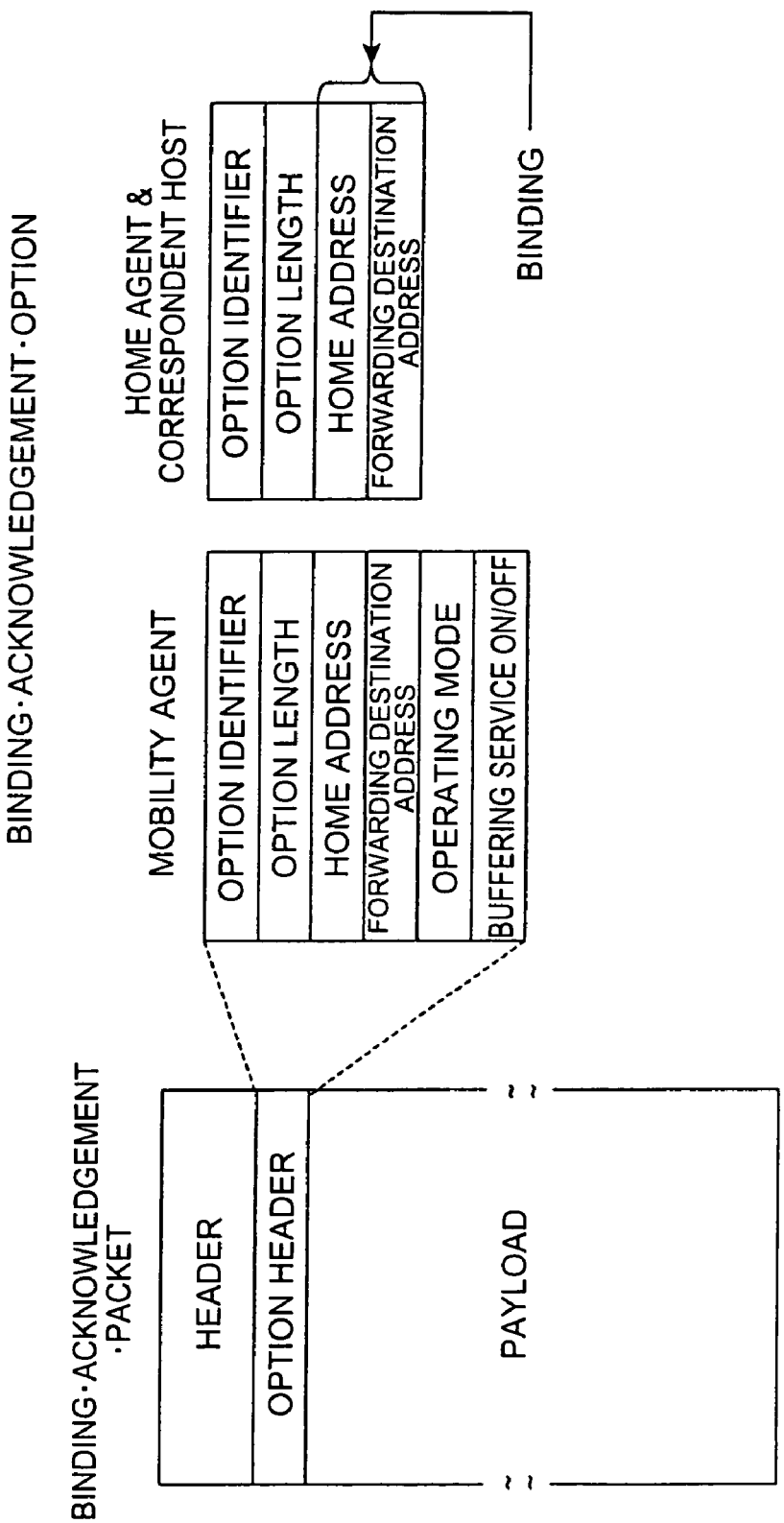
FIG. 4 is a diagram showing a configuration of a Binding Acknowledgement packet.

FIG. 4 is a configuration example of a Binding Acknowledgement packet in the present invention. The Binding Acknowledgement packet includes a Binding Acknowledgement option in an option header of an IP packet. The Binding Acknowledgement option is of either a format sent from the mobility agent to the mobile host or a format sent from the home agent and the correspondent host to the mobile host.

The format for the mobility agent is comprised of an option identifier, an option length, a home address, a forwarding destination address, an operating mode, and buffering service on/off. The option identifier indicates that the option is a Binding Acknowledgement option. The option length indicates the length of the option. The home address, forwarding destination address, operating mode, and buffering service on/off are set to the same contents as those in the Binding Update packet that the mobility agent received from the mobile host.

The format for the home agent and the correspondent host is comprised of an option identifier, an option length, a home address, and a forwarding destination address. These are much the same as those for the mobility agent.

The Binding Acknowledgement packet is used when the mobility agent, the home agent, and the correspondent host notify the mobile host of completion of processing of the Binding Update packet.

In FIG. 4, the header includes a destination address, a source address, and so on. Set in the forwarding destination address is either of the c/o address used at the foreign link by the mobile host, the mobility agent address, and the home address.

Figure 5:
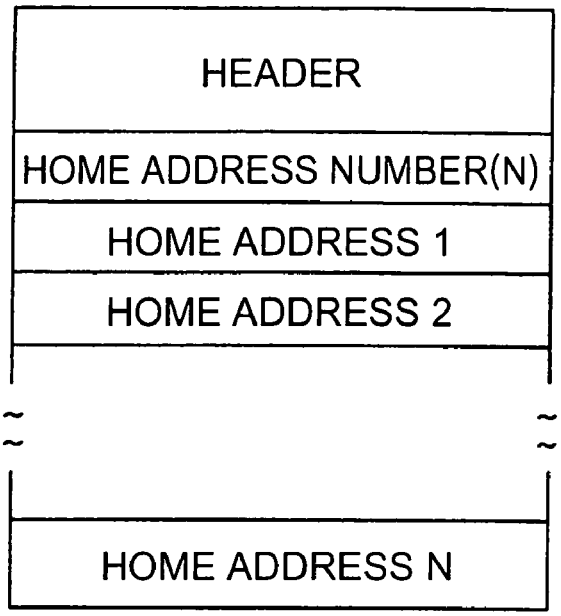
FIG. 5 is a diagram showing a configuration of a Paging Request packet.

FIG. 5 is a configuration example of a Paging Request packet in the present invention. The Paging Request packet is comprised of a home address number (N) of home addresses included in a payload of an IP packet, and home address 1 to home address N. The home address number (N) indicates the number of home addresses included in the Paging Request packet. Home address 1 to home address N indicate home addresses of one or more mobile hosts that are requested to receive the Paging Request packet and to transition from the idle mode to the active mode.

The Paging Request packet is used when the mobility agent notifies the access routers in the area of the aforementioned information. The addresses of the access routers in the same area are set as destination addresses of the Paging Request packet. The addresses of the access routers in the same area can be unicast addresses different among the access routers or a common multicast address to the access routers. In the former case, the mobility agent sends individual Paging Request packets to the respective access routers. In the latter case, the mobility agent sends one Paging Request packet.

In FIG. 5, the header includes the destination addresses, the source address, and so on. The addresses of the access routers are set as the destination addresses of the Paging Request packet.

Figure 6:
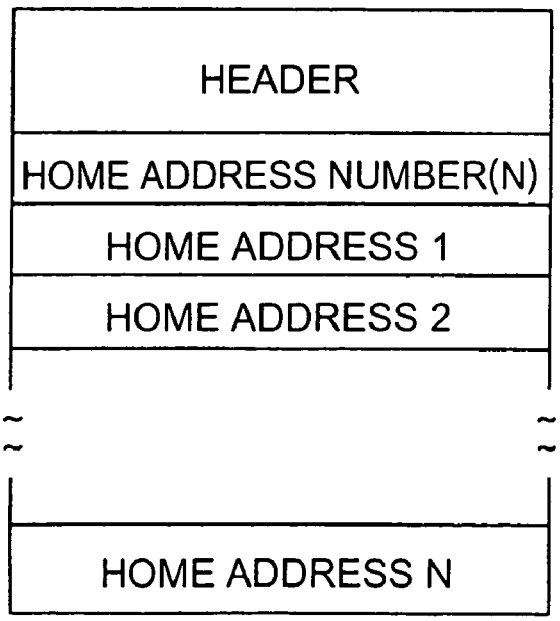
FIG. 6 is a diagram showing a configuration of a Paging Notification packet.

FIG. 6 is a configuration example of a Paging Notification packet in the present invention. The Paging Notification packet is comprised of a home address number (N) of home addresses included in a payload of an IP packet, and home address 1 to home address N. The home address number (N) indicates the number of home addresses included in the Paging Notification packet. Home address 1 to home address N indicate home addresses of one or more mobile hosts that are requested to receive the Paging Notification packet and to transition from the idle mode to the active mode.

The Paging Notification packet is used when the access router notifies the mobile host under connection to the foreign link of the foregoing information. Set as destination addresses of the Paging Notification packet are addresses of destinations of all nodes in the foreign link (broadcast addresses).

In FIG. 6, the header includes the destination addresses, the source address, and so on. Set as the destination addresses of the Paging Notification packet are the addresses of destinations of all the nodes in the link (broadcast addresses).

Figure 7:
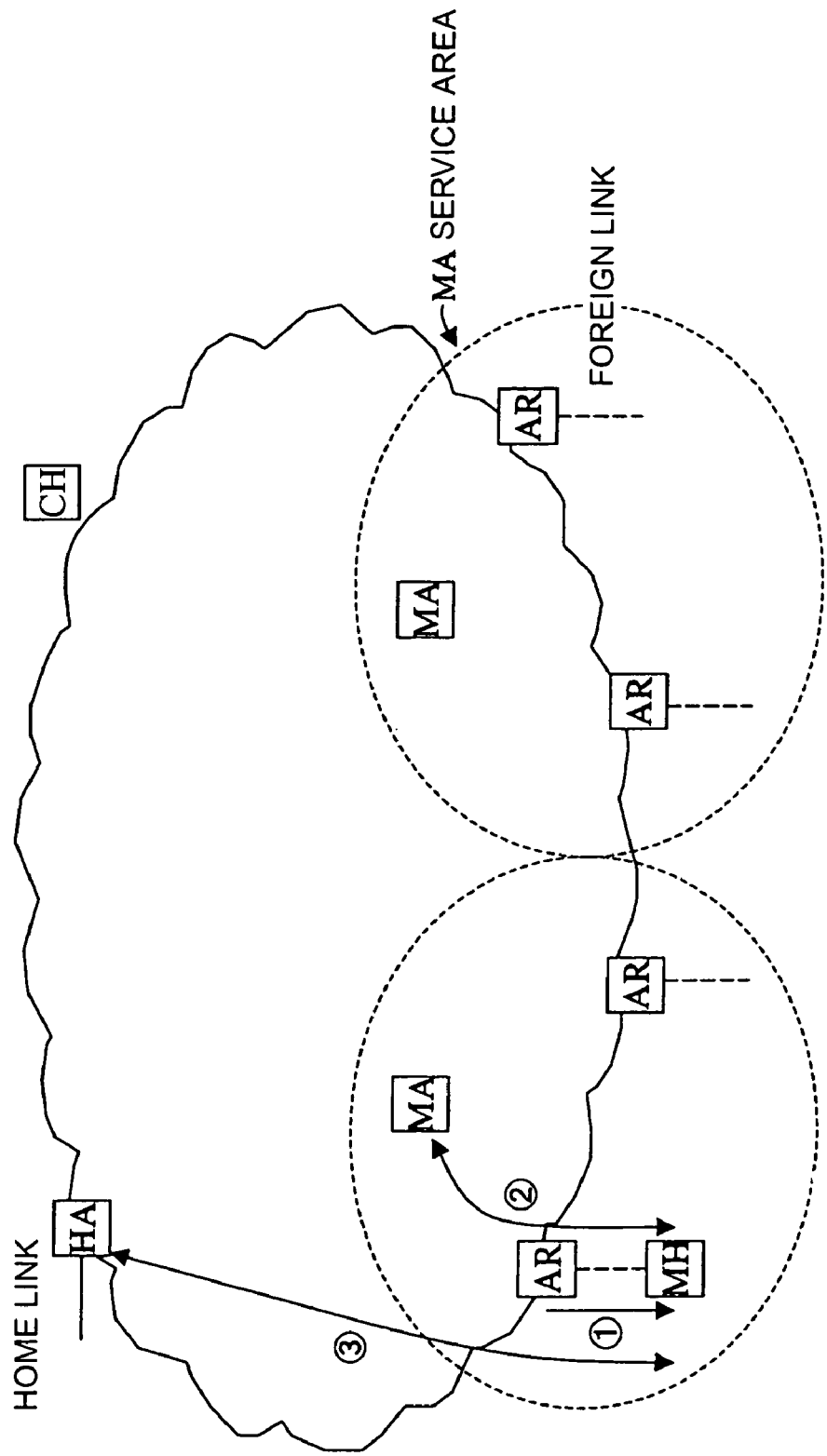
FIG. 7 is an example of operation of the packet communication system carried out when in the active mode the mobile host moves from its home link to a foreign link.

FIG. 7 is an example of operation of the packet communication system carried out when in the active mode the mobile host moves from its home link to a foreign link. The operation example will be described below on the basis of FIG. 7.

(1) After the mobile host has moved from the home link to the foreign link, it acquires a c/o address and an address of a mobility agent from an access router.

(2) The mobile host sends to the mobility agent the Binding Update packet including the binding between the home address and the c/o address and indicating that the operating mode is the active mode and that there is no need for buffering of packet. The mobility agent receives the Binding Update packet, stores the binding between the home address and the c/o address, the operating mode being the active mode, and no need for buffering of packet, and then is sends the Binding Acknowledgement packet to the mobile host. The mobile host receives the Binding Acknowledgement packet to recognize that the Binding Update packet has arrived at the mobility agent and that normal processing is done.

(3) The mobile host sends the Binding Update packet including the binding between the home address and the address of the mobility agent to the home agent. The home agent receives the Binding Update packet, stores the binding between the home address and the mobility agent address, and then sends the Binding Acknowledgement packet to the mobile host. The mobile host receives the Binding Acknowledgement packet to recognize that the Binding Update packet has arrived at the home agent and that normal processing is done.

Figure 8:
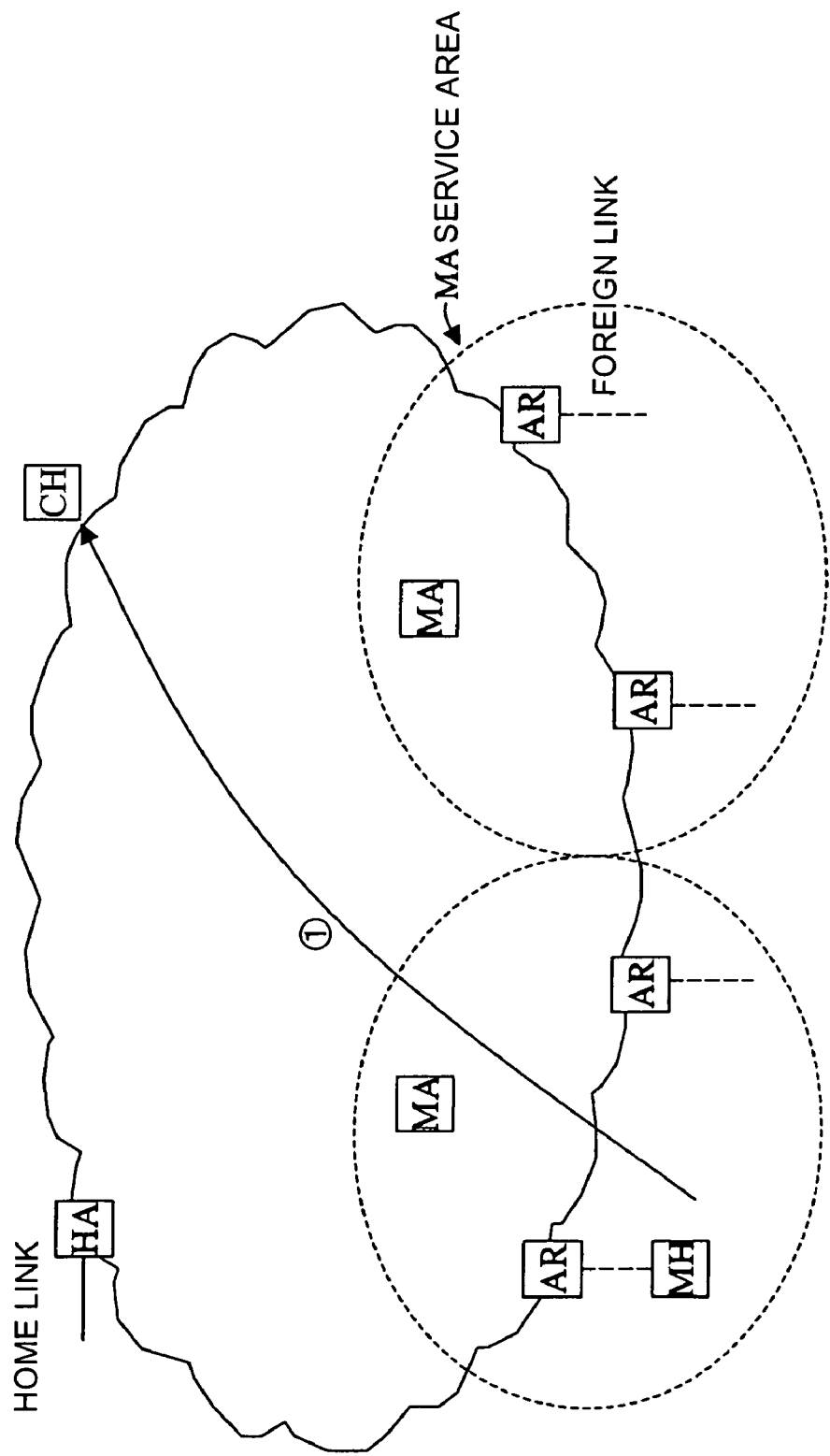
FIG. 8 is an example of operation of the packet communication system carried out when in the active mode the mobile host sends a packet to the correspondent host.

FIG. 8 is an example of operation of the packet communication system carried out when in the active mode the mobile host sends a packet to the correspondent host. The operation example will be described below on the basis of FIG. 8.

The mobile host sends the packet to the correspondent host. The packet is routed from the mobile host to the correspondent host by the routers in the network.

Figure 9:
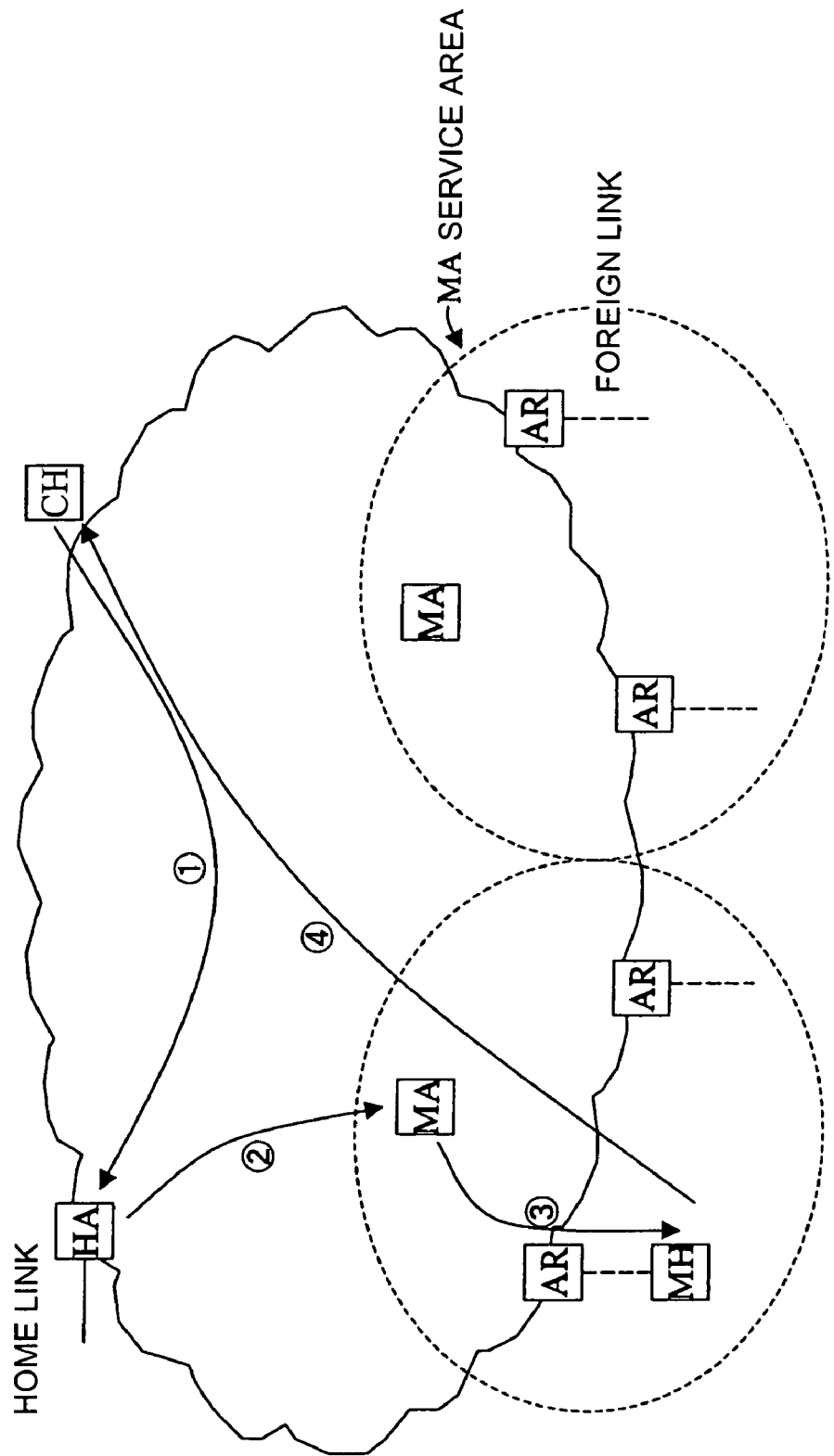
FIG. 9 is an example of operation carried out when in the active mode the correspondent host sends a packet to the mobile host before the correspondent host receives the Binding Update packet from the mobile host.

FIG. 9 is an example of operation carried out when in the active mode, before the correspondent host receives the Binding Update packet from the mobile host, the correspondent host sends a packet to the mobile host. The operation example will be described below on the basis of FIG. 9.

(1) The correspondent host sends the packet the destination of which is the home address of the mobile host. The packet is routed to the home link by the routers in the network.

(2) When the destination of the packet is the home address of the binding, the home agent of the home link receives the packet instead of the mobile host, generates a tunneling packet the destination of which is the mobility agent address of the binding, puts the received packet into the payload of the tunneling packet, and sends it. The tunneling packet is routed to the mobility agent by the routers in the network.

(3) The mobility agent receives the tunneling packet from the home agent and extracts the packet included therein. When the destination of the packet thus extracted matches with the home address of the binding, the mobility agent puts the extracted packet into a payload of a tunneling packet whose destination is the c/o address of the binding, and sends the tunneling packet. The tunneling packet is routed to the mobile host by the routers in the network. Receiving the tunneling packet from the mobility agent, the mobile host extracts the packet from the payload to receive the packet directed to its own home address at last.

(4) When the mobile host receives the tunneling packet without the routing header in which its home address is set, it determines that the correspondent host does not have the binding between the home address and the mobility agent address, and sends to the correspondent host the Binding Update packet including the binding between the home address and the mobility agent address. The correspondent host receives the Binding Update packet and stores the binding between the home address and the mobility agent address.

Figure 10:
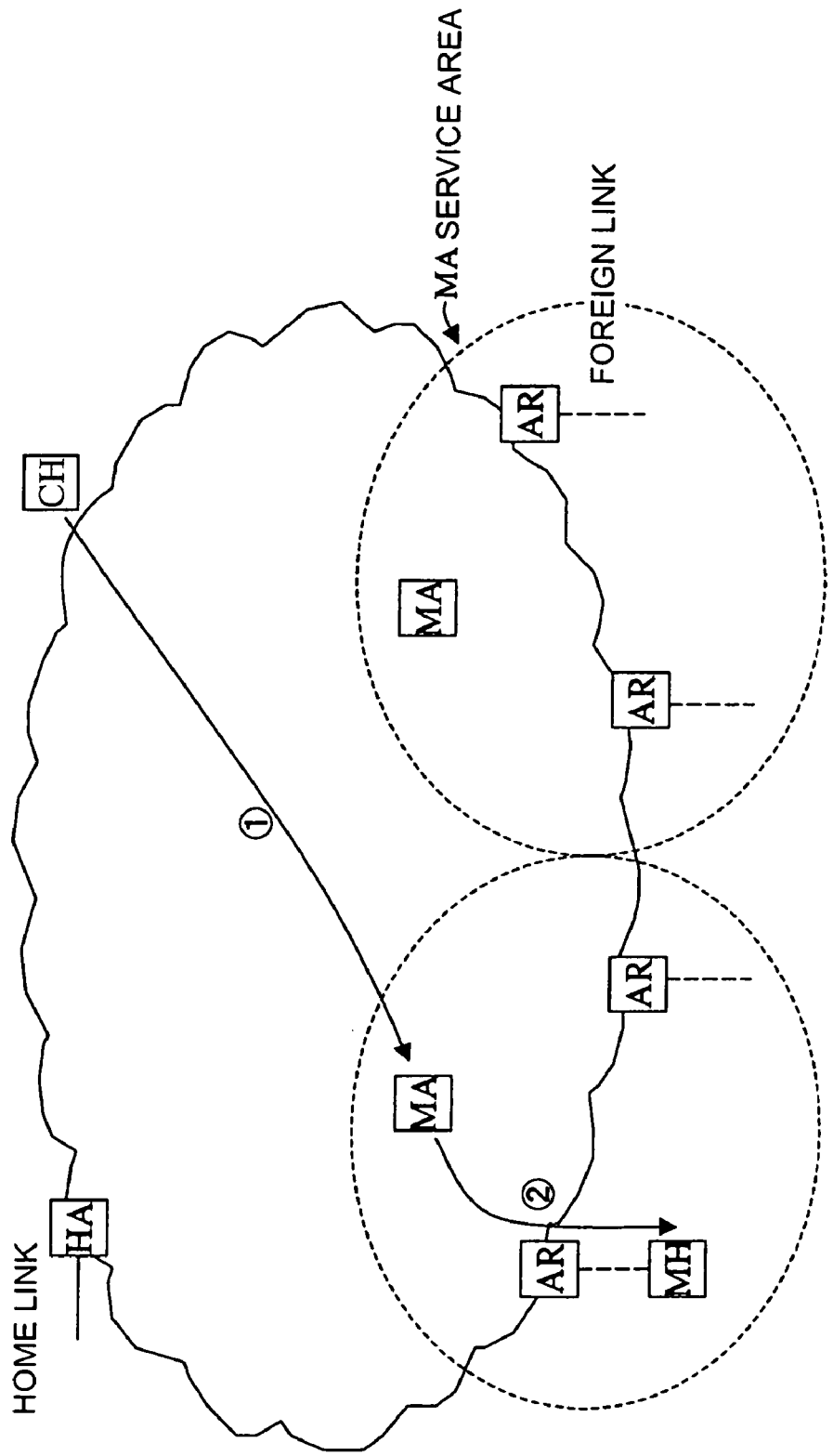
FIG. 10 is an example of operation carried out when in the active mode the correspondent host sends a packet to the mobile host after the correspondent host receives the Binding Update packet from the mobile host.

FIG. 10 is an example of operation carried out when in the active mode, after the correspondent host receives the Binding Update packet from the mobile host, the correspondent host sends a packet to the mobile host. The operation example will be described below on the basis of FIG. 10.

(1) On the occasion of sending the packet directed to the home address indicated by the stored binding, the correspondent host sets the destination of the packet to the c/o address, puts the routing header option with the home address of the binding into the packet, and sends it. The c/o address of the binding stored at the correspondent host at this time is the mobility agent address. The packet is routed to the mobility agent by the routers in the network.

(2) The mobility agent receives the packet from the correspondent host. When the home address included in the routing header option matches with the home address of the binding, the mobility agent interchanges the destination of the packet and the home address included in the routing header option with each other, puts the packet into the payload of a tunneling packet whose destination is the c/o address of the binding, and sends it. The tunneling packet is routed to the mobile host by the routers in the network. Receiving the tunneling packet from the mobility agent, the mobile host extracts the packet from the payload to receive the packet directed to its own home address at last.

Figure 11:
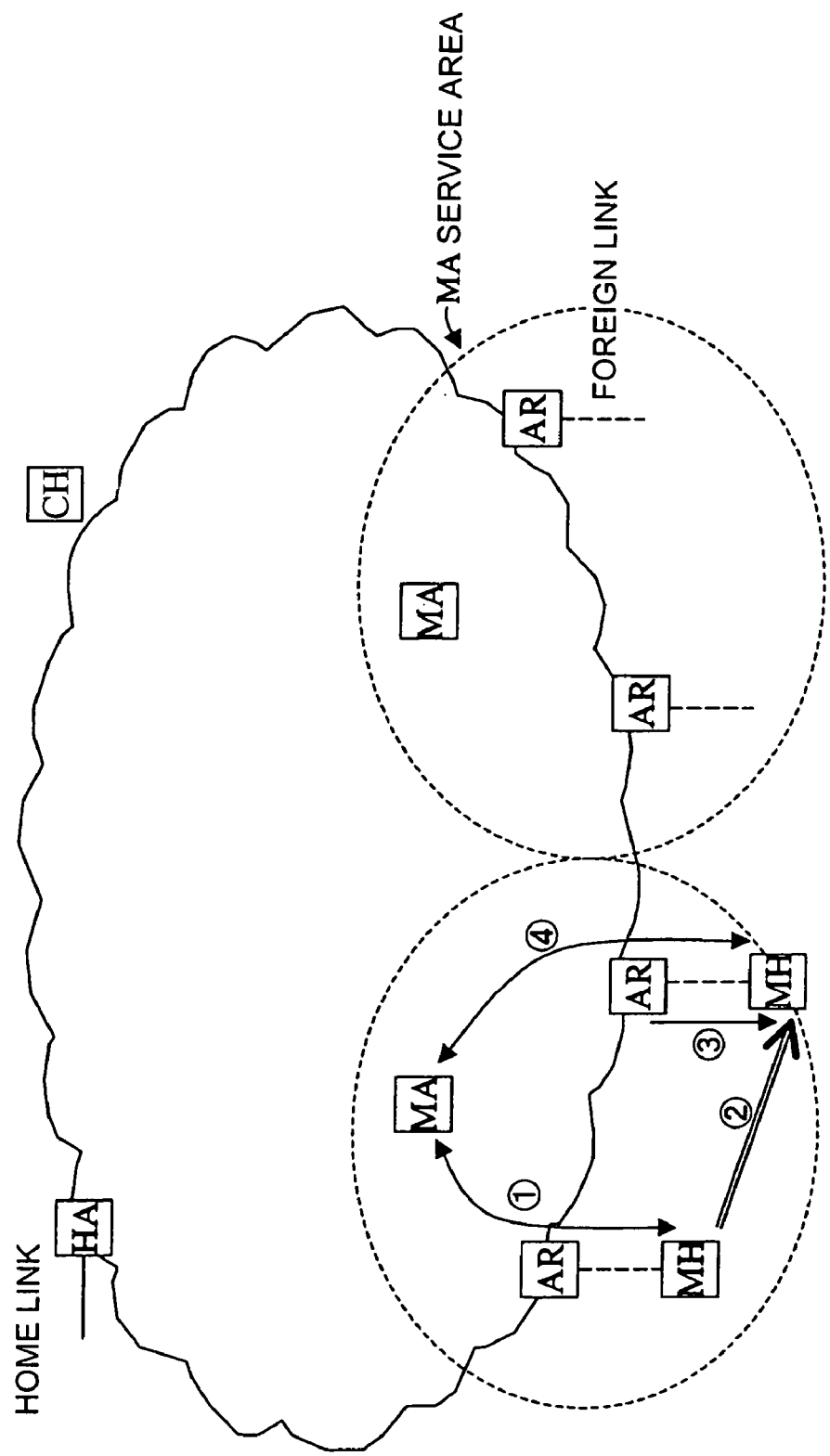
FIG. 11 is an example of operation carried out when in the active mode the mobile host moves between foreign links provided by access routers in an area of an identical mobility agent.

FIG. 11 is an example of operation carried out when in the active mode the mobile host moves between foreign links provided by access routers in an area of the same mobility agent. The operation example will be described below on the basis of FIG. 11.

(1) Before moving to another foreign link, the mobile host sends to the mobility agent the Binding Update packet including the binding between the home address and the c/o address and indicating that the operating mode is the active mode and that the buffering of packet is necessary. The mobility agent receives the Binding Update packet, stores the binding between the home address and the c/o address, the operating mode being the active mode, and the necessity for buffering of packet, and sends the Binding Acknowledgement packet to the mobile host. Receiving the Binding Acknowledgement packet, the mobile host recognizes that the Binding Update packet has arrived at the mobility agent and that normal processing is done. After the mobility agent is notified of the necessity for buffering of packet by the mobile host and when the mobility agent receives an applicable packet from the home agent or the correspondent host, it buffers the packet addressed to the mobile host.

(2) The mobile host moves between foreign links.

(3) After the mobile host has moved to another foreign link, it acquires a c/o address and an address of a mobility agent from an access router.

(4) The mobile host judges whether there is change in the address of the mobility agent. Without change, it sends to the mobility agent the Binding Update packet including the binding between the home address and the c/o address and indicating that the operating mode is the active mode and that there is no need for buffering of packet. Receiving the Binding Update packet, the mobility agent stores the binding between the home address and the c/o address, the operating mode being the active mode, and no necessity for buffering of packet, and then sends the Binding Acknowledgement packet to the mobile host. Receiving the Binding Acknowledgement packet, the mobile host recognizes that the Binding Update packet has arrived at the mobility agent and that normal processing is done. When the mobility agent bears buffered packets, it sequentially sends the buffered packets to the mobile host according to the operation similar to FIG. 9 or FIG. 10.

Figure 12:
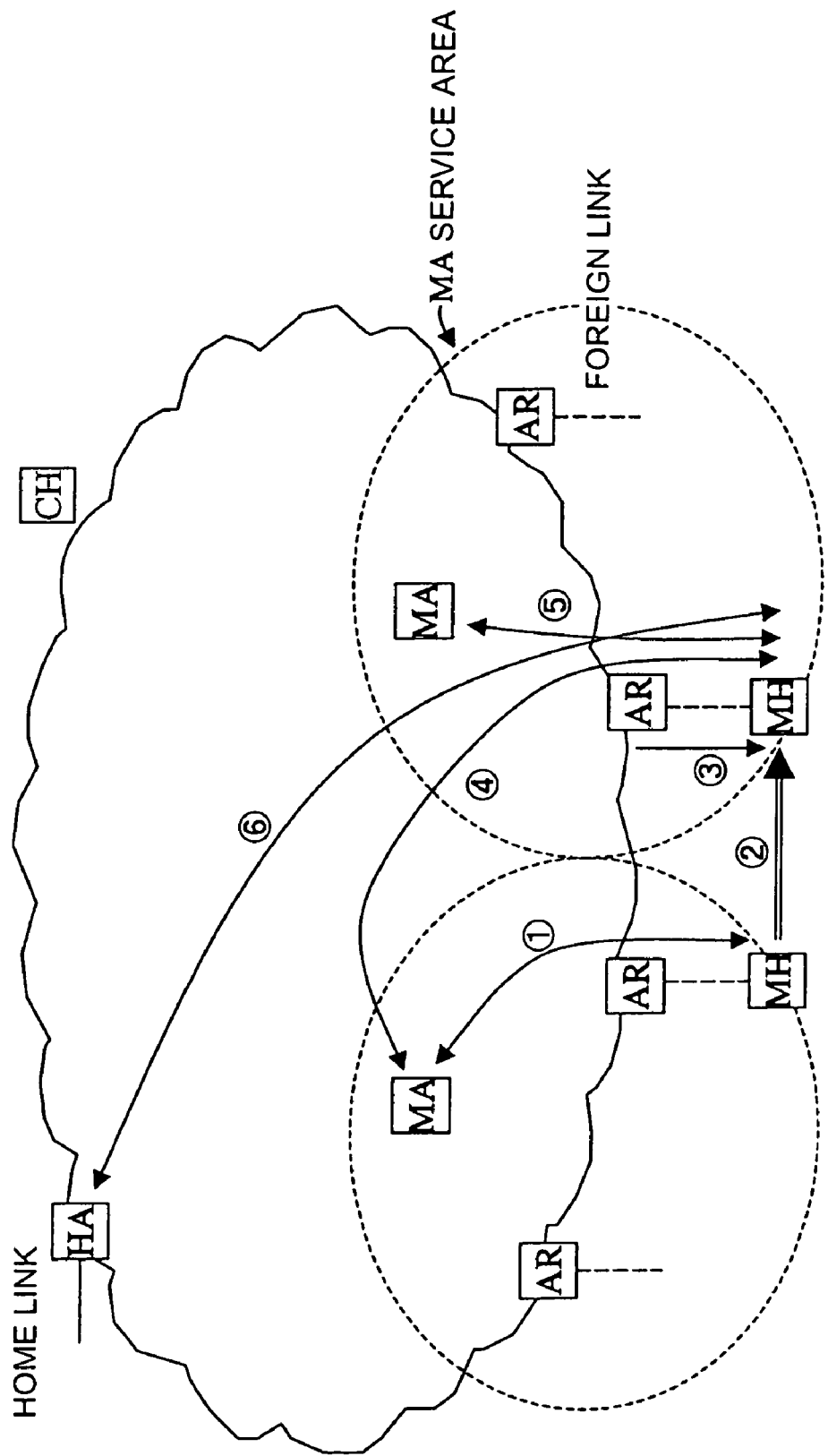
FIG. 12 is an example of operation carried out when in the active mode the mobile host moves to a foreign link provided by an access router in an area of a different mobility agent.

FIG. 12 is an example of operation carried out when in the active mode the mobile host moves to a foreign link provided by an access router in an area of a different mobility agent. The operation example will be described below on the basis of FIG. 12.

(1) Before moving to another foreign link, the mobile host sends to the mobility agent the Binding Update packet including the binding between the home address and the c/o address and indicating that the operating mode is the active mode and that the buffering of packet is necessary. Receiving the Binding Update packet, the mobility agent stores the binding between the home address and the c/o address, the operating mode being the active mode, and the necessity for buffering of packet, and then sends the Binding Acknowledgement packet to the mobile host. Receiving the Binding Acknowledgement packet, the mobile host recognizes that the Binding Update packet has arrived at the mobility agent and that normal processing is done. After the mobility agent is notified of the necessity for buffering of packet by the mobile host and when the mobility agent receives an applicable packet from the home agent or the correspondent host, it buffers the packet addressed to the mobile host.

(2) The mobile host arrives at the foreign link.

(3) After the mobile host has moved to the other foreign link, it acquires a c/o address and an address of a mobility agent from an access router.

(4) The mobile host judges whether there is change in the address of the mobility agent. With change, the mobile host sends to the previous mobility agent the Binding Update packet including the binding between the home address and the c/o address and indicating that the operating mode is the active mode and that the buffering of packet is unnecessary. Receiving the Binding Update packet, the previous mobility agent stores the binding between the home address and the c/o address, the operating mode being the active mode, and no need for buffering of packet, and then sends the Binding Acknowledgement packet to the mobile host. Receiving the Binding Acknowledgement packet, the mobile host recognizes that the Binding Update packet has arrived at the previous mobility agent and that normal processing is done. When the mobility agent bears buffered packets, it sequentially sends the buffered packets to the mobile host according to the operation similar to FIG. 9 or FIG. 10.

(5) The mobile host sends to the mobility agent the Binding Update packet including the binding between the home address and the c/o address and indicating that the operating mode is the active mode and that the buffering of packet is unnecessary. Receiving the Binding Update packet, the mobility agent stores the binding between the home address and the c/o address, the operating mode being the active mode, and no need for buffering of packet, and then sends the Binding Acknowledgement packet to the mobile host. Receiving the Binding Acknowledgement packet, the mobile host recognizes that the Binding Update packet has arrived at the mobility agent and that normal processing is done.

(6) The mobile host sends to the home agent the Binding Update packet including the binding between the home address and the mobility agent address. Receiving the Binding Update packet, the home agent stores the binding between the home address and the mobility agent address and sends the Binding Acknowledgement packet to the mobile host. Receiving the Binding Acknowledgement packet, the mobile host recognizes that the Binding Update packet has arrived at the home agent and that normal processing is done.

(7) The mobile host sends to the correspondent host the Binding Update packet including the binding between the home address and the mobility agent address. The correspondent host receives the Binding Update packet and stores the Binding between the home address and the mobility agent address.

Figure 13:
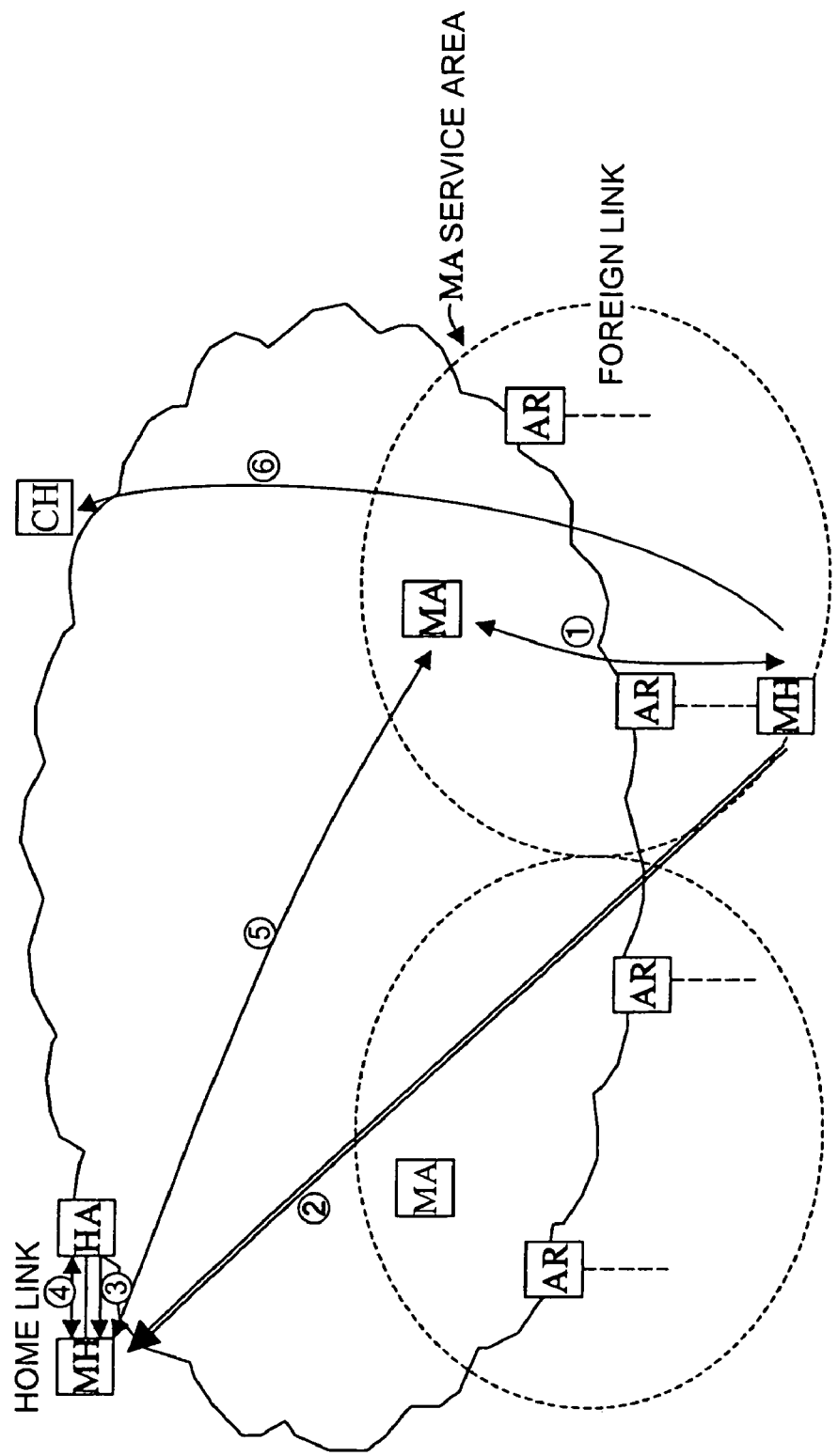
FIG. 13 is an example of operation carried out when in the active mode the mobile host moves from a foreign link to its home link.

FIG. 13 is an example of operation carried out when in the active mode the mobile host moves from the foreign link to the home link. The operation example will be described below on the basis of FIG. 13.

(1) The mobile host sends to the mobility agent the Binding Update packet including the binding between the home address and the home address and indicating that the operating mode is the active mode and that the buffering of packet is necessary. Receiving the Binding Update packet, the mobility agent stores the binding between the home address and the home address, the operating mode being the active mode, and the need for buffering of packet, and then sends the Binding Acknowledgement packet to the mobile host. Receiving the Binding Acknowledgement packet, the mobile host recognizes that the Binding Update packet has arrived at the previous mobility agent and that normal processing is done. After the mobility agent is notified of the necessity for buffering of packet by the mobile host and when the mobility agent receives an applicable packet from the home agent or the correspondent host, it buffers the packet addressed to the mobile host.

(2) The mobile host moves from the foreign link to the home link.

(3) The mobile host acknowledges the movement to the home link. For example, the mobile host can judge the movement from the foreign link to the home link by receiving Router Advertisement sent from the home agent.

(4) The mobile host sends to the home agent the Binding Update packet requesting to erase the stored binding between the home address and the mobility agent address. Receiving the Binding Update packet, the home agent erases the binding between the home address and the mobility agent address and sends the Binding Acknowledgement packet to the mobile host. Thereafter, the home agent stops the operation of receiving a packet instead of the mobile host and forwarding the packet to the mobility agent.

(5) The mobile host sends to the mobility agent used before the movement, the Binding Update packet including the binding between the home address and the home address and indicating that the operating mode is the active mode and that the buffering of packet is unnecessary. Receiving the Binding Update packet, the mobility agent stores the binding between the home address and the home address, the operating mode being the active mode, and no need for buffering of packet, and then sends the Binding Acknowledgement packet to the mobile host. Receiving the Binding Acknowledgement packet, the mobile host recognizes that the Binding Update packet has arrived at the previous mobility agent and that normal processing is done. When the mobility agent bears buffered packets, it sequentially sends the buffered packets to the mobile host according to the operation similar to FIG. 9 or FIG. 10.

(6) The mobile host sends to the correspondent host the Binding Update packet including the binding between the home address and the home address. Receiving the Binding Update packet, the correspondent host deletes the stored Binding between the home address and the mobility agent address. Thereafter, the correspondent host sends a packet addressed to the mobile host, in the form of the normal packet without the routing header option.

Figure 14:
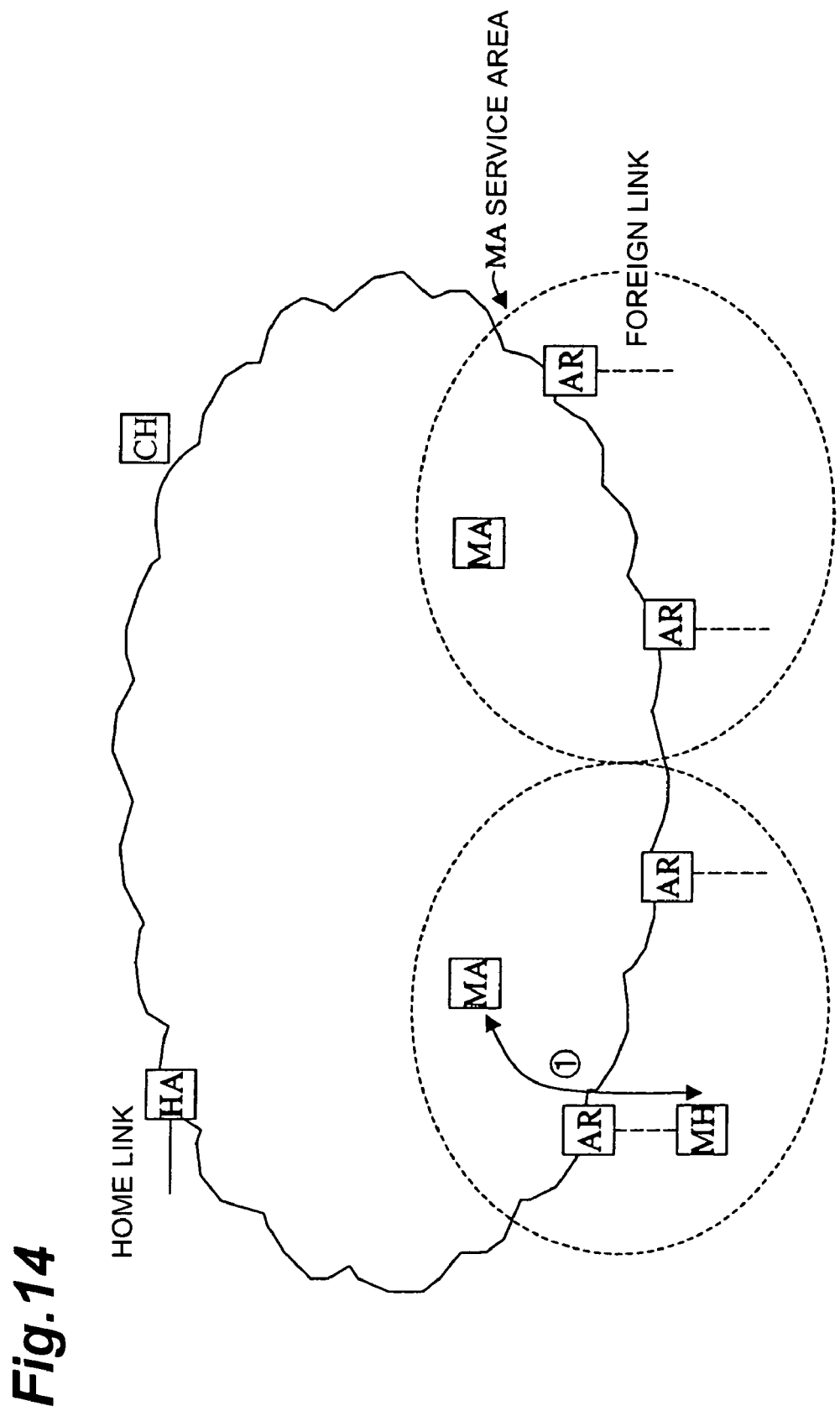
FIG. 14 is an example of operation of the packet communication system carried out when the operating mode transitions from the active mode to the idle mode.

FIG. 14 is an example of operation of the packet communication system carried out when the operating mode transitions from the active mode to the idle mode. The present operation example is executed when during the operating mode of the active mode the mobile host and the correspondent host receive or send no packet other than the Binding Update packet and the Binding Acknowledgement packet for a predetermined period of time. The operation example will be described below on the basis of FIG. 14.

(1) When the mobile host sends or receives no packet to or from the correspondent host for the predetermined period, it sends to the mobility agent the Binding Update packet including the binding between the home address and the c/o address and indicating that the operating mode is the idle mode and that the buffering of packet is necessary. Receiving the Binding Update packet, the mobility agent stores the binding and the operating mode being the idle mode, and then sends the Binding Acknowledgement packet to the mobile host. Receiving the Binding Acknowledgement packet, the mobile host recognizes that the Binding Update packet has arrived at the mobility agent and that normal processing is done.

Described on the basis of FIGS. 8 to 13 above were the operation examples in the active mode of the communication system of the present invention and FIG. 14 was an operation example of an operation mode transition from the active mode to the idle made. Before moving between foreign links, the mobile host sends the Binding Update packet to the mobility agent to make the mobility agent buffer packets to be forwarded to itself, receives the Binding Acknowledgement packet to receive all the packets addressed to itself, routed to the foreign link now under use, and then moves between foreign links. Further, after the movement between foreign links, the mobile host sends the Binding Update packet to the mobility agent to make the mobility agent route buffered packets to the foreign link of the moving destination. When the same mobility agent is used before and after the movement between the foreign links, the mobile host is required merely to send the Binding Update packet to only the mobility agent, but does not have to send it to the home agent and the correspondent host.

Figure 15:
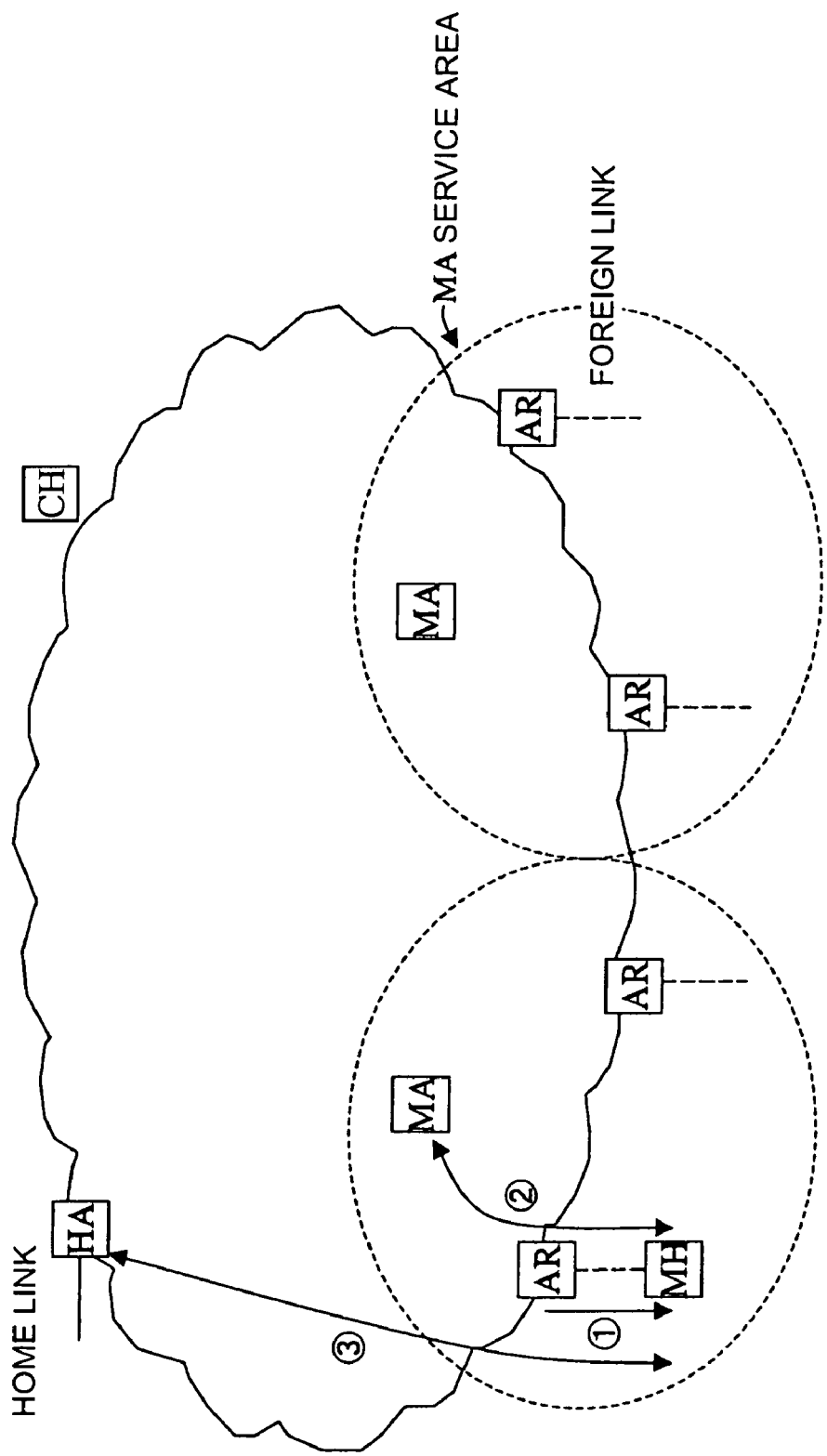
FIG. 15 is an example of operation of the packet communication system carried out when in the idle mode the mobile host moves from its home link to a foreign link.

FIG. 15 is an example of operation of the packet communication system carried out when in the idle mode the mobile host moves from the home link to a foreign link. The operation example will be described below on the basis of FIG. 15.

(1) After the mobile host has moved from the home link to the foreign link, it acquires a c/o address and an address of a mobility agent from an access router.

(2) The mobile host sends to the mobility agent the Binding Update packet including the binding between the home address and the c/o address and indicating that the operating mode is the idle mode and that the buffering of packet is necessary. Receiving the Binding Update packet, the mobility agent stores the binding between the home address and the c/o address, the operating mode being the idle mode, and the need for buffering of packet, and then sends the Binding Acknowledgement packet to the mobile host. Receiving the Binding Acknowledgement packet, the mobile host recognizes that the Binding Update packet has arrived at the mobility agent and that normal processing is done.

(3) The mobile host sends to the home agent the Binding Update packet including the binding between the home address and the mobility agent address. Receiving the Binding Update packet, the home agent stores the binding between the home address and the mobility agent address and sends the Binding Acknowledgement packet to the mobile host. Receiving the Binding Acknowledgement packet, the mobile host recognizes that the Binding Update packet has arrived at the home agent and that normal processing is done.

Figure 16:
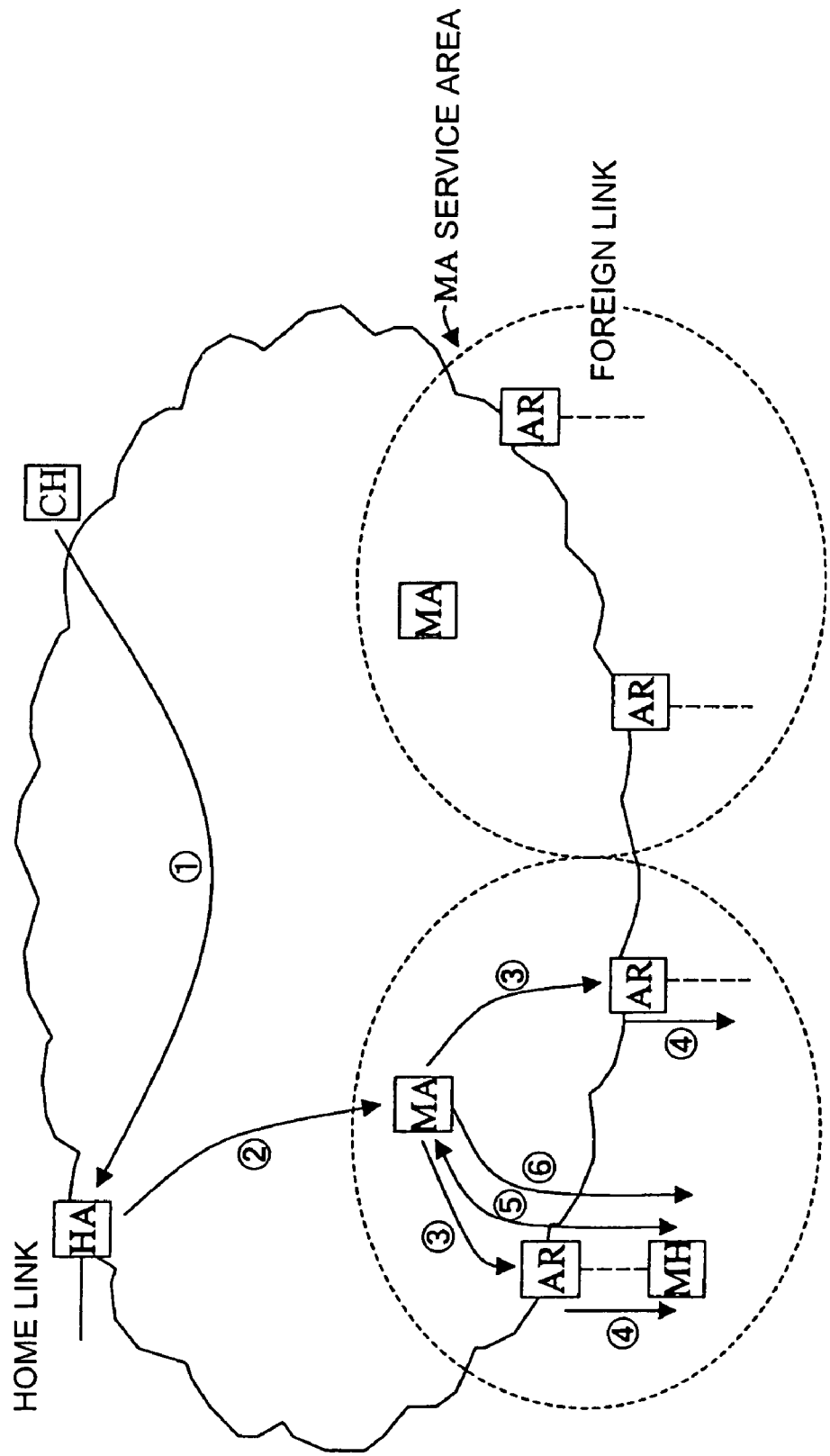
FIG. 16 is an example of operation of the packet communication system carried out when the operating mode transitions from the idle mode to the active mode.

FIG. 16 is an example of operation carried out when in the idle mode, before the correspondent host receives the Binding Update packet from the mobile host, the correspondent host sends a packet to the mobile host. The operation example will be described below on the basis of FIG. 16.

(1) The correspondent host sends the packet the destination of which is the home address of the mobile host. The packet is routed to the home link by the routers in the network.

(2) When the destination of the packet is the home address of the binding, the home agent of the home link receives the packet instead of the mobile host, generates a tunneling packet the destination of which is the address of the mobility agent of the binding, puts the received packet into the payload of the tunneling packet, and sends it. The tunneling packet is routed to the mobility agent by the routers in the network.

(3) Receiving the tunneling packet from the home agent, the mobility agent extracts the packet from the payload. When the destination of the extracted packet matches with the home address of the binding, the mobility agent buffers the packet and sends Paging Request including the home address of the mobile host, to the access routers in the area.

(4) Receiving the Paging Request from the mobility agent, the access routers send to the foreign links Paging Notification in which the home address included in the Paging Request is set. The mobile host receives the Paging Notification from the access router.

(5) The mobile host judges whether the received Paging Notification includes its own home address. Without inclusion of the home address, the mobile host discards the received Paging Notification. With inclusion of the home address, the mobile host sends the Binding Update packet including the binding between the home address and the c/o address and indicating that the operating mode is the active mode and that the buffering of packet is unnecessary. The mobility agent receives the Binding Update packet, stores the binding between the home address and the c/o address, the operating mode being the active mode, and no need for buffering of packet, and then sends the Binding Acknowledgement packet to the mobile host. Receiving the Binding Acknowledgement packet, the mobile host recognizes that the Binding Update packet has arrived at the mobility agent and that normal processing is done.

(6) The mobility agent puts each buffered packet into the payload of the tunneling packet the destination of which is the c/o address of the binding, and sends the tunneling packet. The tunneling packet is routed to the mobile host by the routers in the network. Receiving the tunneling packet from the mobility agent, the mobile host extracts the packet from the payload to receive the packet directed to its own home address at last.

Figure 17:
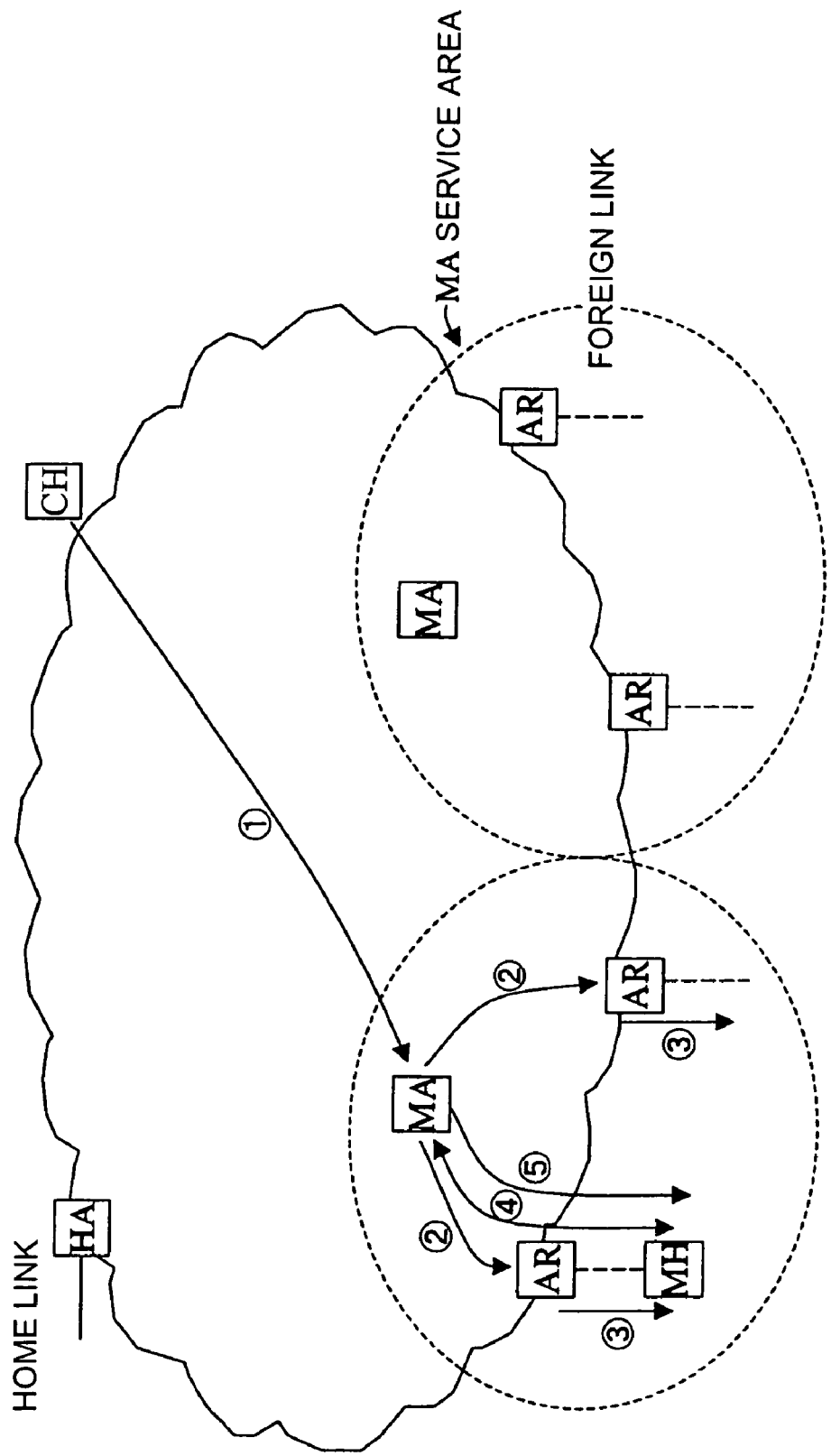
FIG. 17 is an example of operation carried out when in the idle mode the correspondent host sends a packet to the mobile host before the correspondent host receives the Binding Update packet from the mobile host.

FIG. 17 is an example of operation carried out when in the idle mode, after the correspondent host receives the Binding Update packet from the mobile host, the correspondent host sends a packet to the mobile host. The operation example will be described below on the basis of FIG. 17.

(1) When the correspondent host sends the packet directed to the home address indicated by the stored binding, it sets the c/o address as the destination of the packet, puts the routing header option in which the home address of the binding is set, into the packet, and sends the packet. The packet is routed to the mobility agent by the routers in the network.

(2) The mobility agent receives the packet from the correspondent host. When the home address included in the routing header option matches with the home address of the binding, the mobility agent interchanges the destination of the packet and the home address included in the routing header option, with each other, buffers the packet, and sends Paging Request including the home address of the mobile host, to the access routers in the area.

(3) The access routers receive the Paging Request from the mobility agent, and send to the foreign links Paging Notification in which the home address included in the Paging Request is set. The mobile host receives the Paging Notification from the access router.

(4) The mobile host judges whether the received Paging Notification includes its own home address. Without inclusion of the home address, the mobile host discards the received Paging Notification. With inclusion of the home address, the mobile host sends the Binding Update packet including the binding between the home address and the c/o address and indicating that the operating mode is the active mode and that the buffering of packet is unnecessary. The mobility agent receives the Binding Update packet, stores the binding between the home address and the c/o address, the operating mode being the active mode, and no need for buffering of packet, and then sends the Binding Acknowledgement packet to the mobile host. Receiving the Binding Acknowledgement packet, the mobile host recognizes that the Binding Update packet has arrived at the mobility agent and that normal processing is done.

(5) The mobility agent puts each buffered packet into the payload of the tunneling packet the destination of which is the c/o address of the binding, and sends the tunneling packet. The tunneling packet is routed to the mobile host by the routers in the network. Receiving the tunneling packet from the mobility agent, the mobile host extracts the packet from the payload to receive the packet directed to its own home address at last.

Figure 18:
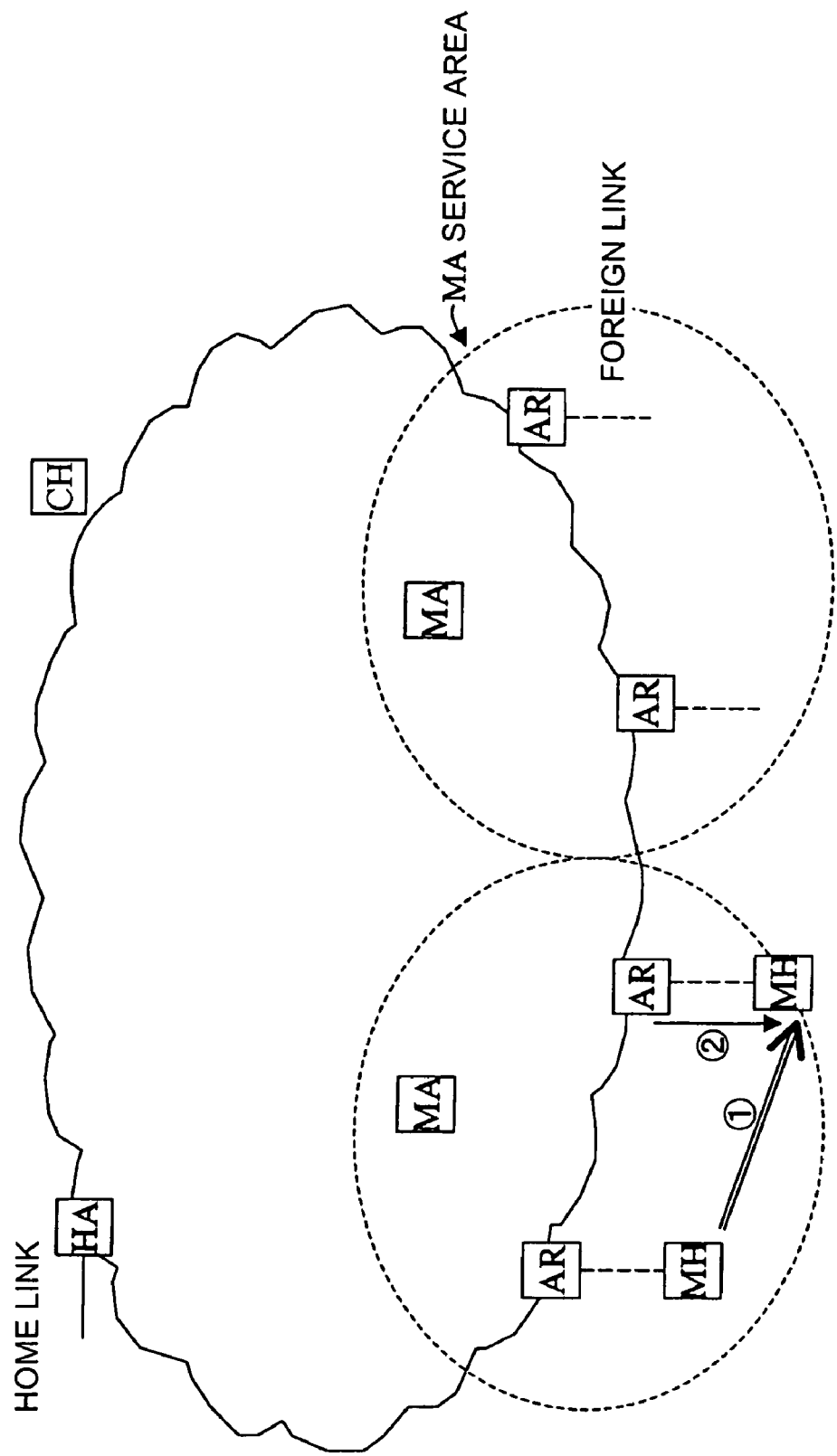
FIG. 18 is an example of operation carried out when in the idle mode the correspondent host sends a packet to the mobile host after the correspondent host receives the Binding Update packet from the mobile host.

FIG. 18 is an example of operation carried out when in the idle mode the mobile host moves between foreign links provided by access routers in the area of the same mobility agent. The operation example will be described below on the basis of FIG. 18.

(1) The mobile host moves between foreign links.

(2) After the mobile host has moved to the other foreign link, it acquires a c/o address and an address of a mobility agent from an access router. The mobile host judges whether there is change in the address of the mobility agent, and performs nothing without any change.

Figure 19:
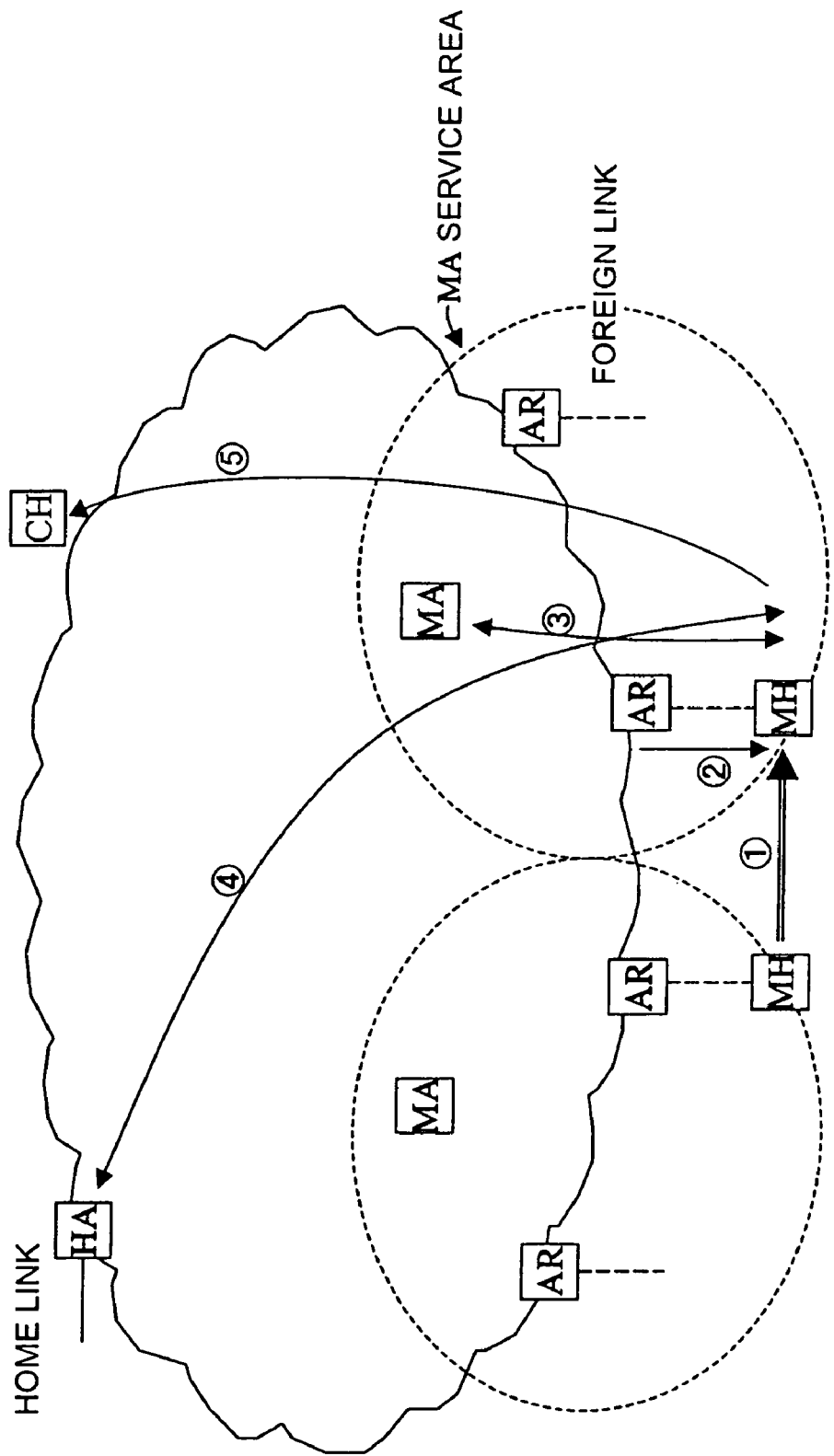
FIG. 19 is an example of operation carried out when in the idle mode the mobile host moves between foreign links provided by access routers in an area of an identical mobility agent.

FIG. 19 is an example of operation carried out when in the idle mode the mobile host moves to a foreign link provided by an access router in an area of a different mobility agent. The operation example will be described below on the basis of FIG. 19.

(1) The mobile host moves between foreign links.

(2) After the mobile host has moved to the other foreign link, it acquires a c/o address and an address of a mobility agent from an access router.

(3) The mobile host judges whether there is change in the address of the mobility agent. With change, the mobile host sends to the mobility agent Binding Update including the binding between the home address and the c/o address and indicating that the operating mode is the idle mode and that the buffering of packet is necessary. Receiving the Binding Update, the mobility agent stores the binding between the home address and the c/o address and the operating mode being the idle mode, and then sends the Binding Acknowledgement packet to the mobile host. Receiving the Binding Acknowledgement packet, the mobile host recognizes that the Binding Update packet has arrived at the mobility agent and that normal processing is done.

(4) Further, the mobile host sends to the home agent Binding Update including the binding between the home address and the mobility agent address. Receiving the Binding Update, the home agent stores the binding between the home address and the mobility agent and then sends the Binding Acknowledgement packet to the mobile host. Receiving the Binding Acknowledgement packet, the mobile host recognizes that the Binding Update packet has arrived at the home agent and that normal processing is done.

(5) The mobile host sends to the correspondent host the Binding Update packet including the binding between the home address and the mobility agent address. Receiving the Binding Update packet, the correspondent host stores the Binding between the home address and the mobility agent address.

Figure 20:
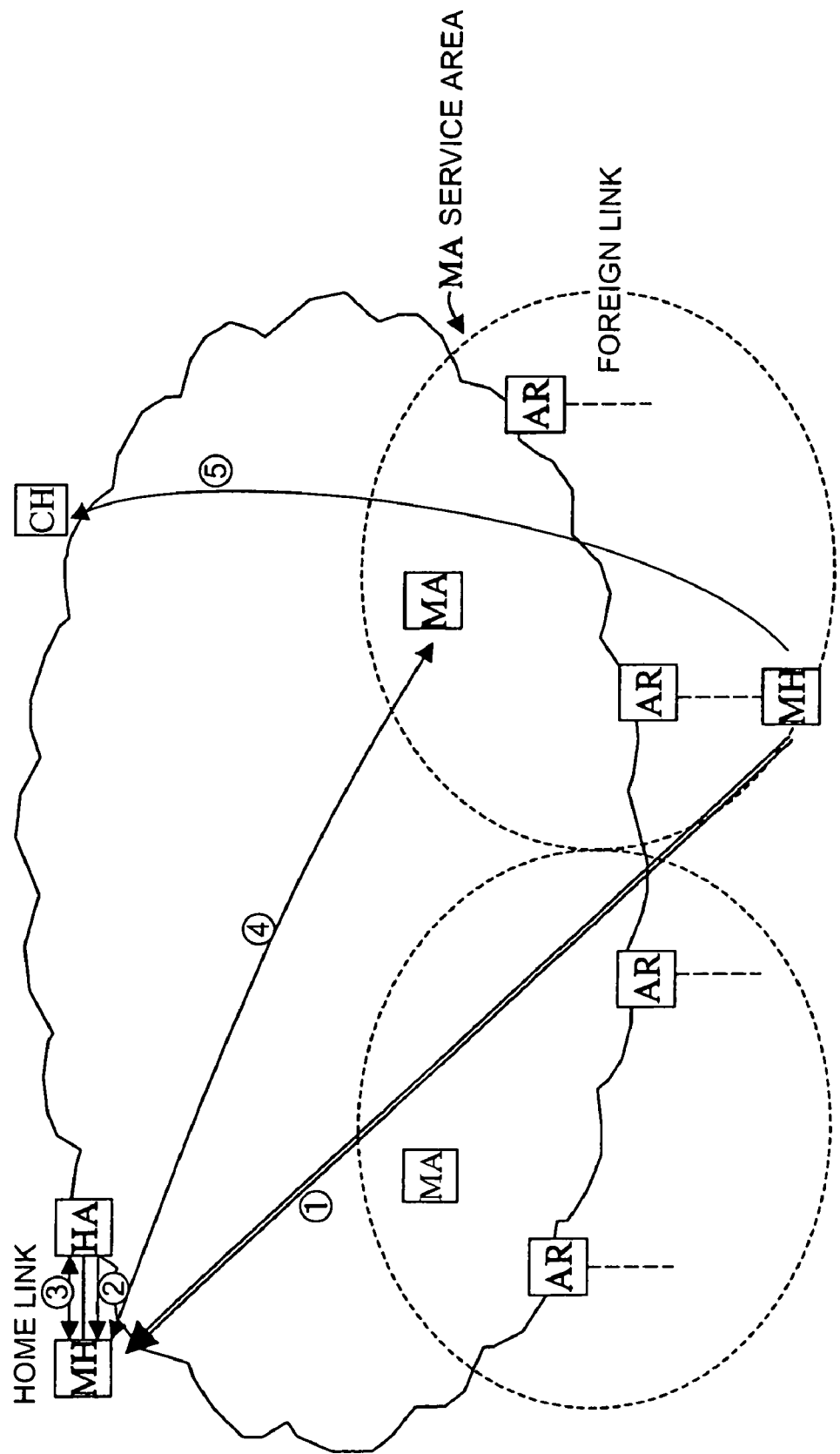
FIG. 20 is an example of operation carried out when in the idle mode the mobile host moves to a foreign link provided by an access router in an area of a different mobility agent.

FIG. 20 is an example of operation carried out when in the idle mode the mobile host moves from the foreign link to the home link. The operation example will be described below on the basis of FIG. 20.

(1) The mobile host moves from the foreign link to the home link.

(2) The mobile host acknowledges the movement to the home link. For example, the mobile host can judge the movement from the foreign link to the home link by receiving Router Advertisement sent from the home agent.

(3) The mobile host sends to the home agent the Binding Update packet requesting to erase the stored binding between the home address and the mobility agent address. Receiving the Binding Update packet, the home agent erases the binding between the home address and the mobility agent address and sends the Binding Acknowledgement packet to the mobile host. Thereafter, the home agent stops the operation of forwarding the packet to the mobility agent.

(4) The mobile host sends to the previous mobility agent the Binding Update packet including the binding between the home address and the home address and indicating that the operating mode is the active mode and that the buffering of packet is unnecessary. Receiving the Binding Update packet, the previous mobility agent stores the binding between the home address and the home address, the operating mode being the active mode, and no need for buffering of packet, and then sends the Binding Acknowledgement packet to the mobile host. Receiving the Binding Acknowledgement packet, the mobile host recognizes that the Binding Update packet has arrived at the previous mobility agent and that normal processing is done.

(5) The mobile host sends to the correspondent host the Binding Update packet including the binding between the home address and the home address. Receiving the Binding Update packet, the correspondent host deletes the stored Binding between the home address and the mobility agent address. Thereafter, the correspondent host sends a packet addressed to the mobile host, in the form of the normal packet without the routing header option.

Figure 21:
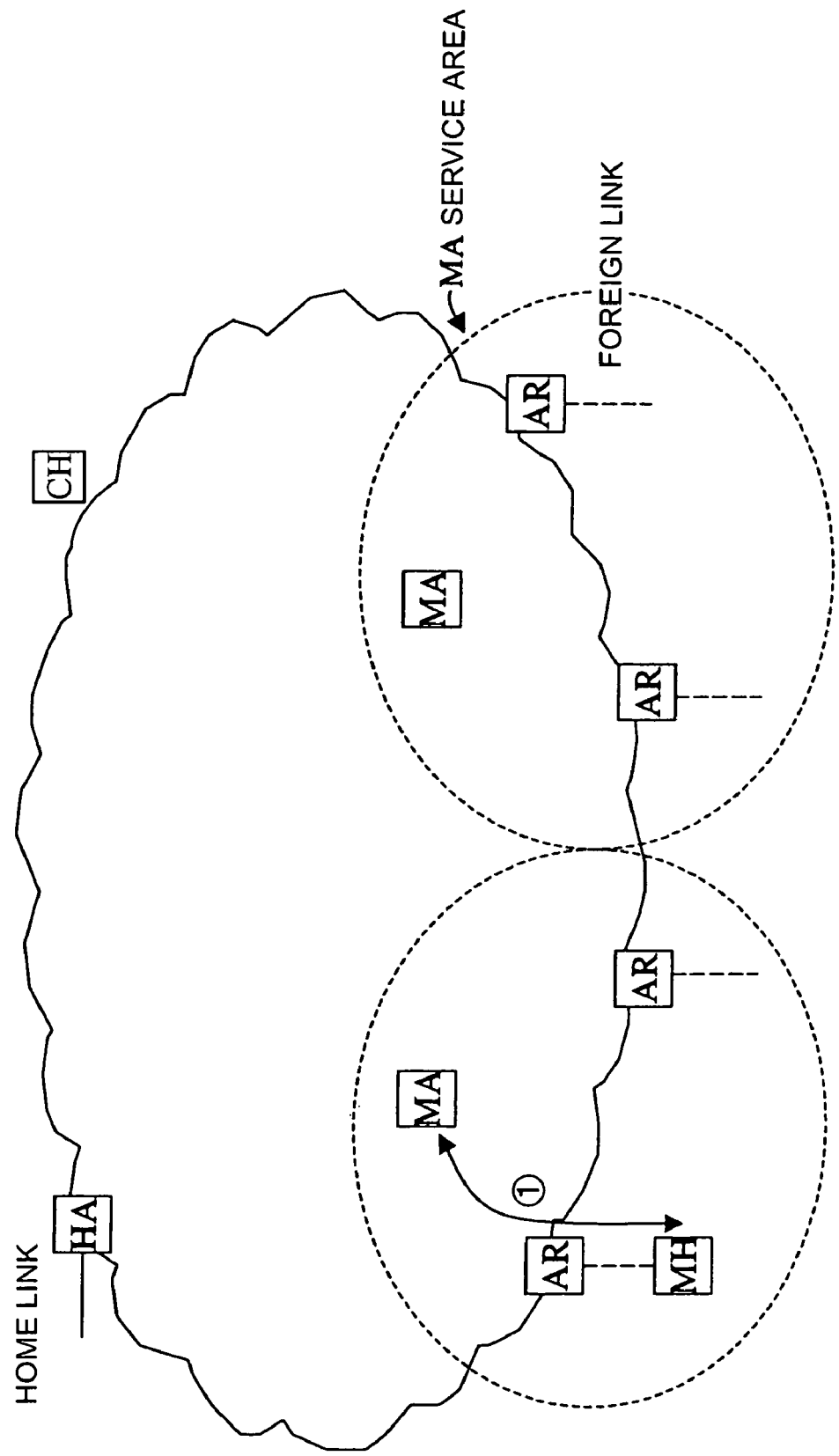
FIG. 21 is an example of operation carried out when in the idle mode the mobile host moves from a foreign link to its home link.

FIG. 21 is an example of operation of the packet communication system carried out when the operating mode transitions from the idle mode to the active mode. The present operation example is executed when during the operating mode of the idle mode the mobile host sends a packet to the correspondent host. The operation example will be described below on the basis of FIG. 21.

(1) The mobile host sends to the mobility agent address the Binding Update packet including the binding between the home address and the c/o address and indicating that the operating mode is the active mode and that the buffering of packet is unnecessary. Receiving the Binding Update packet, the mobility agent stores the binding between the home address and the c/o address, the operating mode being active mode, and no need for buffering of packet, and then sends the Binding Acknowledgement packet to the mobile host. Receiving the Binding Acknowledgement packet, the mobile host recognizes that the Binding Update packet has arrived at the mobility agent and that normal processing is done.

Described on the basis of FIGS. 15 to 21 above were the operation examples in the idle mode of the packet communication system of the present invention. When the mobile host moves between foreign links present in an area of one mobility agent, it does not have to send the Binding Update packet to either of the mobility agent, the home agent, and the correspondent host.

The structures and the operations of mobility agent, mobile host and host agent for the packet communication system will be explained.

Figure 22:
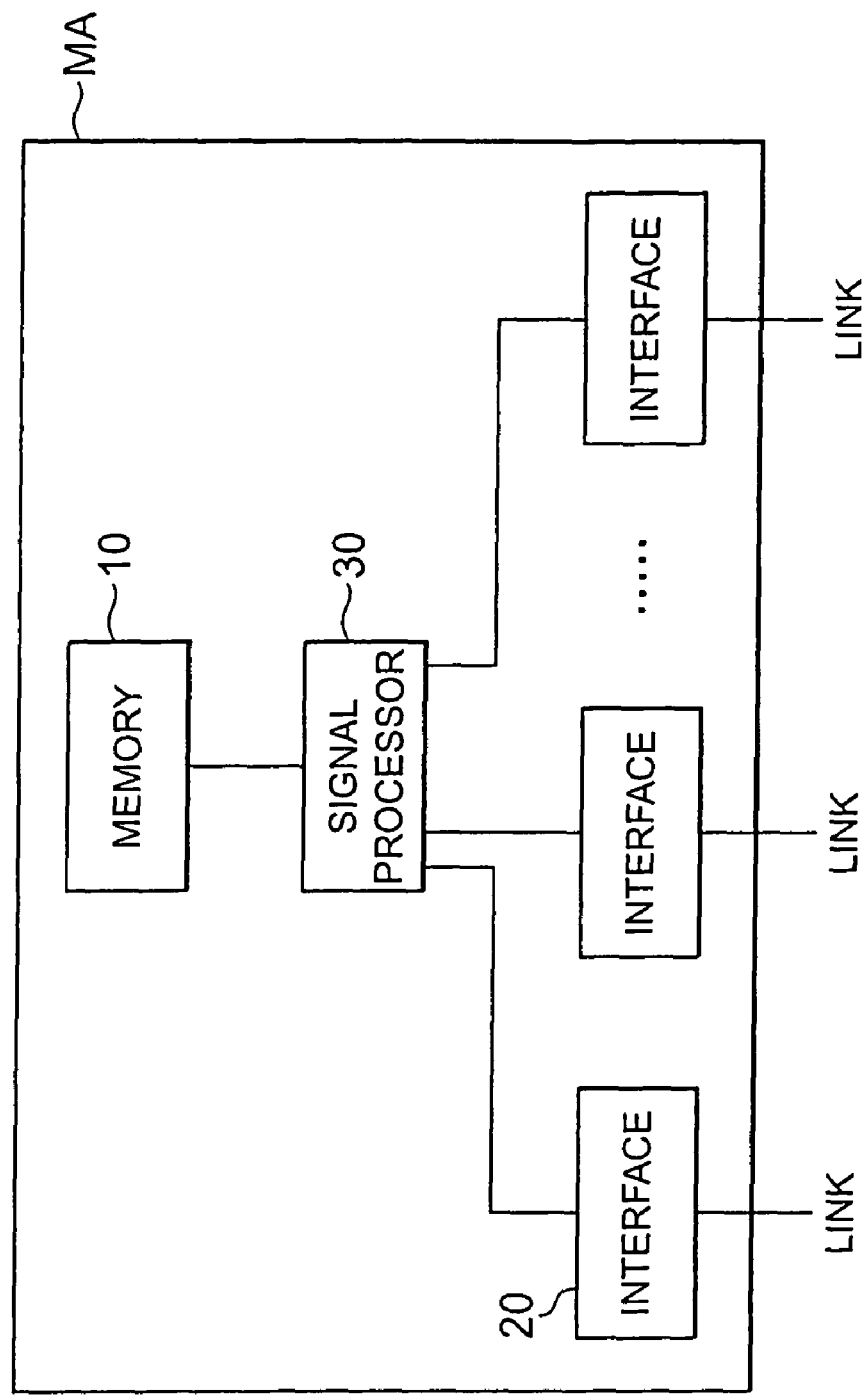
FIG. 22 is a diagram showing a configuration of a mobility agent used in the packet communication system according to the embodiment of the present invention.

FIG. 22 is a diagram showing a configuration of the mobility agent.

As shown in FIG. 22, the mobility agent MA used in the packet communication system comprises a memory 10 for performing storing of a binding and buffering of the received packet, an interface 20 for receiving a packet from the connected link and sending a packet, signal processor 30 for controlling the interface 20 to control Binding Update Packet processing and routing thereof. The signal processor 30 forwards Binding Update Packet received in the interface 20 to the memory 10 and causes the memory 10 store the Binding Update Packet, and further performs buffering in the memory 10 and sending of the packet buffered in the memory 10 to link through the interface 30 based on the Binding Update Packet stored in the memory 10.

Figure 23A:
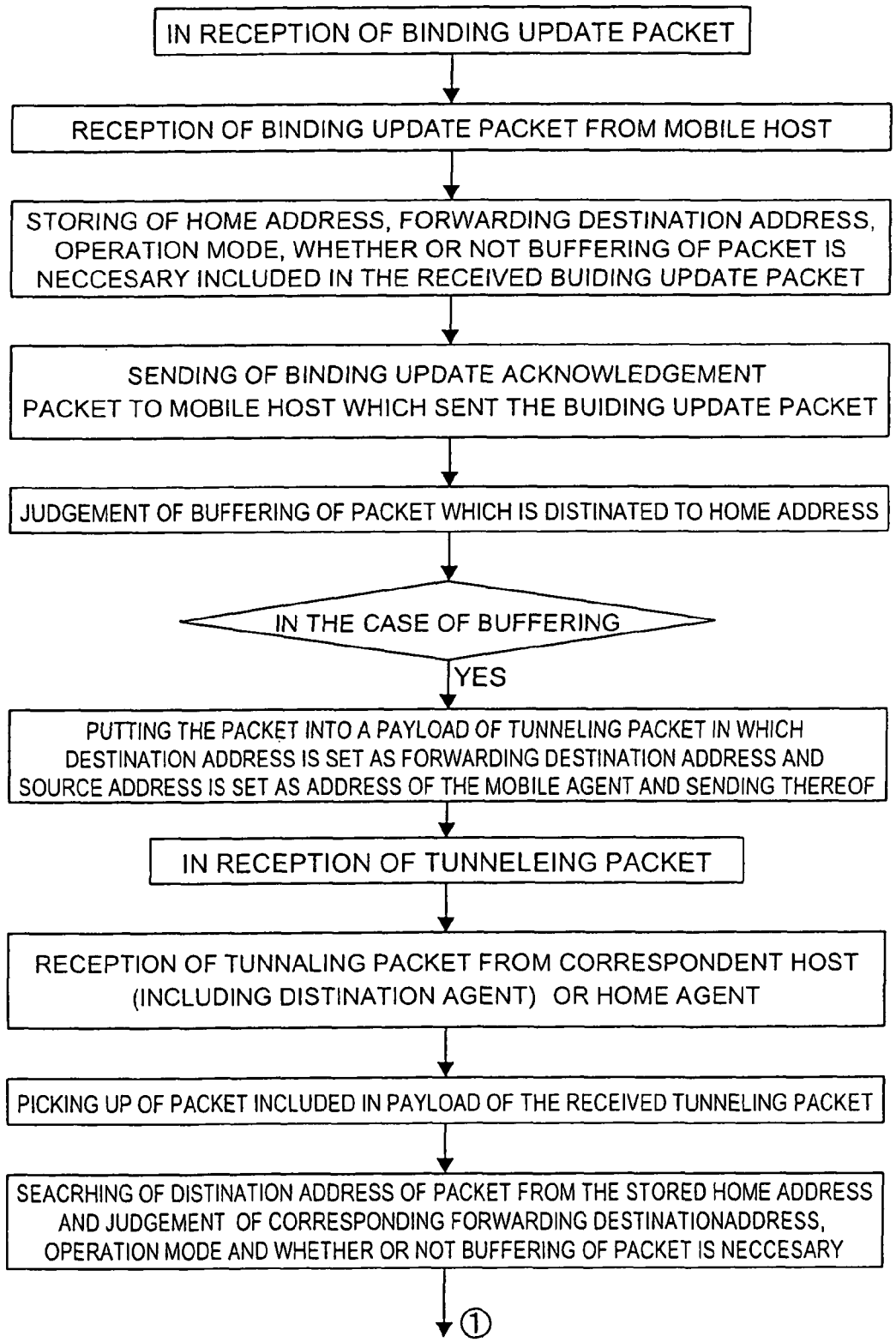
FIGS. 23A and 23B are flow-charts of the operation of the mobility agent.
Figure 23B:
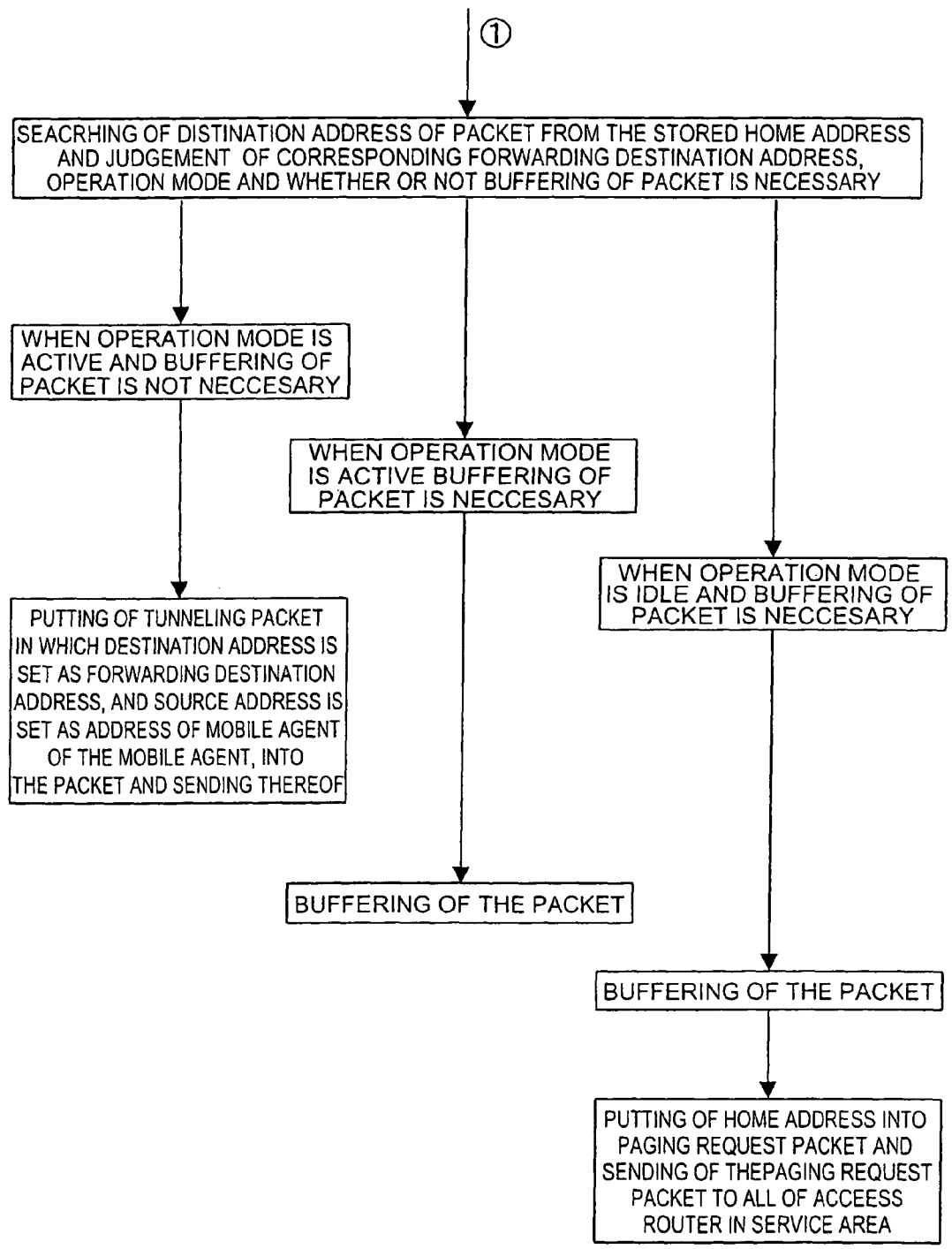

Next, the operations of the mobility agent in the packet communication system as shown in FIG. 22 will be explained referring to FIGS. 23A and 23B. FIGS. 23A and 23B are a flow chart of the operations of the mobility agent. As shown in FIGS. 23A and 23B, the operation of the mobility agent is divided into the operation in reception of Binding Update Packet, and the operation in the reception of a tunneling packet. Receiving Binding Update packet from mobile host, the mobility agent stores information relating home address, forwarding destination address, operation mode and whether or not buffering of a packet is necessary in the memory 10.

The signal processor 10 of the mobility agent sends Binding Acknowledgment Packet indicating the completion of the storing to the mobility host which sent Binding Update Packet through the interface 20. The mobility agent judges whether or not packet directed to home address is buffered in the memory 10, and when the packet directed to home address is buffered, the mobility agent puts the packet into a payload of a tunneling packet in which destination address is set as forwarding destination address, original address is set as home address of the mobility agent and send it to mobile host designated by the home address.

Further when the mobility agent receives a tunneling packet from the correspondent host (including mobility agent) or home agent, the mobility agent picks up a packet included in the payload of the received tunneling packet, searches destination address of the packet from the stored home address and judges the correspondent forwarding destination address, operation mode and whether or not buffering of a packet is necessary to perform the operations according to the following three cases.

1) When the operation mode is active and buffering of a packet is not necessary;

The mobility agent puts the packet into a payload of a tunnel packet in which destination address is set as forwarding destination address, and the original address is set as address of the mobility agent and send it.

2) When the operation mode is active and buffering of a packet is necessary;

The mobility agent performs buffering of the received packet.

Figure 24:
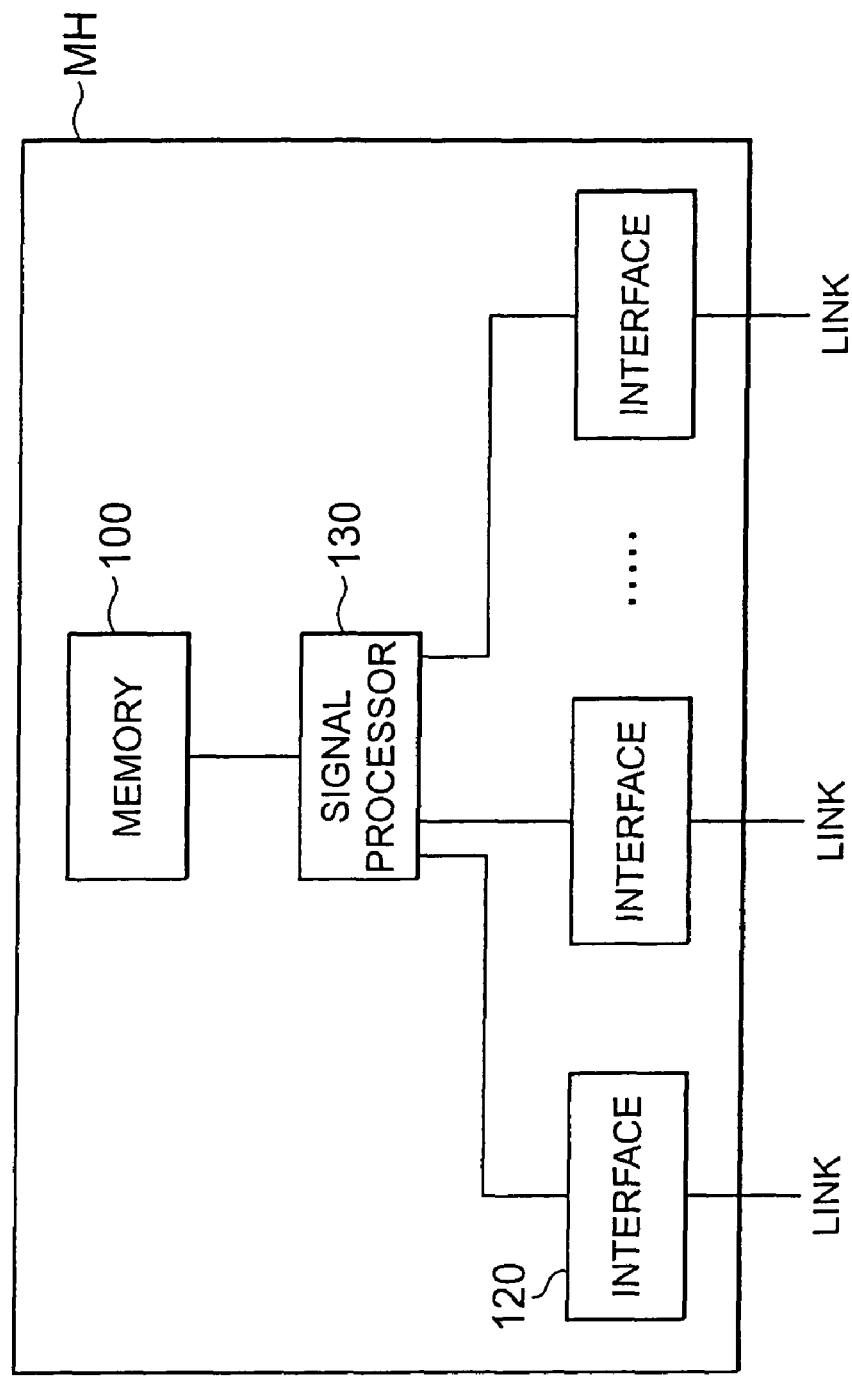
FIG. 24 is a diagram showing a configuration of a mobile host used in the packet communication system according to the embodiment of the present invention.

3) When the operation mode is idle and buffering of a packet is necessary;

The mobility agent performs buffering of the received packet, puts home address into Paging Request packet and send the Paging Request Packet to all routers in service area. In this operations of the mobility agent, the above stated packet communication system functions as a whole. FIG. 24 is a diagram showing a configuration of mobile host. As shown in FIG. 24, the mobile host used in the packet communication system comprises a memory 100 for storing information in Binding Update Packet including the operation mode of the mobile host, whether or not buffering to the used mobility agent is necessary, home address, and correspondence to c/o address, an inter face 120 for receiving a packet from the connected link and sending the packet to a link, and a signal processor 130 for controlling the interface 120 and the memory 100 to control Binding Update Packet processing and generation/reception of a packet. The signal processor 130 may perform processing of an application executing an application program stored in the memory 100 of the mobile host.

Figure 25A:
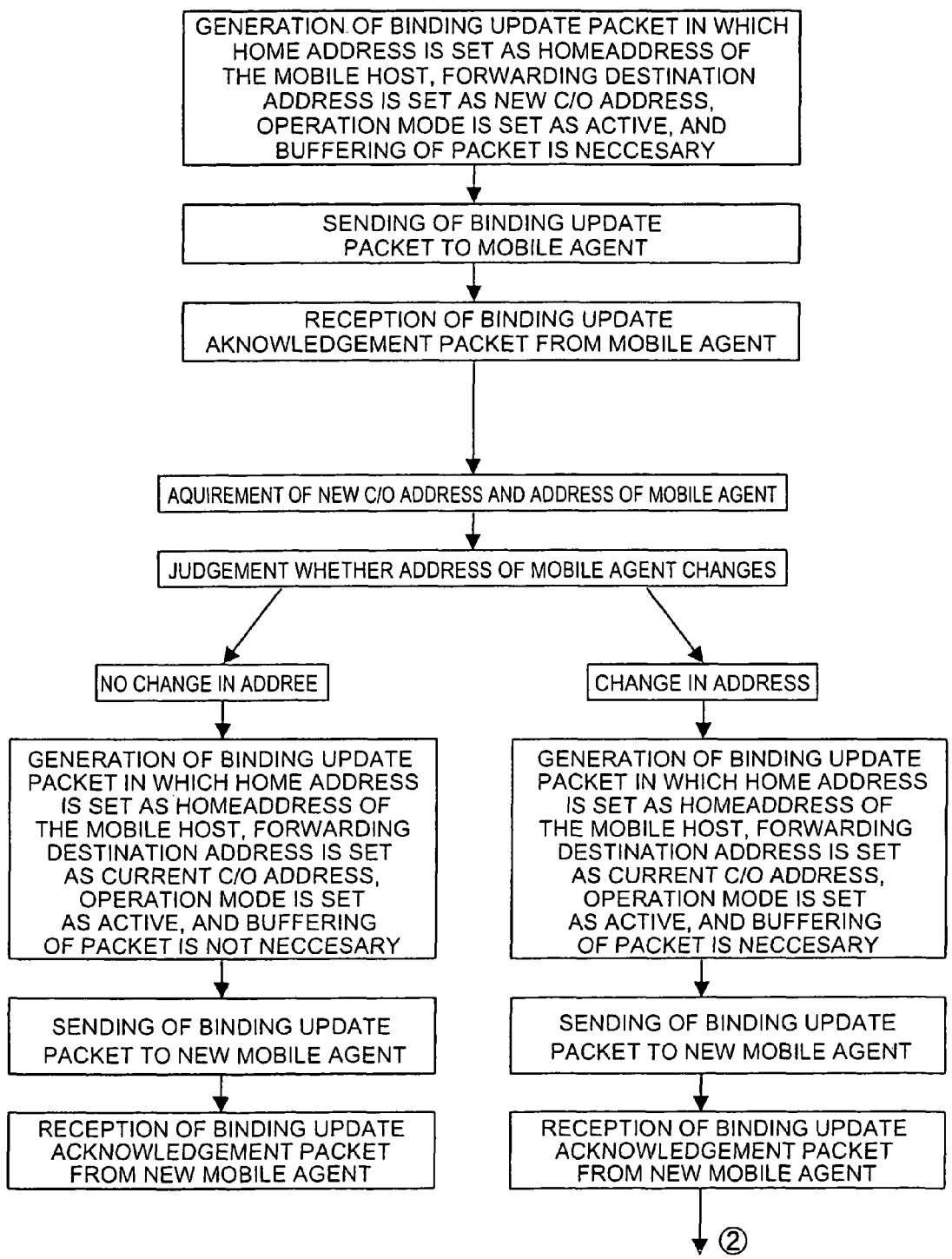
FIGS. 25A and 25B show the operation of the mobile host.
Figure 25B:
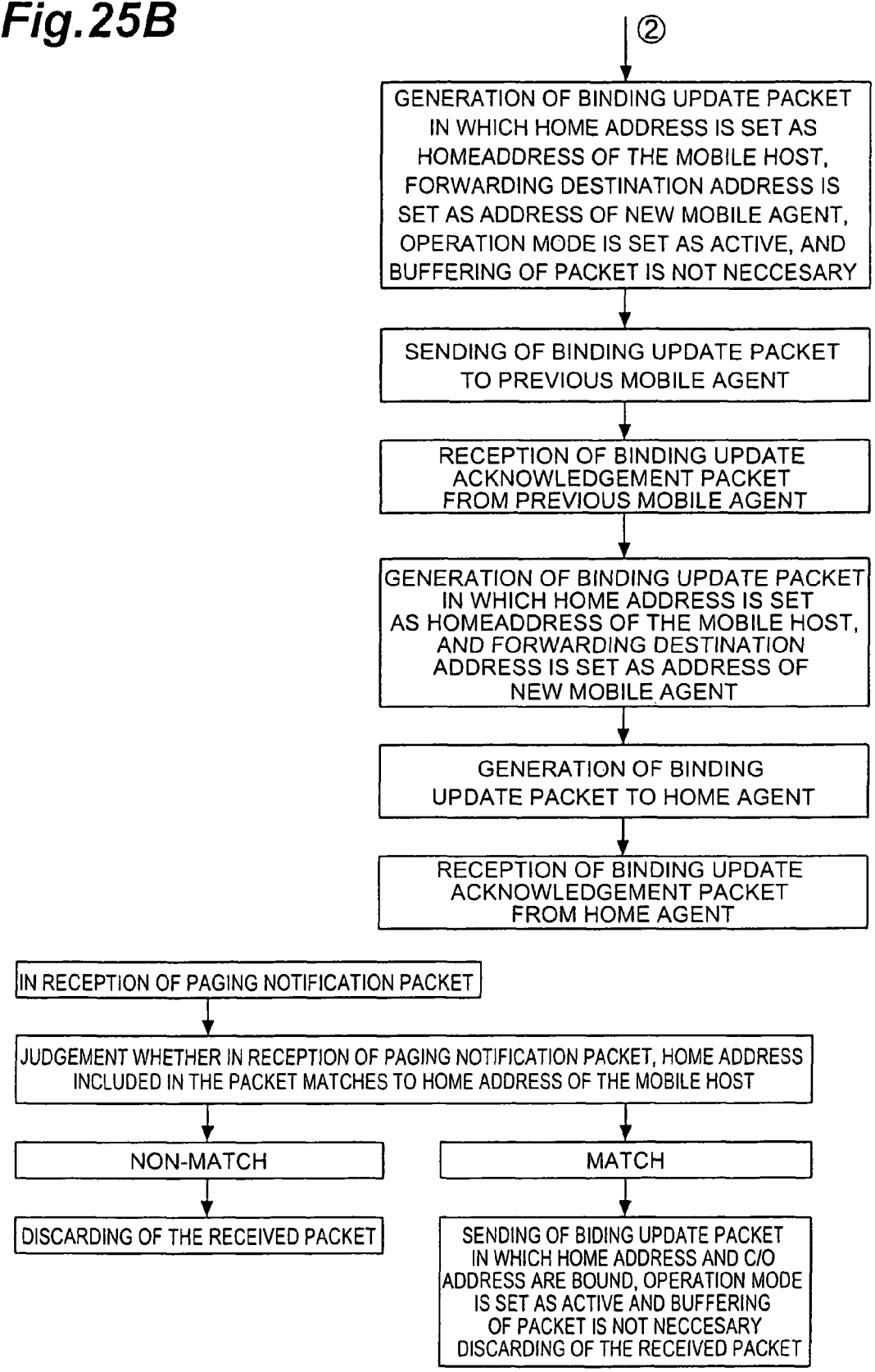

FIGS. 25A and 25B are a flow chart of the operations of the mobile host.

As shown in FIGS. 25A and 25B, the operation of the mobile host is divided into the operation in movement of between links, and the operation when the mobile host receives Paging Notification Packet.

In the movement between links, before movement of the mobile host, the mobile host generates Binding Update packet in which home address is set as home address of the mobile host, forwarding destination address is set as the currently used c/o address and the operation mode is set as active, and buffering of a packet is set as necessary, sends the generated Binding Update Packet to current mobility agents and receives Binding Update Acknowledgement Packet from the mobility agents.

Next, after the mobile host has moved to another link, the mobile host obtains new c/0 address in the another link and addresses of mobility agent and judges whether or not the address of the mobility agents changes. The mobile host perfumes the following two different processes on the basis of this judgment.

1) In the case that the address of the mobility agent does not change:

In this case, the mobile host generates Binding Update packet in which home address is set as home address of the mobile host, forwarding destination address is set as new c/o address, operation mode is set as active, and buffering of a packet is set as no necessary.

Next, the mobile host sends the Binding Update Packet to new mobility agent and receives Binding Update Acknowledgement packet from new mobility agent.

2) In the case that the address of the mobility agent changes:

In this case, the mobile host generates Binding Update packet in which home address is set as home address of the mobile host, forwarding destination address is set as new c/o address, operation mode is set as active, and buffering of a packet is set as necessary.

Next, the mobile host sends the Binding Update Packet to new mobility agent and receives Binding Update Acknowledgement packet from new mobility agent in response to this sending. At the same time, the mobile host generates Binding Update packet in which home address is set as home address of the mobile host, forwarding destination address is set as address of new mobility agent, operation mode is set as active, and buffering of a packet is set as no necessary, and the mobile host sends the Binding Update Packet to the previous mobility agent and receives Binding Update Acknowledgement packet showing the conformation of reception of the Binding Update Packet from the previous mobility agent. And, to home agent, the mobile host generates Binding Update packet in which home address is set as home address of the mobile host, and forwarding destination address is set as new c/o address, and the mobile host sends the Binding Update Packet to the home agent and receives Binding Update Acknowledgement packet showing the conformation of reception of the Binding Update Packet from the home agent. It is possible to set the above forwarding destination address as address of new mobility agent. Further, although in the above operation, after the sending of Binding Update Packet to the previous mobility agent used before the movement between links and reception of Binding Acknowledgement Packet from the previous mobility agent used before movement between links, sending of Binding Update Packet to home agent and reception of Binding Acknowledgement packet from home agent are sequentially performed, these operations may be performed at the same time in order to shorten the operation time of the mobile host.

Next, the operation when the mobile host receives Paging Notification Packet will be explained. As shown in FIGS. 25A and 25B, when the mobile host receives Paging Notification packet, the signal processor 130 of the mobile host judges whether or not the destination of the received Paging Notification Packet matches with home address of the mobile host, and when the destination of the received Paging Notification Packet does not match with home address of the mobile host, the mobile host discard the received packet and when the destination of the received Paging Notification Packet matches with home address of the mobile host, the mobile host sends Binding Update Packet in which home address is bound to c/o address, operation mode is set as active, and buffering of a packet is set as necessary to mobility agent.

Figure 26:
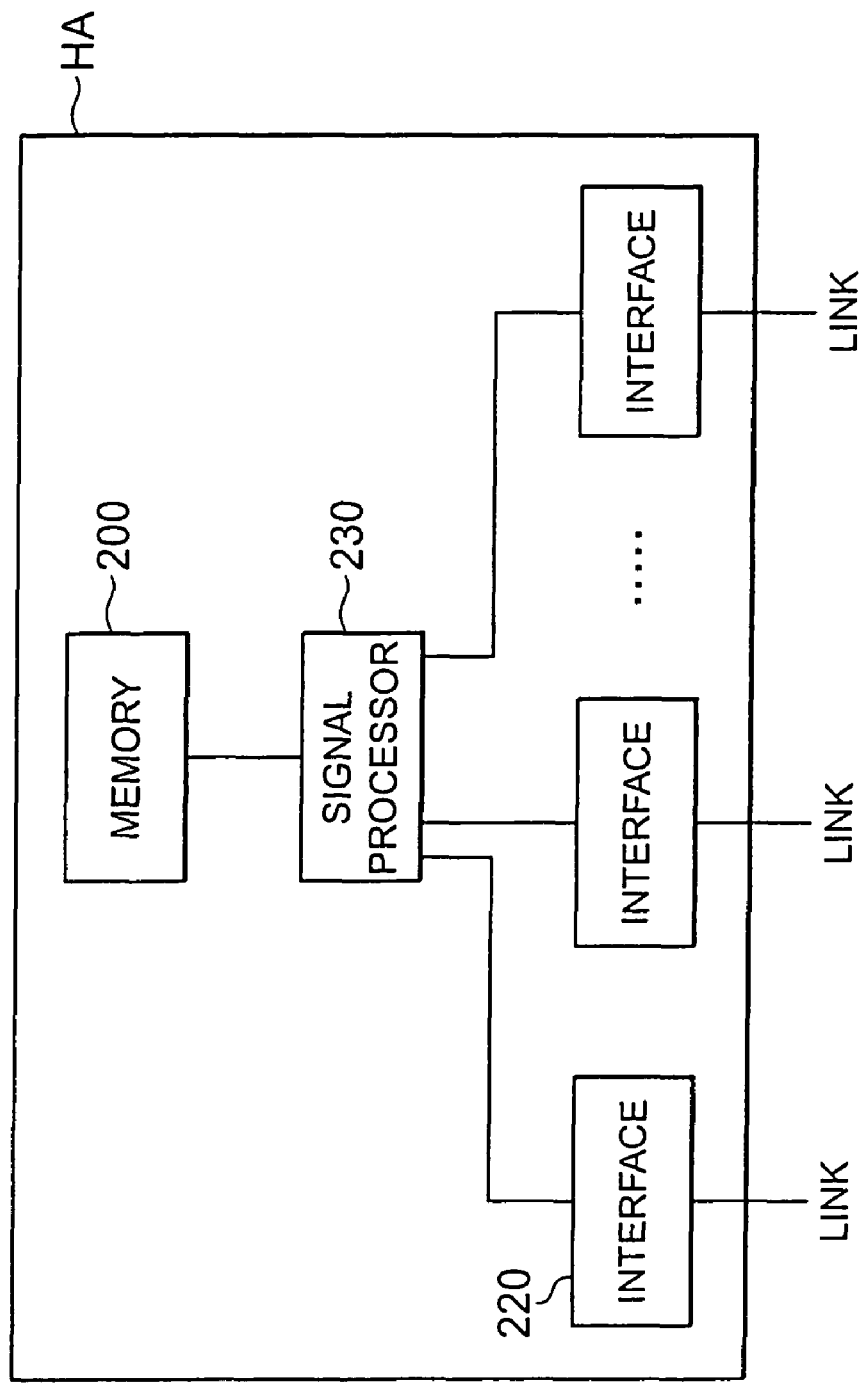
FIG. 26 is a diagram showing a configuration of a home agent used in the packet communication system according to the embodiment of the present invention.

FIG. 26 is a diagram showing a configuration of home agent. Home agent used in the packet communication system of the present invention, comprises a memory 210 for performing storing of binding, an interface 220 for performing reception of a packet from the connected link and sending of the packet to the link, and a signal processor 230 for controlling the interface 220 to control Binding Update Packet process and routing of a packet. The signal processor 230 forwards Binding Update Packet received in the interface 220 to the memory 210 to cause the memory 210 store the received Binding Update Packet and further performs sending of the received packet to the link through the interface 220 on the basis of the Binding stored in the memory 210.

And, when the home agent HA receives a packet, the home agent judges whether the destination of the received packet matches with home address of the binding, and when the destination of the received packet matches with the address of the binding, the home agent receives the packet in the interface 220 instead of mobile host. Nest, the mobile host generates a tunneling packet of which destination is address of mobility agent of the binding in the signal processor 230 and incorporates the received packet into payload of the tunneling packet. And the mobile host sends the tunneling packet to a link through the interface 220. Further, when the mobile host receives Binding Update Packet requesting to delete the binding between the stored home address and address of the mobility agent from mobile host, the signal processor 230 deletes the blinding between home address of the mobile host stirred in the memory 210 and the mobility agent, and after the deletion of the binding, sends Binding Acknowledgement Packet to the mobile host through the interface 220. In the operation, thereafter, the home agent receives packet instead of mobile host and does not perform sending operation of packet to the mobility agent. Further, receiving Binding Update Packet including the correspondence between home address and address of mobility agent in the interface 220, the home agent HA stores the correspondence between the home address and address of mobility agent in the memory 219 and sends Binding Acknowledgement Packet to mobile host which sent the packet.

Figure 27:
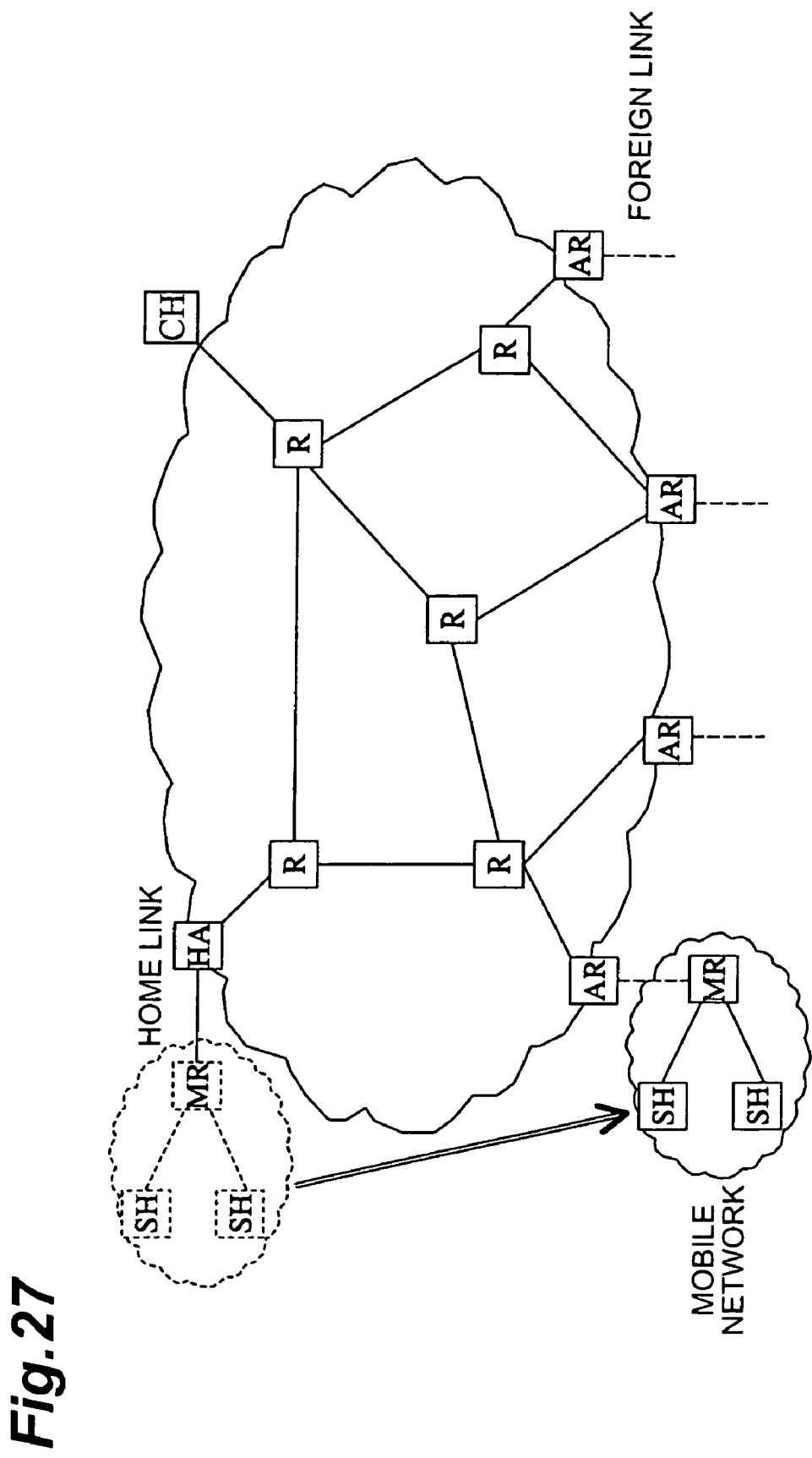
FIG. 27 is a diagram showing a virtual configuration of a packet communication system including a mobile network.

Further, the packet communication system of the prior art has the problem that it is not ready for mobile networks. An example of a mobile network in the packet communication system of the prior art is presented in FIG. 27. In FIG. 27, each R indicates a router, HA a home agent, each AR an access router, each SH a stationary host, and CH a correspondent host.

The "mobile network" is a network comprised of a mobile router and at least one node connected thereto. The mobile router moves from link to link while bringing along the mobile network. The mobile router is configured to regularly exchange information indicating the connection relation with the routers, access routers, and home agent necessary for routing processing by the routing protocol such as OSPF (Open Shortest Path First) or BGP (Border Gateway Protocol) as the routers, access routers, and home agent were. Even during a stay at a foreign link, the mobile router exchanges the connection information as if it stays at the home link. This permits a packet addressed to a node in the mobile network to be routed to the home link of the mobile router. The mobile network shown in FIG. 27 includes one mobile router and two stationary hosts. A stationary host is a node having an invariant connection relation with the mobile router. The mobile network may also include a router and/or a mobile host, without having to include only the stationary hosts. When the mobile network moves from the home link to a foreign link, the mobile router acquires a c/o address used at the foreign link, from an access router and then sends a Binding Update packet including the binding between the home address and the c/o address, to the home agent. Receiving the Binding Update packet from the mobile router, the home agent stores the binding and sends a Binding Acknowledgement packet as an acknowledgement response to the mobile router. Receiving the Binding Acknowledgement packet from the home agent, the mobile router recognizes the storage of the binding at the home agent. When the correspondent host sends a packet addressed to a stationary host in the mobile network, the packet is routed from the correspondent host to the home link by the routers in the network. The home agent determines that the next forwarding destination of the packet is the mobile router, based on the exchanged information by the routing protocol, and receives the packet instead of the mobile router. The home agent judges whether the destination of the packet coincides with the home address of the stored binding. Since they discord with each other, the home agent judges the tunneling destination unknown and discards the packet.

Second Embodiment

Figure 28:
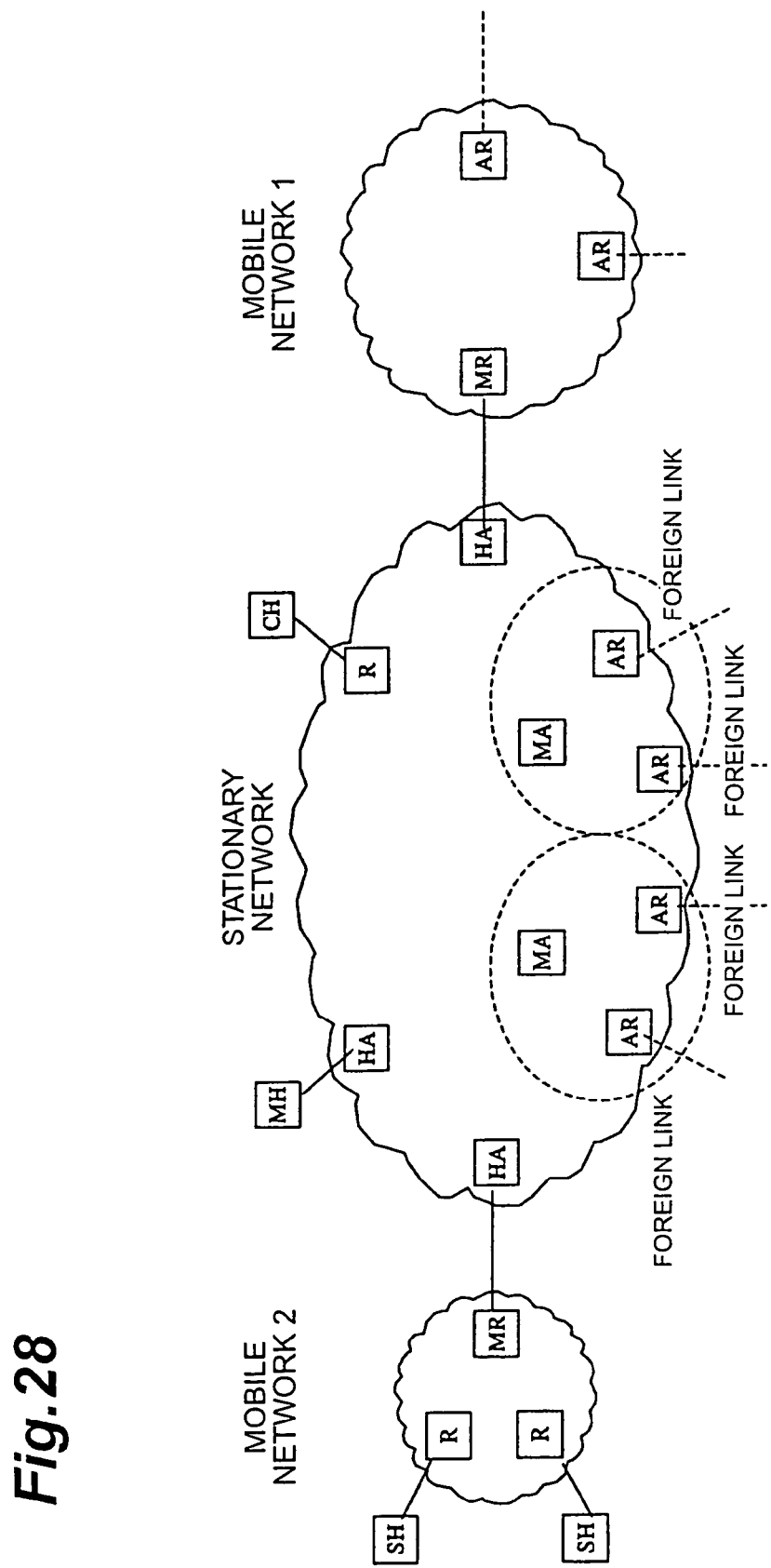
FIG. 28 is a configuration example of a packet communication system including mobile networks.

FIG. 28 is a configuration example of a packet communication system including mobile networks according to the present invention. The packet communication system of the present invention is comprised of a stationary network and mobile networks. In FIG. 28, each SH represents a Stationary Host, MH a Mobile Host, CH a Correspondent Host, each MR a Mobile Router, each HA a home agent, each MA a Mobility Agent, and each R a Router. Although not shown in FIG. 28, each of the stationary network and mobile networks includes an arbitrary number of routers as in the packet communication system of the prior art. The stationary network is comprised of home agents, mobility agents, a correspondent host, and access routers adapted to the mobile networks.

The home agents provide a service of relaying a packet addressed to a node in a mobile network, to a mobile router or a mobility agent. The mobility agents are routers having the functions described hereinafter, and an arbitrary number of mobility agents exist in the network. The mobility agents provide a service of relaying a packet sent from the home agent to a node in a mobile network and a packet sent from the correspondent host to a node in a mobile network, for the mobile network existing in an area including one or more access routers. Further, the mobility agents provide, for a node in a mobile network, a service of buffering a packet directed to the node, received from the home agent or the correspondent host. The access routers in the stationary network provide foreign links for the mobile host and the mobile networks, and each access router is included in an area of at least one mobility agent and notifies the mobile router of the address of the mobility agent. When a destination node of a packet can be judged as a node in a mobile network, the correspondent host does not send the packet to the home link, but sends it to the mobility agent. The mobile networks are networks moving between foreign links provided by the stationary network or by another mobile network, without changing its internal configuration, and the mobile networks are generally categorized under those with and without foreign links to which a mobile host or a mobile network can obtain access. Mobile network 1 is a mobile network with foreign links, which includes one mobile router and a plurality of access routers. The mobile router changes connecting links one after another with movement of the mobile network. The access routers in mobile network 1 provide foreign links for the mobile host and the mobile router of the other mobile network, but do not notify the mobile router of the address of the mobility agent in the stationary network.

On the other hand, mobile network 2 is a mobile network without any foreign link, which includes one mobile router and a plurality of stationary hosts. The stationary hosts do not recognize that they are moving even during movement of the mobile network 2. The stationary hosts can be included both in the mobile network 2 and in the mobile network 1.

As in the case of First Embodiment, the packet communication system of the present invention has two operating modes. One is the idle mode being a state in which no packet is transmitted between the mobile router and the correspondent host, and the other is the active mode being a state in which a packet is transmitted between the mobile router and the correspondent host.

Figure 29:
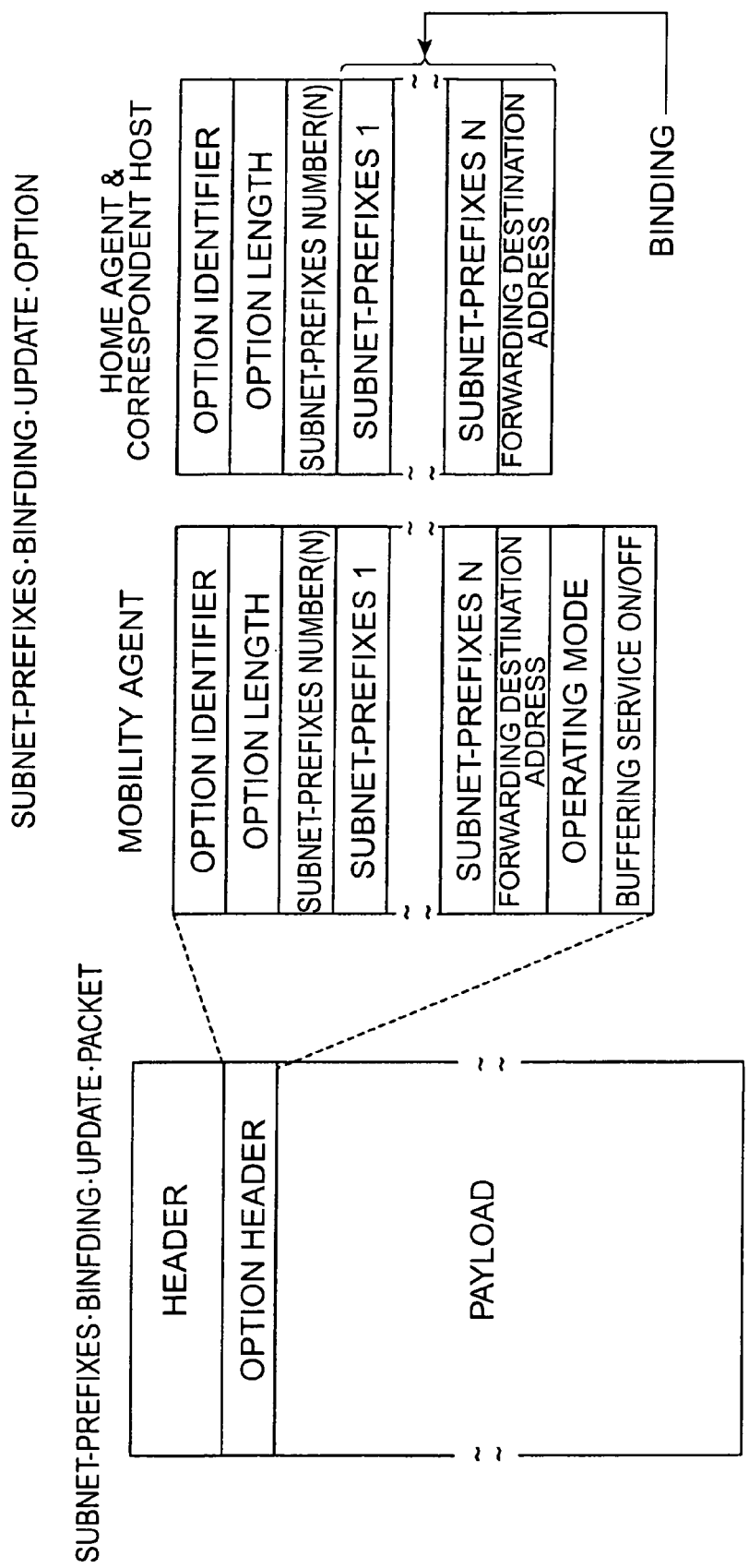
FIG. 29 is a configuration example of a Subnet-prefix Binding Update packet.

FIG. 29 is a configuration example of a Subnet-prefix Binding Update packet used by the mobile routers in the present invention. The Subnet-prefix Binding Update packet includes a Subnet-prefix Binding Update option in the option header of the IP packet. The Subnet-prefix Binding Update option is of either a format sent from the mobile router to the mobility agent or a format sent from the mobile router to the home agent and the correspondent host.

The format for the mobility agent is comprised of an option identifier, an option length, a Subnet-prefix number (N), N Subnet-prefixes, a forwarding destination address, an operating mode, and buffering service on/off. The option identifier indicates that the option is Subnet-prefix Binding update. The option length indicates the length of the option. The Subnet-prefix number indicates the number of Subnet-prefixes included in the option. The Subnet-prefixes indicate Subnet-prefixes of links included in the mobile network of the mobile router sending the Subnet-prefix Binding Update packet. The forwarding destination address indicates an address of a forwarding destination of a packet a destination of which is an address matching with a Subnet-prefix included in the mobile network, to which the home address or a c/o address used at a foreign link by the mobile router is set. The operating mode indicates either the idle mode or the active mode. The buffering service on/off indicates whether or not the buffering of packet is necessary at the mobility agent.

The format for the home agent and the correspondent host is comprised of an option identifier, an option length, a Subnet-prefix number (N), N Subnet-prefixes, and a forwarding destination address. These are the same as those for the mobility agent, but the address of the mobility agent or the home address of the mobile router is set as the forwarding destination address.

The Subnet-prefix Binding Update packet is used when the mobile router notifies the mobility agent of binding as a correspondence between the Subnet-prefixes and the c/o address, the operating mode, and buffering service on/off, and is also used when the mobile router notifies the home agent and the correspondent host of binding between the Subnet-prefixes and the address of the mobility agent. The mobile router also sends the Binding Update packet described in First Embodiment, as well as the Subnet-prefix Binding Update packet.

In FIG. 29, the header includes the destination address, the source address, and so on. Set in the forwarding destination address is either of the c/o address used at the foreign link by the mobile router, the address of the mobility agent, and the home address.

Figure 30:
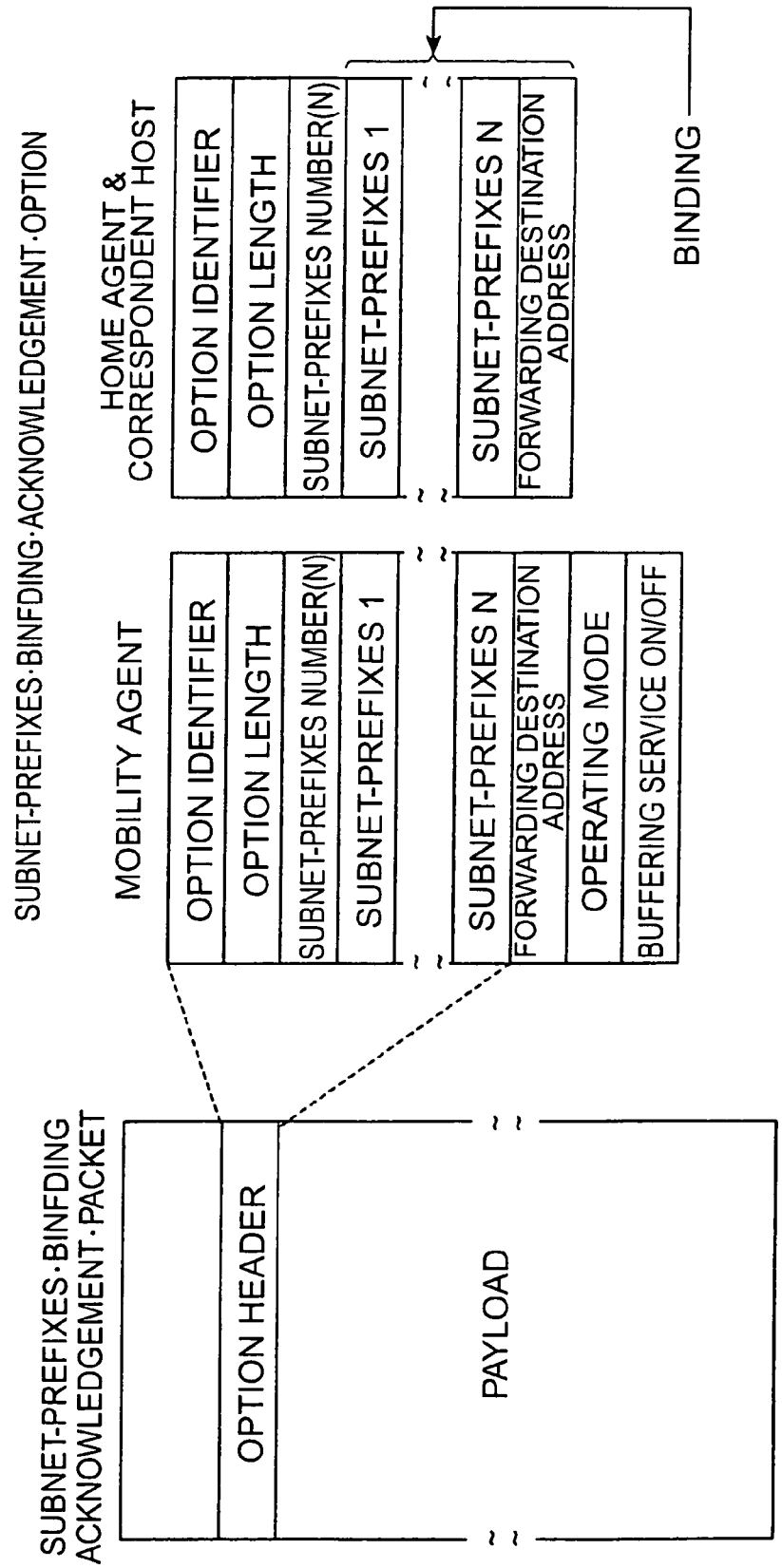
FIG. 30 is a configuration example of a Subnet-prefix Binding Acknowledgement packet.

FIG. 30 is a configuration example of a Subnet-prefix Binding Acknowledgement packet in the present invention. The Subnet-prefix Binding Acknowledgement packet includes a Subnet-prefix Binding Acknowledgement option in the option header of the IP packet. The Subnet-prefix Binding Acknowledgement option is of either a format sent from the mobility agent to the mobile router or a format sent from the home agent and the correspondent host to the mobile router.

The format for the mobility agent is comprised of an option identifier, an option length, a Subnet-prefix number (N), N Subnet-prefixes, a forwarding destination address, an operating mode, and buffering service on/off. The option identifier indicates that the option is the Subnet-prefix Binding Acknowledgement option. The option length indicates the length of the option. The Subnet-prefix number, Subnet-prefixes, the forwarding destination address, the operating mode, and buffering service on/off are set to the same contents as those in the Subnet-prefix Binding Update packet received from the mobile router by the mobility agent.

The format for the home agent and the correspondent host is comprised of an option identifier, an option length, a Subnet-prefix number, Subnet-prefixes, and a forwarding destination address. These are much the same as those in the format for the mobility agent.

The Subnet-prefix Binding Acknowledgement packet is used when the mobility agent, the home agent, and the correspondent host notify the mobile router of completion of processing of the Subnet-prefix Binding Update packet. The mobility agent, the home agent, and the correspondent host also send the Binding Acknowledgement packet described in First Embodiment, as well as the Subnet-prefix Binding Acknowledgement packet.

In FIG. 30, the header includes the destination address, the source address, and so on. Set in the forwarding destination address is either of the c/o address used at the foreign link by the mobile router, the address of the mobility agent, and the home address.

Figure 31:
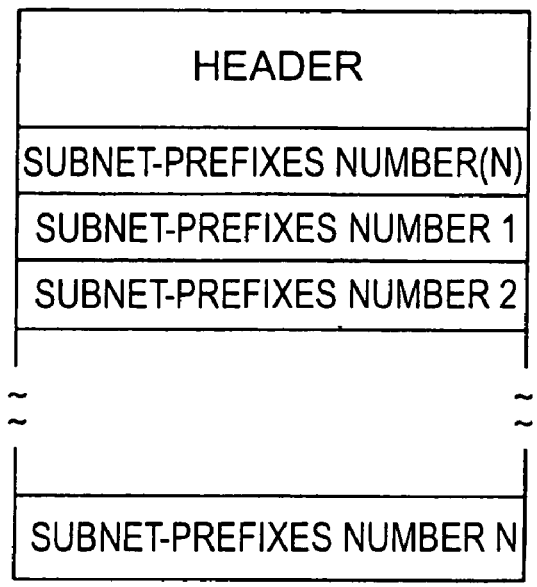
FIG. 31 is a configuration example of a Subnet-prefix Paging Request packet.

FIG. 31 is a configuration example of a Subnet-prefix Paging Request packet in the present invention. The Subnet-prefix Paging Request packet is comprised of a Subnet-prefix number (N) of Subnet-prefixes included in the payload of the IP packet, and Subnet-prefix 1 to Subnet-prefix N. The Subnet-prefix number (N) indicates the number of Subnet-prefixes included in the Subnet-prefix Paging Request packet. The Subnet-prefix 1 to Subnet-prefix N indicate one or more mobile routers requested to receive the Subnet-prefix Paging Request packet and to transition from the idle mode to the active mode; specifically, they indicate the Subnet-prefixes of the links included in the mobile network to which the mobile router belongs.

The Subnet-prefix Paging Request packet is used when the mobility agent notifies the access routers in the area of the aforementioned information. Set as destination addresses of the Subnet-prefix Paging Notification packet are the addresses of the access routers in the same area. The addresses of the access routers in the same area can be unicast addresses different among the access routers or a common multicast address thereto. In the former case, the mobility agent sends individual Subnet-prefix Paging Request packets to the respective access routers. In the latter case, the mobility agent sends one Subnet-prefix Paging Request packet.

In FIG. 31, the header includes the destination addresses, the source address, and so on. Set as the destination addresses of the Subnet-prefix Paging Request packet are the addresses of the access routers.

Figure 32:
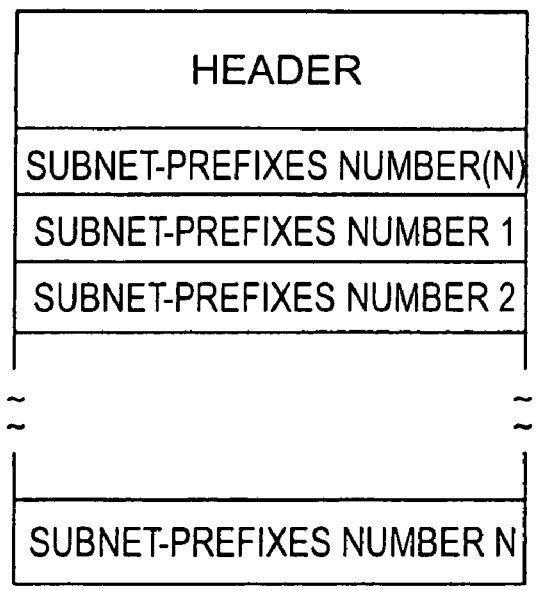
FIG. 32 is a configuration example of a Subnet-prefix Paging Notification packet.

FIG. 32 is a configuration example of a Subnet-prefix Paging Notification packet in the present invention. The Subnet-prefix Paging Notification packet is comprised of a Subnet-prefix number (N) of Subnet-prefixes included in the payload of the IP packet, and Subnet-prefix 1 to Subnet-prefix N. The Subnet-prefix number (N) indicates the number of Subnet-prefixes included in the Subnet-prefix Paging Notification packet. The Subnet-prefix 1 to Subnet-prefix N indicate one or more mobile routers requested to receive the Subnet-prefix Paging Notification packet and to transition from the idle mode to the active mode; specifically, they indicate the Subnet-prefixes of the links included in the mobile network to which the mobile router belongs. The mobile router captures the Subnet-prefixes of the links included in the belonging mobile network, by the routing protocol such as OSPF or the like used for routing in the mobile network.

The Subnet-prefix Paging Notification packet is used when the access router notifies the mobile router under connection to its foreign link of the foregoing information. Set as destination addresses of the Subnet-prefix Paging Notification packet are the addresses of destinations of all the nodes in the foreign link (broadcast addresses).

In FIG. 32, the header includes the destination addresses, the source address, and so on. Set as the destination addresses of the Subnet-prefix Paging Notification packet are the addresses of destinations of all the nodes in the link (broadcast addresses).

Figure 33:
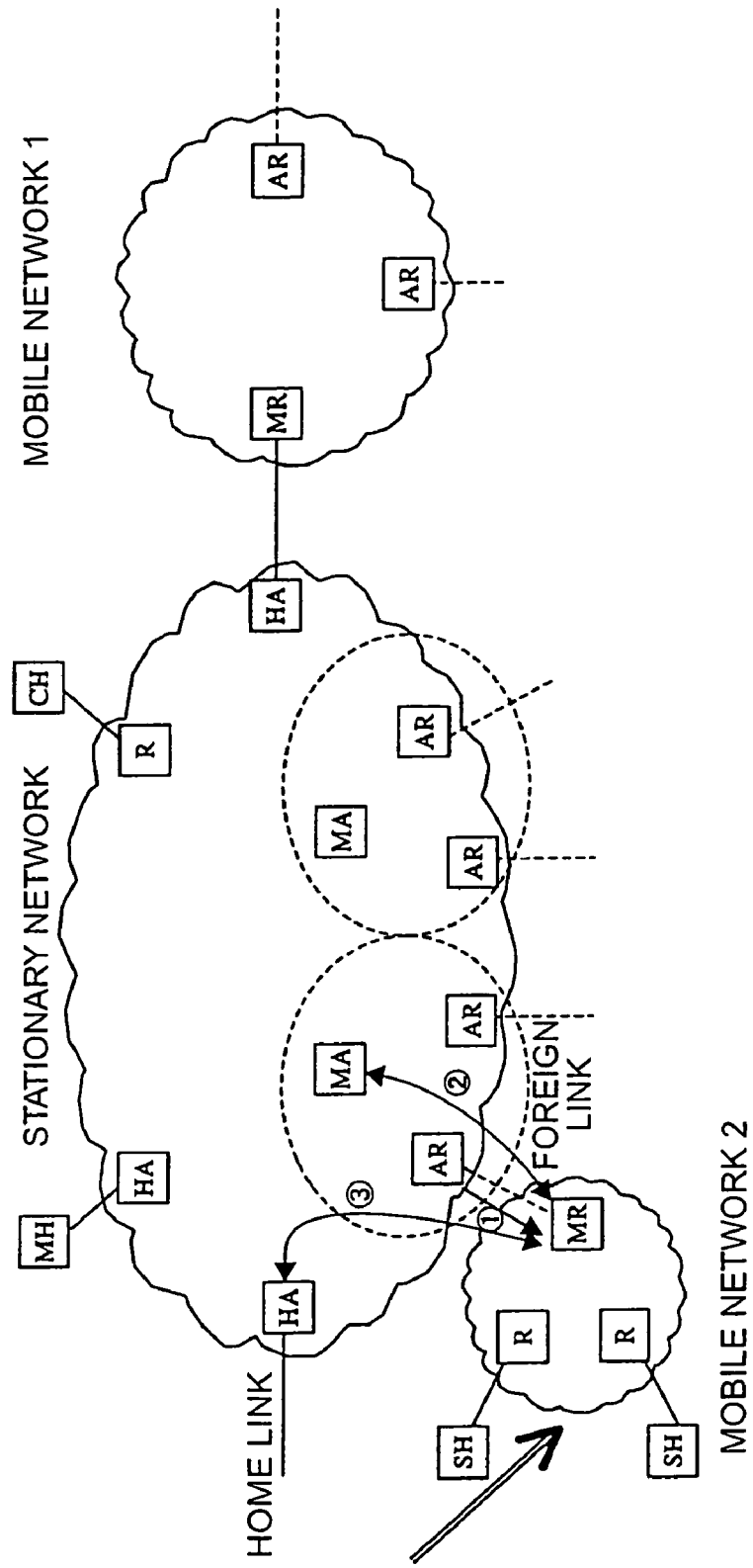
FIG. 33 is an example of operation carried out when in the active mode the mobile network 2 moves from its home link to a foreign link.

FIG. 33 is an example of operation of the packet communication system carried out when in the active mode the mobile network 2 moves from its home link to a foreign link. The operation example will be described below on the basis of FIG. 33.

(1) After the mobile router has moved from the home link to the foreign link, it acquires a c/o address and an address of a mobility agent from an access router.

(2) The mobile router sends to the mobility agent the Binding Update packet including the binding between the home address and the c/o address and indicating that the operating mode is the active mode and that the buffering of packet is unnecessary. Receiving the Binding Update packet, the mobility agent stores the binding between the home address and the c/o address, the operating mode being the active mode, and no need for buffering of packet, and then sends the Binding Acknowledgement packet to the mobile router. Receiving the Binding Acknowledgement packet, the mobile router recognizes that the Binding Update packet has arrived at the mobility agent and that normal processing is done. Further, the mobile router sends to the mobility agent the Subnet-prefix Binding Update packet including the binding between the Subnet-prefixes of the links in the mobile network 2 and the c/o address and indicating that the operating mode is the active mode and that the buffering of packet is unnecessary. The mobile router is informed of the Subnet-prefixes of the links included in the mobile network 2 by the routing protocol such as OSPF or the like. The mobility agent receives the Subnet-prefix Binding Update packet, stores the binding between the Subnet-prefixes and the c/o address, the operating mode being the active mode, and no need for buffering of packet, and then sends the Subnet-prefix Binding Acknowledgement packet to the mobile router. Receiving the Subnet-prefix Binding Acknowledgement packet, the mobile router recognizes that the Subnet-prefix Binding Update packet has arrived at the mobility agent and that normal processing is done.

(3) The mobile router sends to the home agent the Binding Update packet including the binding between the home address and the mobility agent address. Receiving the Binding Update packet, the home agent stores the binding between the home address and the mobility agent address and sends the Binding Acknowledgement packet to the mobile router. Receiving the Binding Acknowledgement packet, the mobile router recognizes that the Binding Update packet has arrived at the home agent and that normal processing is done. Further, the mobile router sends to the home agent the Subnet-prefix Binding Update packet including the binding between the Subnet-prefixes of the links in the mobile network 2 and the mobility agent address. Receiving the Subnet-prefix Binding Update packet, the home agent stores the binding between the Subnet-prefixes and the mobility agent address and then sends the Subnet-prefix Binding Acknowledgement packet to the mobile router. The mobile router recognizes that the Subnet-prefix Binding Update packet has arrived at the home agent and that normal processing is done.

Figure 34:
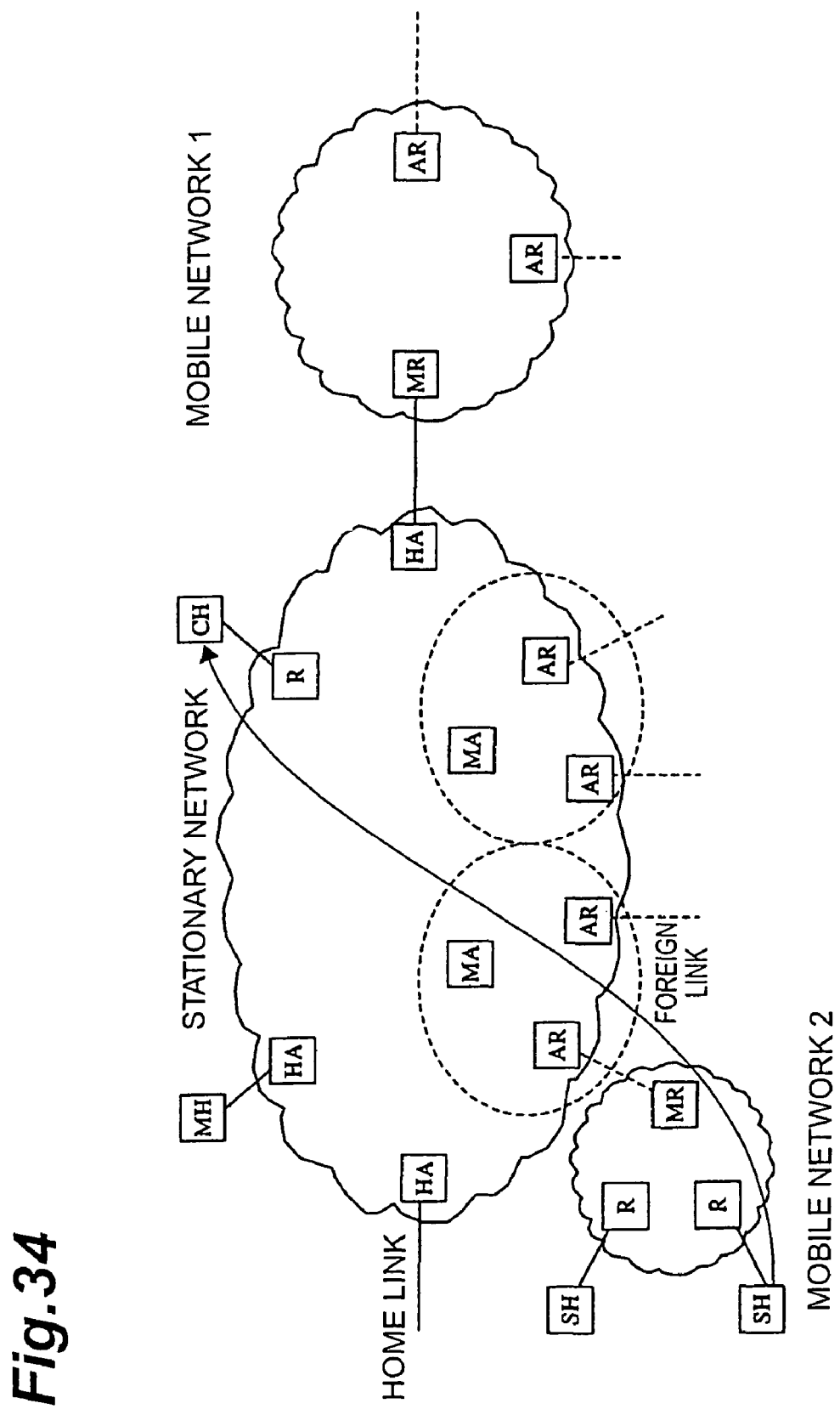
FIG. 34 is an example of operation carried out when in the active mode a stationary host sends a packet to the correspondent host.

FIG. 34 is an example of operation of the packet communication system carried out when in the active mode a packet is transmitted from a stationary host in the mobile network 2 to the correspondent host. The operation example will be described below on the basis of FIG. 34.

The stationary host sends the packet to the correspondent host. The packet is routed from the stationary host to the correspondent host by the routers in the mobile network 2 and the stationary network.

Figure 35:
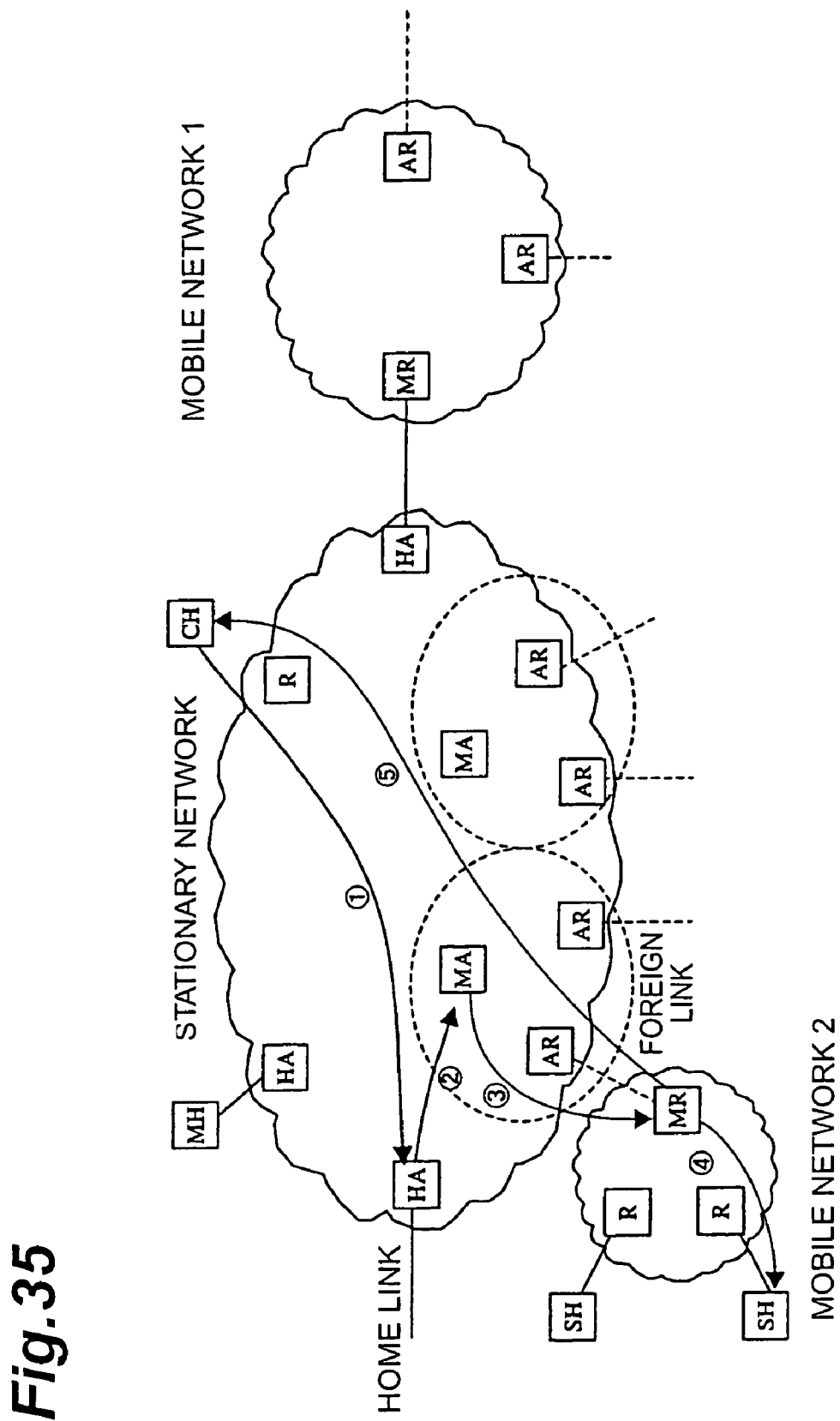
FIG. 35 is an example of operation carried out when in the active mode the correspondent host sends a packet to the stationary host before the correspondent host receives the Subnet-prefix Binding Update packet from a mobile router.

FIG. 35 is an example of operation carried out when in the active mode, before the correspondent host receives the Subnet-prefix Binding Update packet from the mobile router, the correspondent host sends a packet to the stationary host. The operation example will be described below on the basis of FIG. 35.

(1) The correspondent host sends the packet the destination of which is the address of the stationary host in the mobile network 2. The packet is routed to the home link of the mobile network 2 by the routers in the stationary network.

(2) When the Subnet-prefixes in the destination of the packet are those in the binding, the home agent of the home link receives the packet instead of the mobile router, generates a tunneling packet the destination of which is the mobility agent address of the binding, puts the received packet into the payload of the tunneling packet, and sends the tunneling packet. The tunneling packet is routed to the mobility agent by the routers in the stationary network.

(3) Receiving the tunneling packet from the home agent, the mobility agent extracts the packet included therein. When the Subnet-prefixes in the destination of the extracted packet match with those in the binding, the mobility agent puts the packet into the payload of a tunneling packet the destination of which is the c/o address of the binding, and then sends the tunneling packet. The tunneling packet is routed to the mobile router by the routers in the stationary network.

(4) Receiving the tunneling packet from the mobility agent, the mobile router extracts the packet from the payload. When the Subnet-prefixes in the destination match with those of the links in the mobile network 2, the mobile router sends the packet into the mobile network 2. The packet is routed to the stationary host by the routers in the mobile network 2. The stationary host receives the packet directed to its own address at last.

(5) When receiving the tunneling packet, the mobile router sends to the correspondent host the Subnet-prefix Binding Update packet including the binding between the Subnet-prefixes and the mobility agent address. The correspondent host receives the Subnet-prefix Binding Update packet and stores the binding between the Subnet-prefixes and the mobility agent address.

Figure 36:
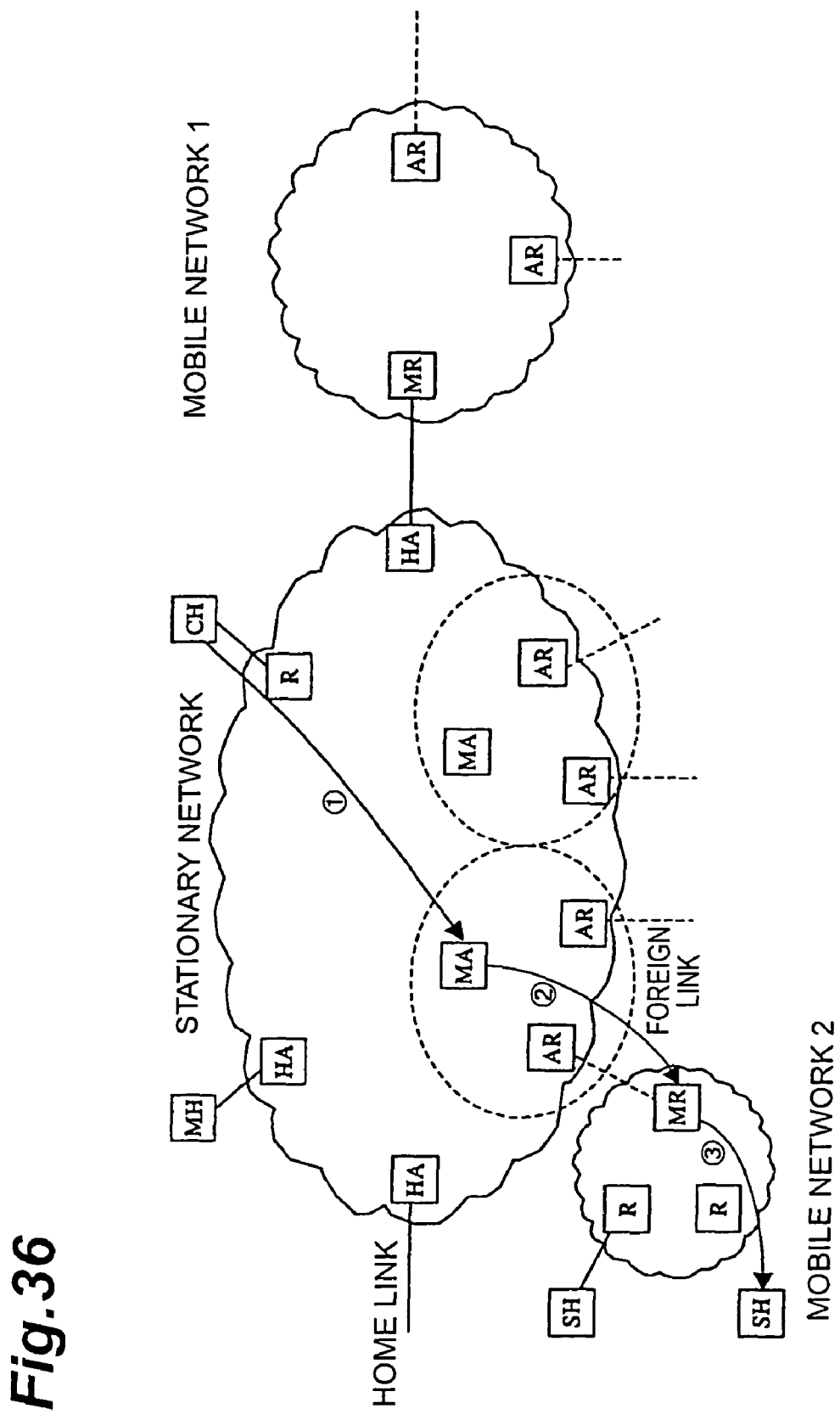
FIG. 36 is an example of operation carried out when in the active mode the correspondent host sends a packet to the stationary host after the correspondent host receives the Subnet-prefix Binding Update packet from the mobile router.

FIG. 36 is an example of operation carried out when in the active mode, after the correspondent host receives the Subnet-prefix Binding Update packet from the mobile router, the correspondent host sends a packet to the stationary host. The operation example will be described below on the basis of FIG. 36.

(1) When the correspondent host sends the packet the Subnet-prefixes in the destination address of which are the same as those indicated by the stored binding, it sends the packet the destination of which is the c/o address and which includes the routing header option in which the home address of the binding is set. The packet is routed to the mobility agent by the routers in the stationary network.

(2) The mobility agent receives the packet from the correspondent host. When the Subnet-prefixes in the destination address in the routing header option match with those in the binding, the mobility agent interchanges the destination of the packet and the destination address included in the routing header option, with each other, puts the packet into the payload of the tunneling packet the destination of which is the c/o address of the binding, and sends the tunneling packet. The tunneling packet is routed to the mobile router by the routers in the stationary network.

(3) Receiving the tunneling packet from the mobility agent, the mobile router extracts the packet from the payload. When the Subnet-prefixes in the destination match with those of the links in the mobile network 2, the packet is sent into the mobile network 2. The packet is routed to the stationary host by the routers in the mobile network 2. The stationary host receives the packet directed to its own address at last.

Figure 37:
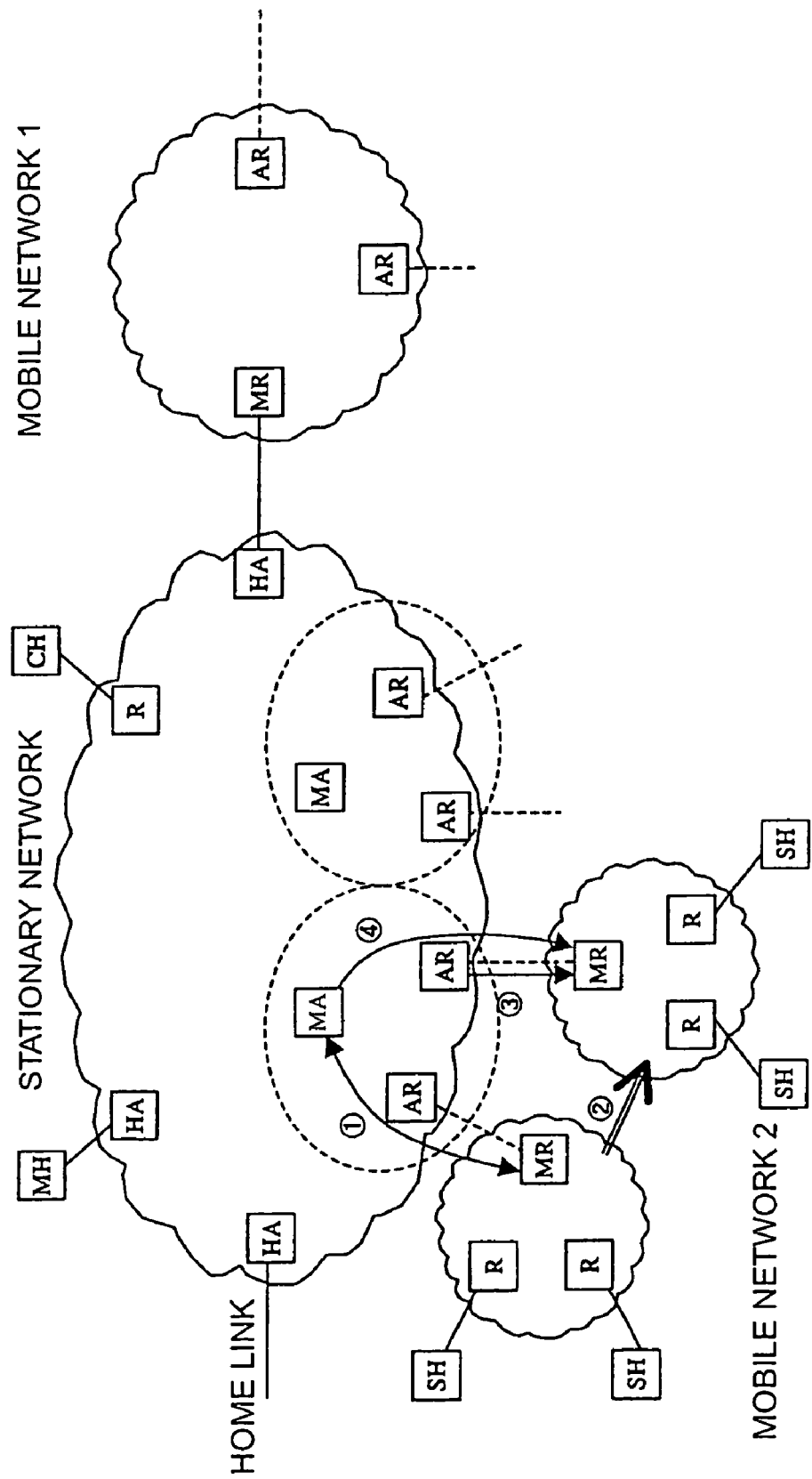
FIG. 37 is an example of operation carried out when in the active mode the mobile network 2 moves between foreign links provided by access routers in an area of an identical mobility agent.

FIG. 37 is an example of operation carried out when in the active mode the mobile router in the mobile network 2 moves between foreign links provided by access routers in the area of the same mobility agent. The operation example will be described below on the basis of FIG. 37.

(1) Before moving to another foreign link, the mobile router sends to the mobility agent the Binding Update packet including the binding between the home address and the c/o address and indicating that the operating mode is the active mode and that the buffering of packet is necessary. Receiving the Binding Update packet, the mobility agent stores the binding between the home address and the c/o address, the operating mode being the active mode, and the need for buffering of packet, and then sends the Binding Acknowledgement packet to the mobile router. Receiving the Binding Acknowledgement packet, the mobile router recognizes that the Binding Update packet has arrived at the mobility agent and that normal processing is done. Further, before moving to the other foreign link, the mobile router also sends to the mobility agent the Subnet-prefix Binding Update packet including the binding between the Subnet-prefixes of the links included in the mobile network 2 and the c/o address and indicating that the operating mode is the active mode and that the buffering of packet is necessary. Receiving the Subnet-prefix Binding Update packet, the mobility agent stores the binding between the Subnet-prefixes and the c/o address, the operating mode being the active mode, and the need for buffering of packet, and then sends the Subnet-prefix Binding Acknowledgement packet to the mobile router. Receiving the Subnet-prefix Binding Acknowledgement packet, the mobile router recognizes that the Subnet-prefix Binding Update packet has arrived at the mobility agent and that normal processing is done.

(2) The mobile router moves between foreign links.

(3) After the mobile router has moved to another foreign link, it acquires a c/o address and an address of a mobility agent from an access router.

(4) The mobile router judges whether there is change in the address of the mobility agent. Without change, the mobile router sends to the mobility agent the Binding Update packet including the binding between the home address and the c/o address and indicating the operating mode is the active mode and that the buffering of packet is unnecessary. Receiving the Binding Update packet, the mobility agent stores the binding between the home address and the c/o address, the operating mode being the active mode, and no need for buffering of packet, and then sends the Binding Acknowledgement packet to the mobile router. Receiving the Binding Acknowledgement packet, the mobile router recognizes that the Binding Update packet has arrived at the mobility agent and that normal processing is done. Further, the mobile router sends to the mobility agent the Subnet-prefix Binding Update packet including the binding between the Subnet-prefixes of the links included in the mobile network 2 and the c/o address and indicating that the operating mode is the active mode and that the buffering of packet is unnecessary. Receiving the Subnet-prefix Binding Update packet, the mobility agent stores the binding between the Subnet-prefixes and the c/o address, the operating mode being the active mode, and no need for buffering of packet, and then sends the Subnet-prefix Binding Acknowledgement packet to the mobile router. Receiving the Subnet-prefix Binding Acknowledgement packet, the mobile router recognizes that the Subnet-prefix Binding Update packet has arrived at the mobility agent and that normal processing is done.

Figure 38:
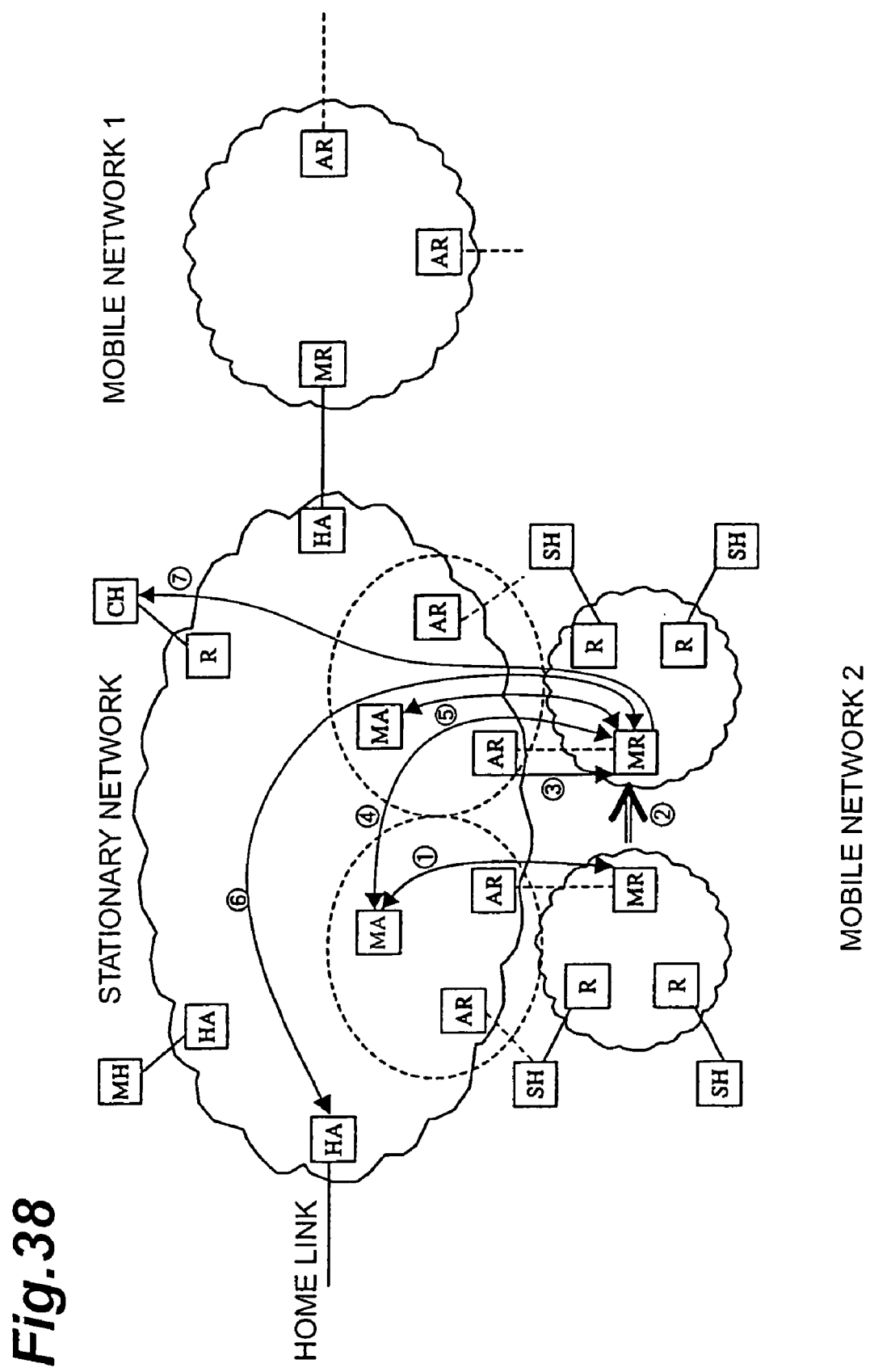
FIG. 38 is an example of operation carried out when in the active mode the mobile network 2 moves to a foreign link provided by an access router in an area of a different mobility agent.

FIG. 38 is an example of operation carried out when in the active mode the mobile router moves to a foreign link provided by an access router in an area of a different mobility agent. The operation example will be described below on the basis of FIG. 38.

(1) Before moving to another foreign link, the mobile router sends to the mobility agent the Binding Update packet including the binding between the home address and the c/o address and indicating that the operating mode is the active mode and that the buffering of packet is necessary. Receiving the Binding Update packet, the mobility agent stores the binding between the home address and the c/o address, the operating mode being the active mode, and the necessity for buffering of packet, and then sends the Binding Acknowledgement packet to the mobile router. Receiving the Binding Acknowledgement packet, the mobile router recognizes that the Binding Update packet has arrived at the mobility agent and that normal processing is done. Before moving to the other foreign link, the mobile router further sends to the mobility agent the Subnet-prefix Binding Update packet including the binding between the Subnet-prefixes of the links included in the mobile network 2 and the c/o address and indicating that the operating mode is the active mode and that the buffering of packet is necessary. Receiving the Subnet-prefix Binding Update packet, the mobility agent stores the binding between the Subnet-prefixes and the c/o address, the operating mode being the active mode, and the necessity for buffering of packet, and then sends the Subnet-prefix Binding Acknowledgement packet to the mobile router. Receiving the Subnet-prefix Binding Acknowledgement packet, the mobile router recognizes that the Subnet-prefix Binding Update packet has arrived at the mobility agent and that normal processing is done.

(2) The mobile router moves between foreign links.

(3) After the mobile router has arrived at the other foreign link, it acquires a c/o address and an address of a mobility agent from an access router.

(4) The mobile router judges whether there is change in the mobility agent address. With change, the mobile router sends to the previous mobility agent the Binding Update packet including the binding between the home address and the c/o address and indicating that the operating mode is the active mode and that the buffering of packet is unnecessary. Receiving the Binding Update packet, the previous mobility agent stores the binding between the home address and the c/o address, the operating mode being the active mode, and no need for buffering of packet, and then sends the Binding Acknowledgement packet to the mobile router. Receiving the Binding Acknowledgement packet, the mobile router recognizes that the Binding Update packet has arrived at the previous mobility agent and that normal processing is done. The mobile router further sends to the previous mobility agent the Subnet-prefix Binding Update packet including the binding between the Subnet-prefixes of the mobile network 2 and the c/o address and indicating that the operating mode is the active mode and that the buffering of packet is unnecessary. Receiving the Subnet-prefix Binding Update packet, the previous mobility agent stores the binding between the Subnet-prefixes and the c/o address, the operating mode being the active mode, and no need for buffering of packet, and then sends the Subnet-prefix Binding Acknowledgement packet to the mobile router. Receiving the Subnet-pre fix Binding Acknowledgement packet, the mobile router recognizes that the Subnet-prefix Binding Update packet has arrived at the previous mobility agent and that normal processing is done.

(5) The mobile router sends to the mobility agent the Binding Update packet including the binding between the home address and the c/o address and indicating that the operating mode is the active mode and that there is no need for buffering of packet. Receiving the Binding Update packet, the mobility agent stores the binding between the home address and the c/o address, the operating mode being the active mode, and no need for buffering of packet, and then sends the Binding Acknowledgement packet to the mobile router. Receiving the Binding Acknowledgement packet, the mobile router recognizes that the Binding Update packet has arrived at the mobility agent and that normal processing is done. The mobile router further sends to the mobility agent the Subnet-prefix Binding Update packet including the binding between the Subnet-prefixes of the links included in the mobile network 2 and the c/o address and indicating that the operating mode is the active mode and that there is no need for buffering of packet. Receiving the Subnet-prefix Binding Update packet, the mobility agent stores the binding between the Subnet-prefixes and the c/o address, the operating mode being the active mode, and no need for buffering of packet, and then sends the Subnet-prefix Binding Acknowledgement packet to the mobile router. Receiving the Subnet-prefix Binding Acknowledgement packet, the mobile router recognizes that the Binding Update packet has arrived at the mobility agent and that normal processing is done.

(6) The mobile router sends to the home agent the Binding Update packet including the binding between the home address and the address of the mobility agent. Receiving the Binding Update packet, the home agent stores the binding between the home address and the c/o address and sends the Binding Acknowledgement packet to the mobile router. Receiving the Binding Acknowledgement packet, the mobile router recognizes that the Binding Update packet has arrived at the home agent and that normal processing is done. The mobile router further sends to the home agent the Subnet-prefix Binding Update packet including the binding between the Subnet-prefixes of the links included in the mobile network 2 and the mobility agent address. Receiving the Subnet-prefix Binding Update packet, the home agent stores the binding between the Subnet-prefixes and the mobility agent address and sends the Subnet-prefix Binding Acknowledgement packet to the mobile router. Receiving the Subnet-prefix Binding Acknowledgement packet, the mobile router recognizes that the Subnet-prefix Binding Update packet has arrived at the home agent and that normal processing is done.

(7) The mobile router sends to the correspondent host the Binding Update packet including the binding between the home address and the mobility agent address. Receiving the Binding Update packet, the correspondent host stores the Binding between the home address and the mobility agent address. The mobile router further sends to the correspondent host the Subnet-prefix Binding Update packet including the binding between the Subnet-prefixes of the links included in the mobile network 2 and the mobility agent address. Receiving the Subnet-prefix Binding Update packet, the correspondent host stores the binding between the Subnet-prefixes and the mobility agent address.

Figure 39:
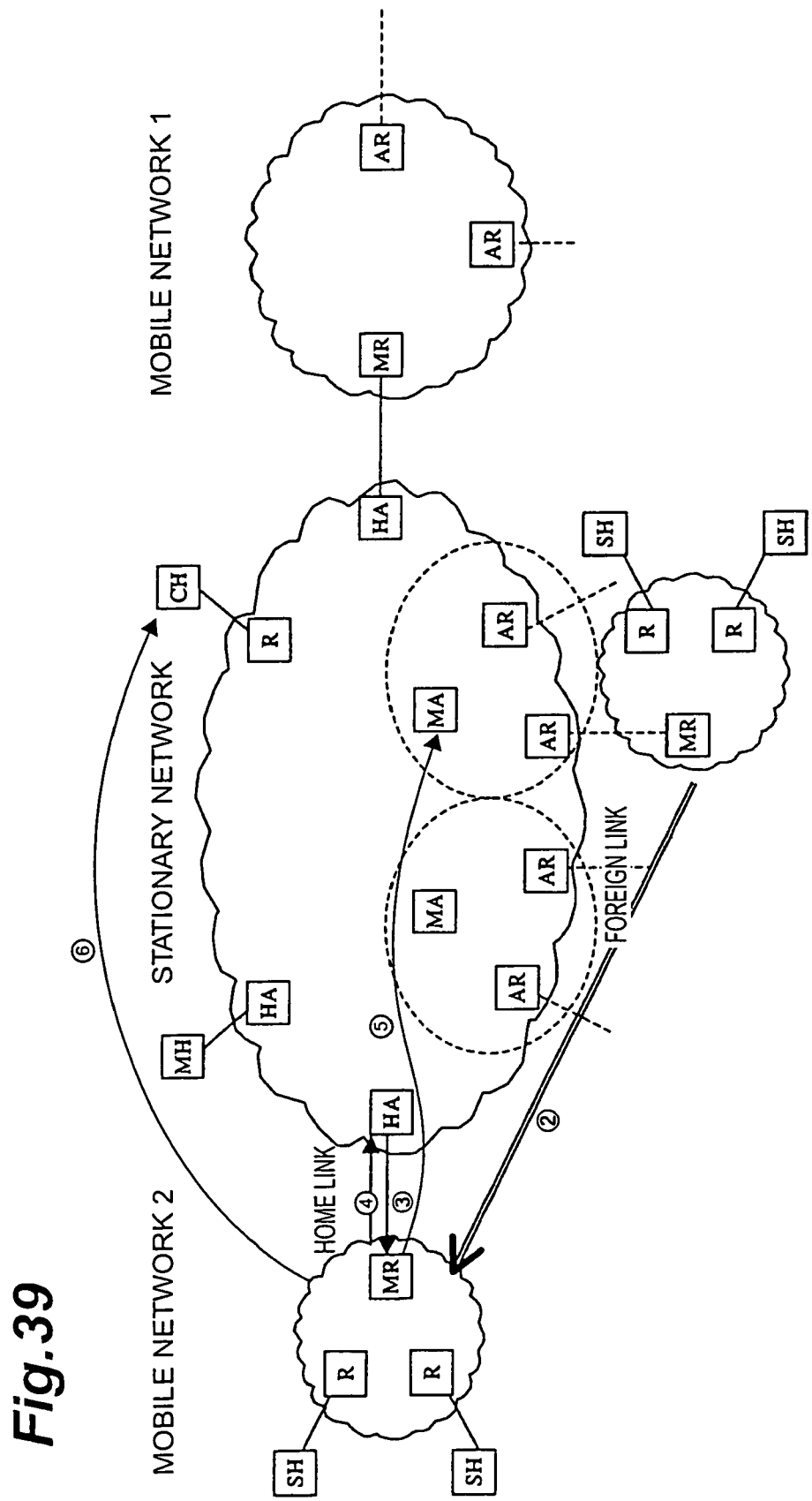
FIG. 39 is an example of operation carried out when in the active mode the mobile network 2 moves from a foreign link to its home link.

FIG. 39 is an example of operation carried out when in the active mode the mobile router moves from the foreign link to the home link. The operation example will be described below on the basis of FIG. 39.

(1) The mobile router sends to the mobility agent the Binding Update packet including the binding between the home address and the home address and indicating that the operating mode is the active mode and that the buffering of packet is necessary. Receiving the Binding Update packet, the mobility agent stores the binding between the home address and the home address, the operating mode being the active mode, and the necessity for buffering of packet, and then sends the Binding Acknowledgement packet to the mobile router. Receiving the Binding Acknowledgement packet, the mobile router recognizes that the Binding Update packet has arrived at the previous mobility agent and that normal processing is done. The mobile router further sends to the mobility agent the Subnet-prefix Binding Update packet including the binding between the Subnet-prefixes of the links included in the mobile network 2 and the home address and indicating that the operating mode is the active mode and that the buffering of packet is necessary. Receiving the Subnet-prefix Binding Update packet, the mobility agent stores the binding between the Subnet-prefixes and the home address, the operating mode being the active mode, and the necessity for buffering of packet, and then sends the Subnet-prefix Binding Acknowledgement packet to the mobile router. Receiving the Subnet-prefix Binding Acknowledgement packet, the mobile router recognizes that the Subnet-prefix Binding Update packet has arrived at the previous mobility agent and that normal processing is done.

(2) The mobile router moves from the foreign link to the home link.

(3) The mobile router recognizes that it has moved to the home link. For example, the mobile router judges that it has moved from the foreign link to the home link, by receiving Router Advertisement sent from the home agent.

(4) The mobile router sends to the home agent the Binding Update packet requesting to erase the stored binding between the home address and the mobility agent address. Receiving the Binding Update packet, the home agent erases the binding between the home address and the mobility agent address and sends the Binding Acknowledgement packet to the mobile router. Thereafter, the home agent stops performing the operation of receiving the packet instead of the mobile router and forwarding the packet to the mobility agent. The mobile router further sends to the home agent the Subnet-prefix Binding Update packet requesting to erase the stored binding between the Subnet-prefixes and the mobility agent address. Receiving the Subnet-prefix Binding Update packet, the home agent erases the binding between the Subnet-prefixes and the mobility agent address and sends the Subnet-prefix Binding Acknowledgement packet to the mobile router. Thereafter, the home agent stops performing the operation of receiving the packet instead of the mobile router and forwarding the packet to the mobility agent.

(5) The mobile router sends to the mobility agent previously used before the movement, the Binding Update packet including the binding between the home address and the home address and indicating that the operating mode is the active mode and that there is no need for the buffering of packet. Receiving the Binding Update packet, the mobility agent stores the binding between the home address and the home address, the operating mode being the active mode, and no need for the buffering of packet, and then sends the Binding Acknowledgement packet to the mobile router. Receiving the Binding Acknowledgement packet, the mobile router recognizes that the Binding Update packet has arrived at the previous home agent and that normal processing is done. The mobile router further sends to the mobility agent previously used before the movement, the Subnet-prefix Binding Update packet including the binding between the Subnet-prefixes of the links included in the mobile network 2 and the home address and indicating that the operating mode is the active mode and that there is no need for the buffering of packet. Receiving the Subnet-prefix Binding Update packet, the mobility agent stores the binding between the Subnet-prefixes and the home address, the operating mode being the active mode, and no need for the buffering of packet, and then sends the Subnet-prefix Binding Acknowledgement packet to the mobile router. Receiving the Subnet-prefix Binding Acknowledgement packet, the mobile router recognizes that the Binding Update packet has arrived at the previous home agent and that normal processing is done.

(6) The mobile router sends to the correspondent host the Binding Update packet including the binding between the home address and the home address. Receiving the Binding Update packet, the correspondent host deletes the stored Binding between the home address and the mobility agent address. The mobile router further sends to the correspondent host the Subnet-prefix Binding Update packet including the binding between the Subnet-prefixes of the links included in the mobile network 2 and the home address. Receiving the Subnet-prefix Binding Update packet, the correspondent host deletes the binding between the Subnet-prefixes and the mobility agent address.

Figure 40:
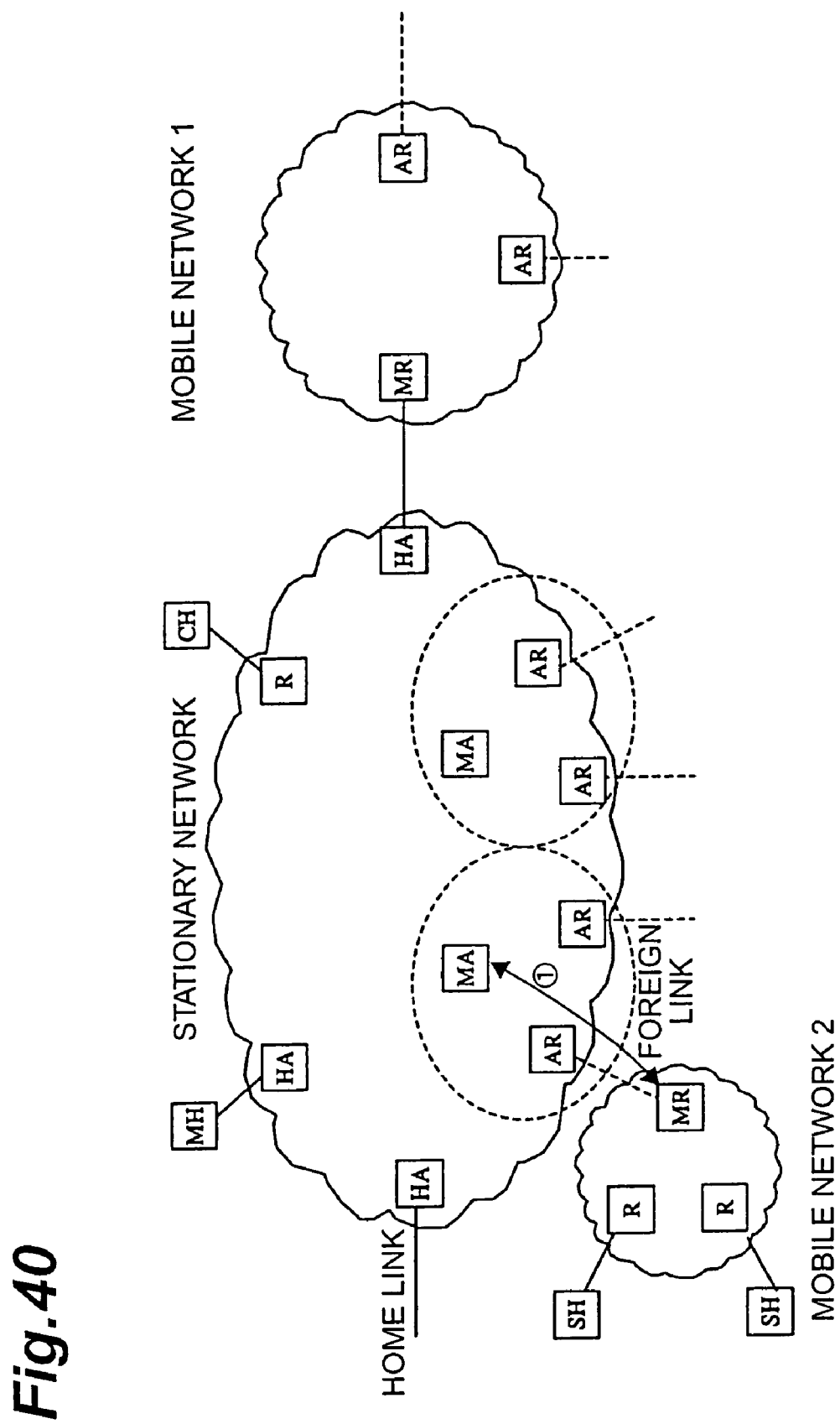
FIG. 40 is an example of operation carried out when the operating mode transitions from the active mode to the idle mode.

FIG. 40 is an example of operation of the packet communication system carried out when the operating mode transitions from the active mode to the idle mode. When during the operating mode of the active mode there is no packet other than the Binding Update packet, the Binding Acknowledgement packet, the Subnet-prefix Binding Update packet, and the Subnet-prefix Binding Acknowledgement packet transmitted between the mobile router and the stationary network for a predetermined period of time, the present operation example is executed. The operation example will be described below on the basis of FIG. 40.

(1) When the mobile router sends or receives no packet to or from the stationary network for the predetermined period, it sends to the mobility agent the Binding Update packet including the binding between the home address and the c/o address and indicating that the operating mode is the idle mode and that the buffering of packet is necessary. Receiving the Binding Update packet, the mobility agent stores the binding and the operating mode being the idle mode, and then sends the Binding Acknowledgement packet to the mobile router. Receiving the Binding Acknowledgement packet, the mobile router recognizes that the Binding Update packet has arrived at the mobility agent and that normal processing is done. The mobile router further sends to the mobility agent the Subnet-prefix Binding Update packet including the binding between the Subnet-prefixes of the links included in the mobile network 2 and the c/o address and indicating that the operating mode is the idle mode and that the buffering of packet is necessary. Receiving the Subnet-prefix Binding Update packet, the mobility agent stores the binding and the operating mode being the idle mode, and then sends the Subnet-prefix Binding Acknowledgement packet to the mobile router. Receiving the Subnet-prefix Binding Acknowledgement packet, the mobile router recognizes that the Subnet-prefix Binding Update packet has arrived the mobility agent and that normal processing is done.

Figure 41:
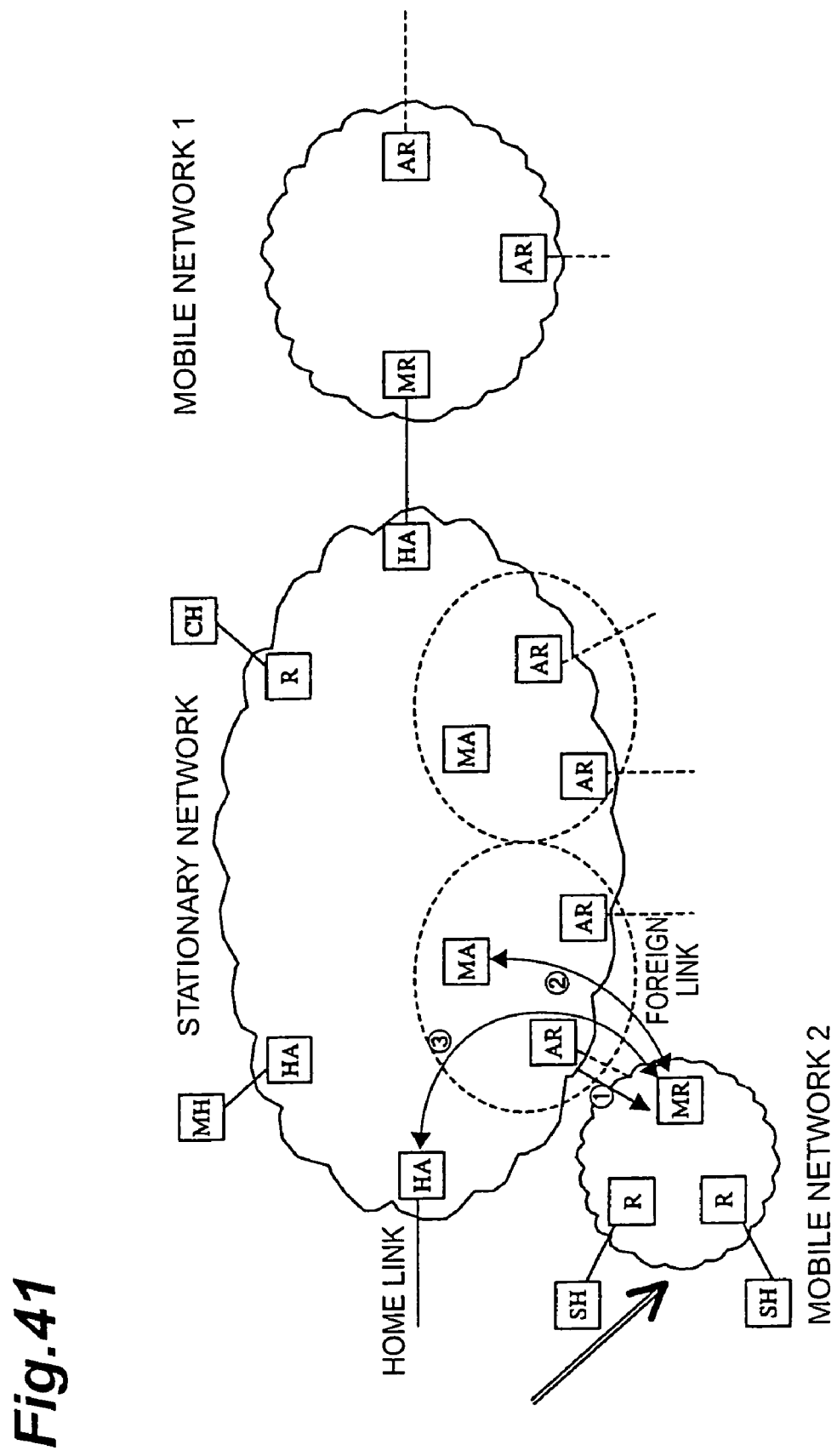
FIG. 41 is an example of operation carried out when in the idle mode the mobile network 2 moves from its home link to a foreign link.

FIG. 41 is an example of operation of the packet communication system carried out when in the idle mode the mobile network 2 moves from the home link to a foreign link. The operation example will be described below on the basis of FIG. 41.

(1) After the mobile router has moved from the home link to the foreign link, it acquires a c/o address and an address of a mobility agent from an access router.

(2) The mobile router sends to the mobility agent the Binding Update packet including the binding between the home address and the c/o address and indicating that the operating mode is the idle mode and that the buffering of packet is necessary. Receiving the Binding Update packet, the mobility agent stores the binding between the home address and the c/o address, the operating mode being the idle mode, and the need for the buffering of packet, and then sends the Binding Acknowledgement packet to the mobile router. Receiving the Binding Acknowledgement packet, the mobile router recognizes that the Binding Update packet has arrived at the mobility agent and that normal processing is done. The mobile router further sends to the mobility agent the Subnet-prefix Binding Update packet including the binding between the Subnet-prefixes of the links in the mobile network 2 and the c/o address and indicating that the operating mode is the idle mode and that the buffering of packet is necessary. The mobile router is informed of the Subnet-prefixes of the links included in the mobile network 2, by the routing protocol such as OSPF or the like. Receiving the Subnet-prefix Binding Update packet, the mobility agent stores the binding between the Subnet-prefixes and the c/o address, the operating mode being the idle mode, and the need for the buffering of packet, and then sends the Subnet-prefix Binding Acknowledgement packet to the mobile router. Receiving the Subnet-prefix Binding Acknowledgement packet, the mobile router recognizes that the Subnet-prefix Binding Update packet has arrived at the mobility agent and that normal processing is done.

(3) The mobile router sends to the home agent the Binding Update packet including the binding between the home address and the mobility agent address. Receiving the Binding Update packet, the home agent stores the binding between the home address and the mobility agent address and then sends the Binding Acknowledgement packet to the mobile router. Receiving the Binding Acknowledgement packet, the mobile router recognizes that the Binding Update packet has arrived at the home agent and that normal processing is done. The mobile router further sends to the home agent the Subnet-prefix Binding Update packet including the binding between the Subnet-prefixes of the links in the mobile network 2 and the mobility agent address. Receiving the Subnet-prefix Binding Update packet, the home agent stores the binding between the Subnet-prefixes and the mobility agent address and then sends the Subnet-prefix Binding Acknowledgement packet to the mobile router. Receiving the Subnet-prefix Binding Acknowledgement packet, the mobile router recognizes that the Subnet-prefix Binding Update packet has arrived at the home agent and that normal processing is done.

Described on the basis of FIGS. 38 to 44 above were the operation examples in the active mode of the packet communication system according to the present invention. The mobile router sends the Binding Update packet and the Subnet-prefix Binding Update packet to the mobility agent before movement between foreign links to make the mobility agent buffer packets to be forwarded to the nodes in the mobile network 2, and the mobile router receives the Subnet-prefix Binding Acknowledgement packet whereby it can receive all the packets addressed to the nodes in the mobile network 2, routed to the foreign link now under use, and thereafter move between foreign links. Further, the mobile router sends the Binding Update packet and the Subnet-prefix Binding Update packet to the mobility agent after the movement between foreign links whereby the mobile router can make buffered packets routed to the foreign link of the moving destination. When the same mobility agent is used before and after the movement between foreign links, the mobile router is required merely to send the Binding Update packet and the Subnet-prefix Binding Update packet to only the mobility agent, but does not have to send them to the home agent and the correspondent host.

Figure 42:
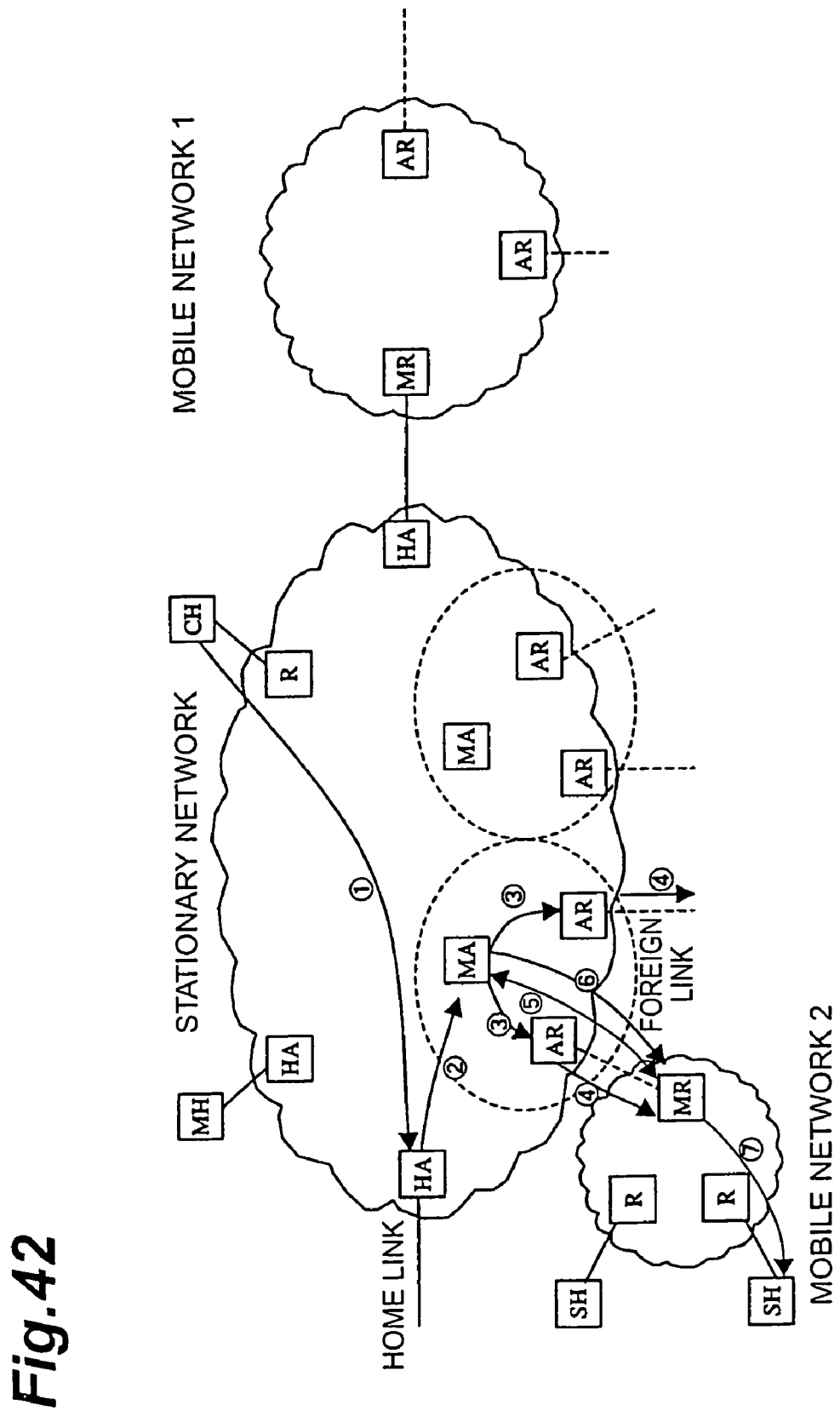
FIG. 42 is an example of operation carried out when in the idle mode the correspondent host sends a packet to the stationary host before the correspondent host receives the Subnet-prefix Binding Update packet from the mobile router.

FIG. 42 is an example of operation carried out when in the idle mode, before the correspondent host receives the Subnet-prefix Binding Update packet from the mobile router, the correspondent host sends a packet to the stationary host. The operation example will be described below on the basis of FIG. 42.

(1) The correspondent host sends the packet the destination of which is the address of the stationary host in the mobile network 2. The packet is routed to the home link of the mobile network 2 by the routers in the stationary network.

(2) When the Subnet-prefixes in the destination of the packet are those in the binding, the home agent of the home link receives the packet instead of the mobile router, generates a tunneling packet the destination of which is the mobility agent address of the binding, puts the received packet into the payload of the tunneling packet, and sends it. The tunneling packet is routed to the mobility agent by the routers in the stationary network.

(3) The mobility agent receives the tunneling packet from the home agent and extracts the packet from the payload. When the destination of the extracted packet matches with the Subnet-prefixes of the binding, the mobility agent buffers the packet and sends the Subnet-prefix Paging Request including the Subnet-prefixes, to the access routers in the area.

(4) Receiving the Subnet-prefix Paging Request from the mobility agent, the access routers send to their foreign links the Subnet-prefix Paging Notification in which the home address included in the Subnet-prefix Paging Request is set. The mobile router receives the Subnet-prefix Paging Notification from the access router.

(5) The mobile router judges whether the received Subnet-prefix Paging Notification includes the Subnet-prefixes of the links in the belonging mobile network 2. Without inclusion, the mobile router discards the received Subnet-prefix Paging Notification. With inclusion, the mobile router sends the Subnet-prefix Binding Update packet including the binding between the Subnet-prefixes and the c/o address and indicating that the operating mode is the active mode and that there is no need for the buffering of packet. Receiving the Subnet-prefix Binding Update packet, the mobility agent stores the binding between the Subnet-prefixes and the c/o address, the operating mode being the active mode, and no need for the buffering of packet, and then sends the Subnet-prefix Binding Acknowledgement packet to the mobile router. Receiving the Subnet-prefix Binding Acknowledgement packet, the mobile router recognizes that the Subnet-prefix Binding Update packet has arrived at the mobility agent and that normal processing is done.

(6) The mobility agent puts each buffered packet into the payload of a tunneling packet the destination of which is the c/o address of the binding, and then sends it. The tunneling packet is routed to the mobile router by the routers in the stationary network.

(7) Receiving the tunneling packet from the mobility agent, the mobile router extracts the packet from the payload. When the Subnet-prefixes in the destination match with those of the links in the mobile network 2, the mobile router sends the packet into the mobile network 2. The packet is routed to the stationary host by the routers in the mobile network 2. The stationary host receives the packet directed to its own address at last.

Figure 43:
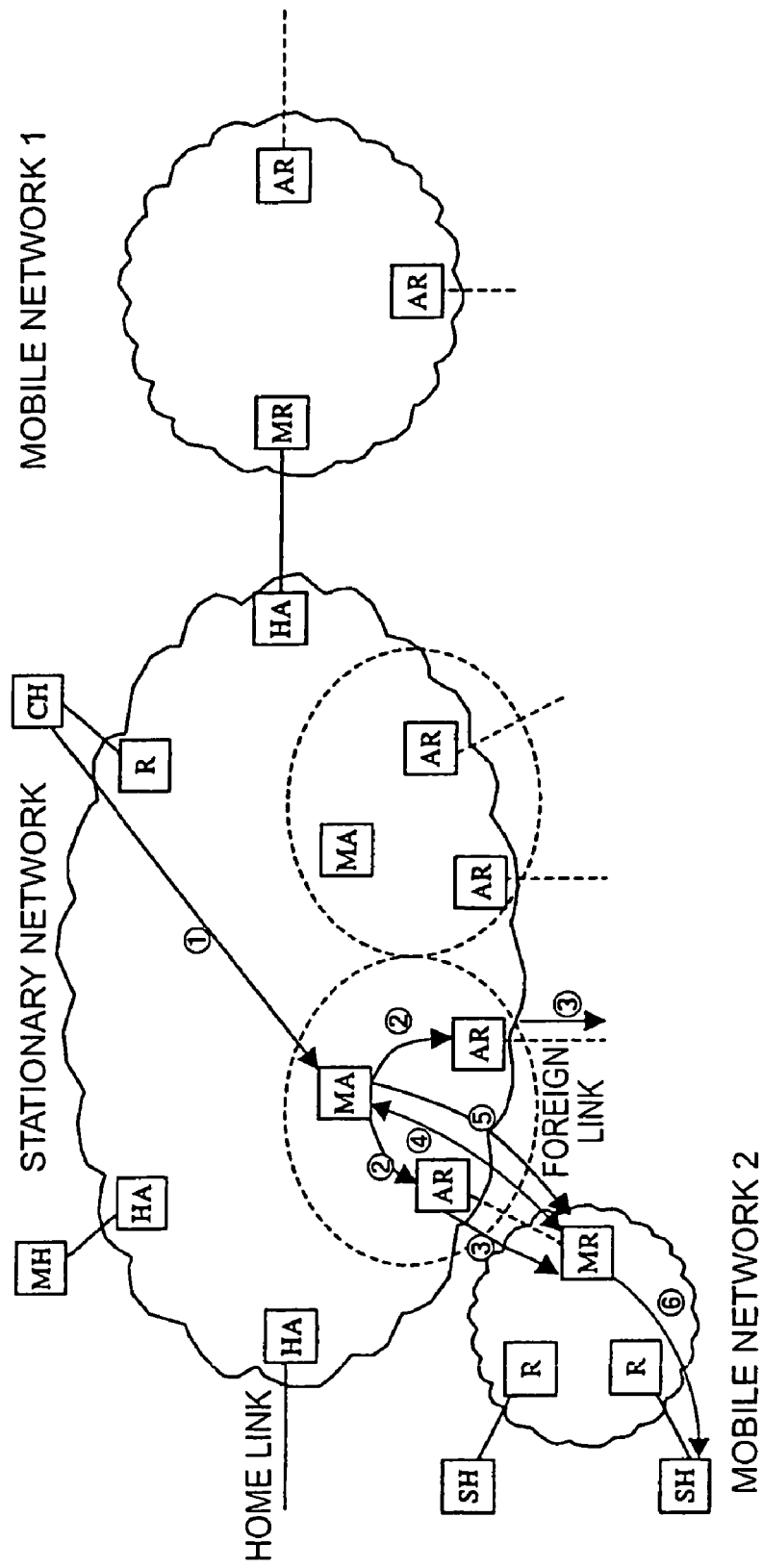
FIG. 43 is an example of operation carried out when in the idle mode the correspondent host sends a packet to the stationary host after the correspondent host receives the Subnet-prefix Binding Update packet from the mobile router.

FIG. 43 is an example of operation carried out when in the idle mode, after the correspondent host receives the Subnet-prefix Binding Update packet from the mobile router, the correspondent host sends a packet to the stationary host. The operation example will be described below on the basis of FIG. 43.

(1) When the correspondent host sends the packet the Subnet-prefixes in the destination address of which are the same as those indicated by the stored binding, it sets the c/o address as the destination of the packet, puts the routing header option in which the home address of the binding is set, into the packet, and then sends it. The packet is routed to the mobility agent by the routers in the stationary network.

(2) Receiving the tunneling packet from the correspondent host, the mobility agent extracts the packet from the payload. When the destination of the extracted packet matches with the Subnet-prefixes of the binding, the mobility agent buffers the packet and sends the Subnet-prefix Paging Request including the Subnet-prefixes, to the access routers in the area.

(3) Receiving the Subnet-prefix Paging Request from the mobility agent, the access routers send to their foreign links the Subnet-prefix Paging Notification in which the home address included in the Subnet-prefix Paging Request is set. The mobile router receives the Subnet-prefix Paging Notification from the access router.

(4) The mobile router judges whether the received Subnet-prefix Paging Notification includes the Subnet-prefixes of the links in the belonging mobile network 2. Without inclusion, the mobile router discards the received Subnet-prefix Paging Notification. With inclusion, the mobile router sends the Subnet-prefix Binding Update packet including the binding between the Subnet-prefixes and the c/o address and indicating that the operating mode is the active mode and that there is no need for the buffering of packet. Receiving the Subnet-prefix Binding Update packet, the mobility agent stores the binding between the Subnet-prefixes and the c/o address, the operating mode being the active mode, and no need for the buffering of packet, and then sends the Subnet-prefix Binding Acknowledgement packet to the mobile router. Receiving the Subnet-prefix Binding Acknowledgement packet, the mobile router recognizes that the Subnet-prefix Binding Update packet has arrived at the mobility agent and that normal processing is done.

(5) The mobility agent puts each buffered packet into the payload of a tunneling packet the destination of which is the c/o address of the binding, and sends it. The tunneling packet is routed to the mobile router by the routers in the stationary network.

(6) Receiving the tunneling packet from the mobility agent, the mobile router extracts the packet from the payload. When the Subnet-prefixes in the destination match with those of the links in the mobile network 2, the mobile router sends the packet into the mobile network 2. The packet is routed to the stationary host by the routers in the mobile network 2. The stationary host receives the packet directed to its own address at last.

Figure 44:
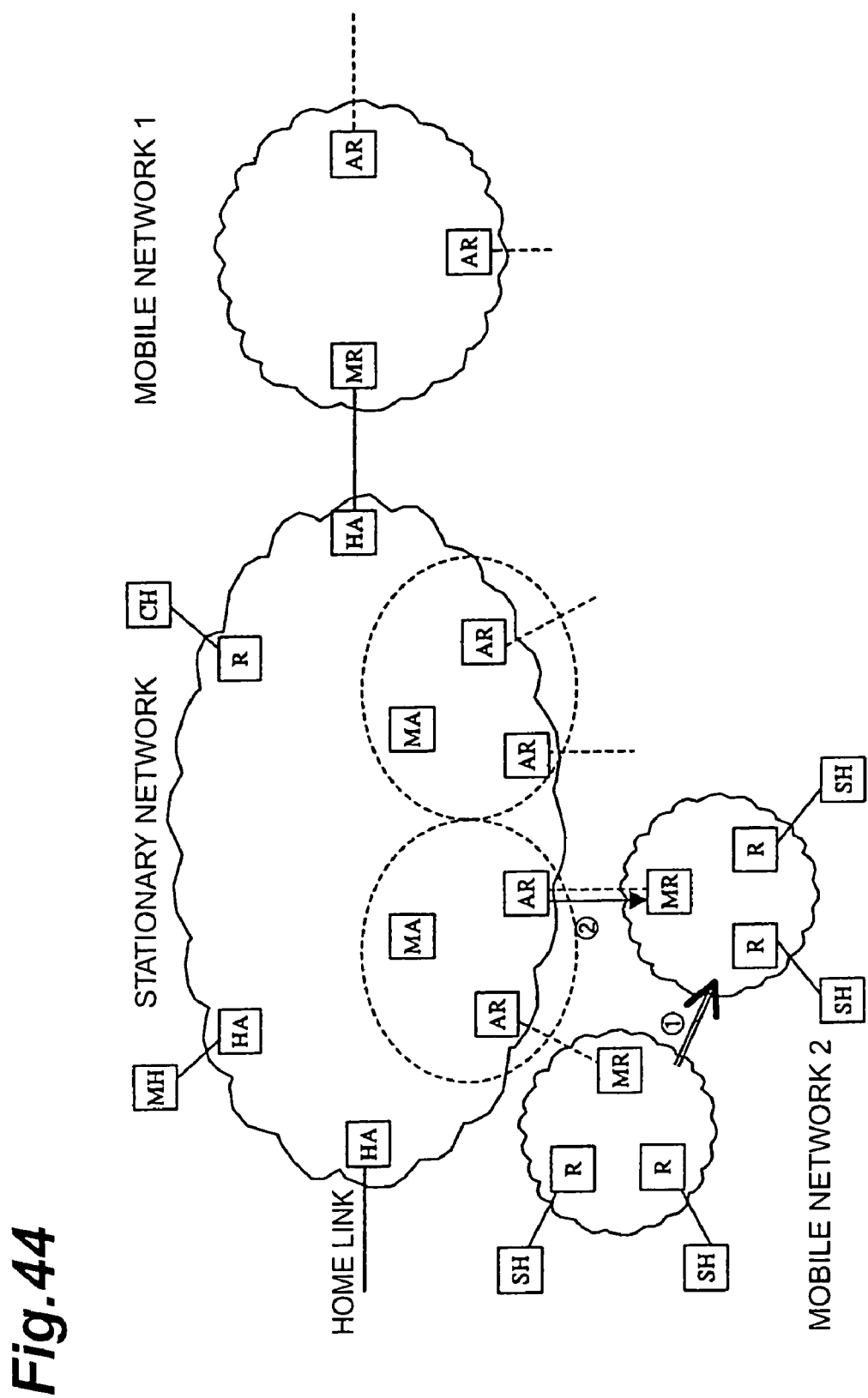
FIG. 44 is an example of operation carried out when in the idle mode the mobile network 2 moves between foreign links provided by access routers in an area of an identical mobility agent.

FIG. 44 is an example of operation carried out when in the idle mode the mobile router moves between foreign links provided by access routers in the area of the same mobility agent. The operation example will be described below on the basis of FIG. 44.

(1) The mobile router moves between foreign links.

(2) After the mobile router has moved to another foreign link, it acquires a c/o address and an address of a mobility agent from an access router. The mobile router judges whether there is change in the mobility agent address, and performs nothing without any change of the mobility agent address.

Figure 45:
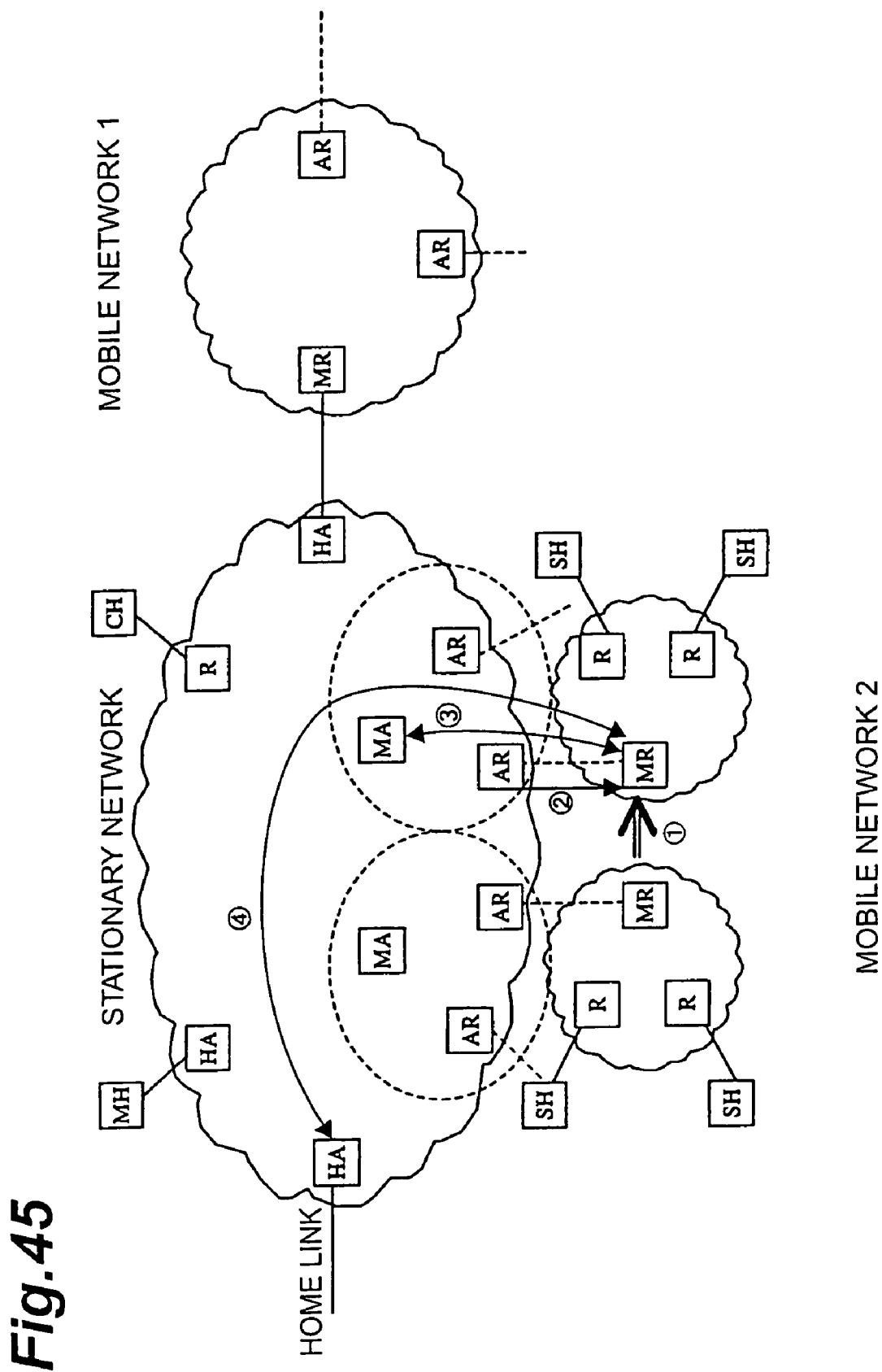
FIG. 45 is an example of operation carried out when in the idle mode the mobile network 2 moves to a foreign link provided by an access router in an area of a different mobility agent.

FIG. 45 is an example of operation carried out when in the idle mode the mobile router moves to a foreign link provided by an access router in an area of a different mobility agent. The operation example will be described below on the basis of FIG. 45.

(1) The mobile router moves between foreign links.

(2) After the mobile router has moved to another foreign link, it acquires a c/o address and an address of a mobility agent from an access router.

(3) The mobile router judges whether there is change in the mobility agent address. With change, the mobile router sends to the mobility agent the Binding Update packet including the binding between the home address and the c/o address and indicating that the operating mode is the idle mode and that the buffering of packet is necessary. Receiving the Binding Update packet, the mobility agent stores the binding between the home address and the c/o address, the operating mode being the idle mode, and the need for the buffering of packet, and then sends the Binding Acknowledgement packet to the mobile router. Receiving the Binding Acknowledgement packet, the mobile router recognizes that the Binding Update packet has arrived at the mobility agent and that normal processing is done. The mobile router further sends to the mobility agent the Subnet-prefix Binding Update packet including the binding between the Subnet-prefixes of the links included in the mobile network 2 and the c/o address and indicating that the operating mode is the idle mode and that the buffering of packet is necessary. Receiving the Subnet-prefix Binding Update packet, the mobility agent stores the binding between the Subnet-prefixes and the c/o address, the operating mode being the idle mode, and the need for the buffering of packet, and then sends the Subnet-prefix Binding Acknowledgement packet to the mobile router. Receiving the Subnet-prefix Binding Acknowledgement packet, the mobile router recognizes that the Binding Update packet has arrived at the mobility agent and that normal processing is done.

(4) The mobile router sends to the home agent the Binding Update packet including the binding between the home address and the mobility agent address. Receiving the Binding Update packet, the home agent stores the binding between the home address and the c/o address and sends the Binding Acknowledgement packet to the mobile router. Receiving the Binding Acknowledgement packet, the mobile router recognizes that the Binding Update packet has arrived at the home agent and that normal processing is done. The mobile router further sends to the home agent the Subnet-prefix Binding Update packet including the binding between the Subnet-prefixes of the links included in the mobile network 2 and the mobility agent address. Receiving the Subnet-prefix Binding Update packet, the home agent stores the binding between the Subnet-prefixes and the c/o address and sends the Subnet-prefix Binding Acknowledgement packet to the mobile router. Receiving the Subnet-prefix Binding Acknowledgement packet, the mobile router recognizes that the Subnet-prefix Binding Update packet has arrived at the home agent and that normal processing is done.

(5) The mobile router sends to the correspondent host the Binding Update packet including the binding between the home address and the mobility agent address. Receiving the Binding Update packet, the correspondent host stores the Binding between the home address and the mobility agent address. The mobile router further sends to the correspondent host the Subnet-prefix Binding Update packet including the binding between the Subnet-prefixes of the links included in the mobile network 2 and the mobility agent address. Receiving the Subnet-prefix Binding Update packet, the correspondent host stores the binding between the Subnet-prefixes and the mobility agent address.

Figure 46:
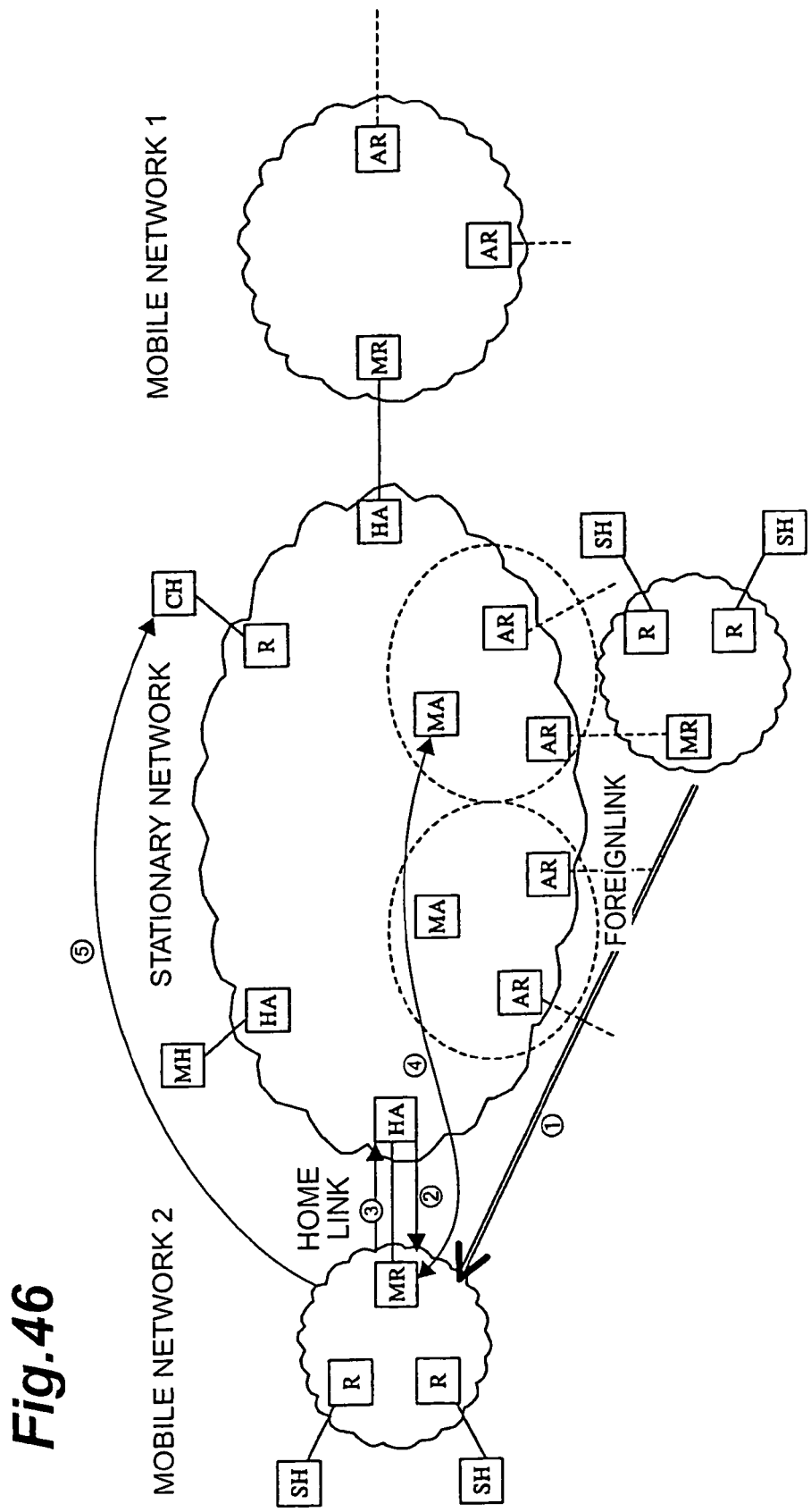
FIG. 46 is an example of operation carried out when in the idle mode the mobile network 2 moves from a foreign link to its home link.

FIG. 46 is an example of operation carried out when in the idle mode the mobile router moves from the foreign link to the home link. The operation example will be described below on the basis of FIG. 46.

(1) The mobile router moves from the foreign link to the home link.

(2) The mobile router recognizes that it has moved to the home link. For example, the mobile router can judge that it has moved from the foreign link to the home link, by receiving Router Advertisement sent from the home agent.

(3) The mobile router sends to the home agent the Binding Update packet requesting to erase the stored binding between the home address and the mobility agent address. Receiving the Binding Update packet, the home agent erases the binding between the home address and the mobility agent address and sends the Binding Acknowledgement packet to the mobile router. Thereafter, the home agent stops performing the operation of receiving the packet instead of the mobile router and forwarding the packet to the mobility agent. The mobile router further sends to the home agent the Subnet-prefix Binding Update packet requesting to erase the stored binding between the Subnet-prefixes and the mobility agent address. Receiving the Subnet-prefix Binding Update packet, the home agent erases the binding between the Subnet-prefixes and the mobility agent address and sends the Subnet-prefix Binding Acknowledgement packet to the mobile router. Thereafter, the home agent stops performing the operation of receiving the packet instead of the mobile router and forwarding the packet to the mobility agent.

(4) The mobile router sends to the mobility agent previously used before the movement, the Binding Update packet including the binding between the home address and the home address and indicating that the operating mode is the active mode and that there is no need for the buffering of packet. Receiving the Binding Update packet, the mobility agent stores the binding between the home address and the home address, the operating mode being the active mode, and no need for the buffering of packet, and then sends the Binding Acknowledgement packet to the mobile router. Receiving the Binding Acknowledgement packet, the mobile router recognizes that the Binding Update packet has arrived at the previous mobility agent and that normal processing is done. The mobile router further sends to the mobility agent previously used before the movement, the Subnet-prefix Binding Update packet including the binding between the Subnet-prefixes of the links included in the mobile network 2 and the home address and indicating that the operating mode is the active mode and that there is no need for the buffering of packet. Receiving the Subnet-prefix Binding Update packet, the mobility agent stores the binding between the Subnet-prefixes and the home address, the operating mode being the active mode, and no need for the buffering of packet, and then sends the Subnet-prefix Binding Acknowledgement packet to the mobile router. Receiving the Subnet-prefix Binding Acknowledgement packet, the mobile router recognizes that the Binding Update packet has arrived at the previous mobile agent and that normal processing is done.

(5) The mobile router sends to the correspondent host the Binding Update packet including the binding between the home address and the home address. Receiving the Binding Update packet, the correspondent host deletes the stored Binding between the home address and the mobility agent address. The mobile router further sends to the correspondent host the Subnet-prefix Binding Update packet including the binding between the Subnet-prefixes of the links included in the mobile network 2 and the home address. Receiving the Subnet-prefix Binding Update packet, the correspondent host deletes the binding between the Subnet-prefixes and the mobility agent address.

Figure 47:
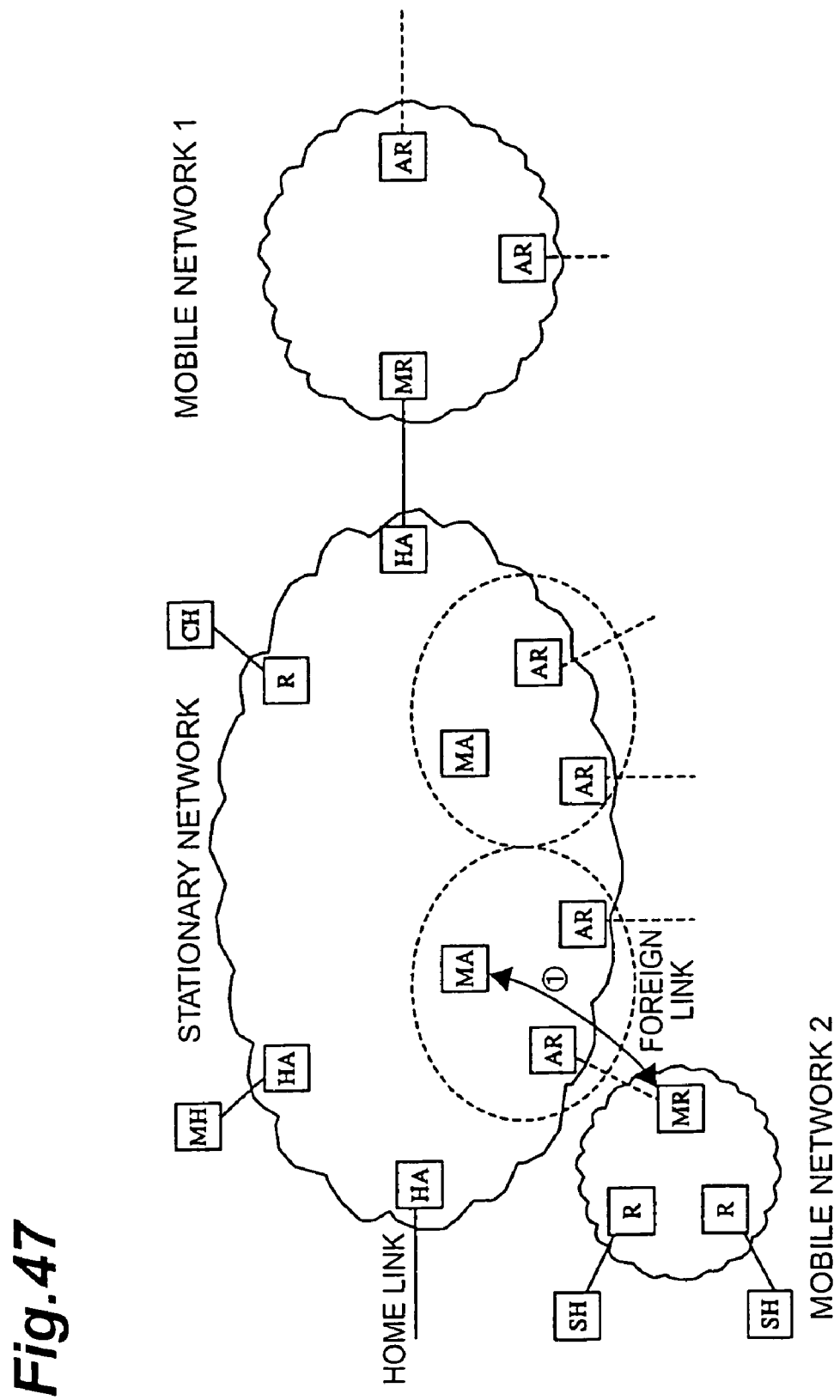
FIG. 47 is an example of operation carried out when the operating mode transitions from the idle mode to the active mode.

FIG. 47 is an example of operation of the packet communication system carried out when the operating mode transitions from the idle mode to the active mode. When during the operating mode of the idle mode a node in the mobile network sends a packet to the correspondent host, the present operation example is carried out. The operation example will be described below on the basis of FIG. 47.

(1) The mobile router sends to the mobility agent the Binding Update packet including the binding between the home address and the c/o address and indicating that the operating mode is the active mode and that there is no need for the buffering of packet. Receiving the Binding Update packet, the mobility agent stores the binding between the home address and the c/o address, the operating mode being the active mode, and no need for the buffering of packet, and then sends the Binding Acknowledgement packet to the mobile router. Receiving the Binding Acknowledgement packet, the mobile router recognizes that the Binding Update packet has arrived at the mobility agent and that normal processing is done. The mobile router further sends to the mobility agent the Subnet-prefix Binding Update packet including the binding between the Subnet-prefixes of the links included in the mobile network 2 and the c/o address and indicating that the operating mode is the active mode and that there is no need for the buffering of packet. Receiving the Subnet-prefix Binding Update packet, the mobility agent stores the binding between the Subnet-prefixes and the c/o address, the operating mode being the active mode, and no need for the buffering of packet, and then sends the Subnet-prefix Binding Acknowledgement packet to the mobile router. Receiving the Subnet-prefix Binding Acknowledgement packet, the mobile router recognizes that the Subnet-prefix Binding Update packet has arrived at the mobility agent and that normal processing is done.

Described on the basis of FIGS. 41 to 47 above were the operation examples in the idle mode of the packet communication system according to the present invention. When the mobile router moves between foreign links present in an area of one mobility agent, it does not have to send the Binding Update packet and the Subnet-prefix Binding Update packet to either of the mobility agent, the home agent, and the correspondent host.

Figure 48:
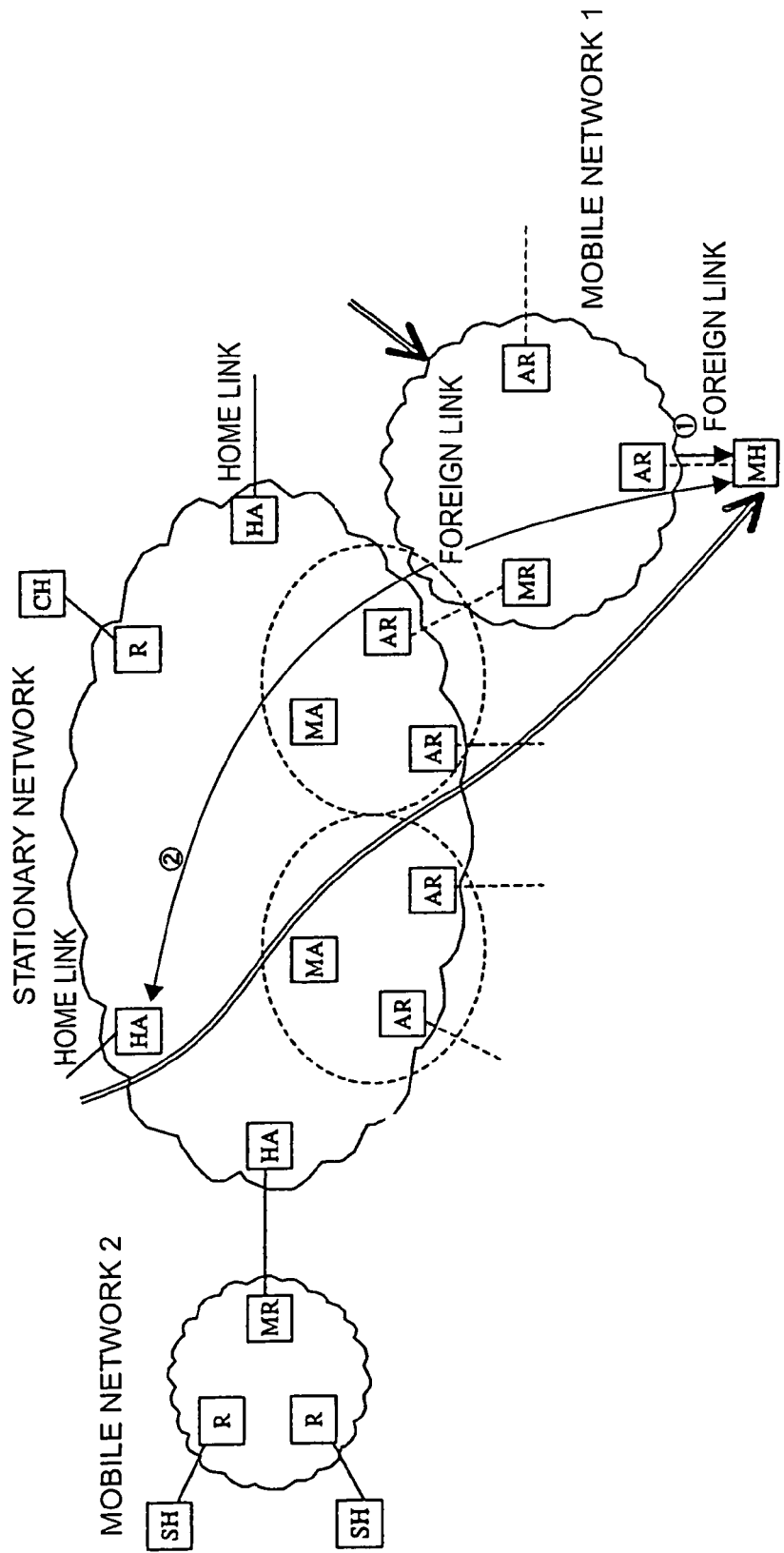
FIG. 48 is an example of operation carried out when the mobile network 1 moves from its home link to a foreign link and when the mobile host moves from its home link to a foreign link of the mobile network 1.

FIG. 48 is an example of operation carried out when the mobile network 1 moves from its home link to a foreign link and when the mobile host moves from its home link to a foreign link in the mobile network 1. Since the operation of the mobile network 1 is the same as in the operation examples of the mobile network 2 shown in FIGS. 33 to 47, the description thereof is omitted herein.

(1) After the mobile host has moved from the home link to the foreign link, it acquires a c/o address from an access router.

(2) The mobile host sends the Binding Update packet including binding of the home address, to the home agent of the home link of the mobile host. Receiving the Binding Update packet, the home agent of the home link of the mobile host stores the binding between the home address and the c/o address and sends the Binding Acknowledgement packet to the mobile host. Receiving the Binding Acknowledgement packet, the mobile host recognizes that the Binding Update packet has arrived at the home agent of the home link of the mobile host and that normal processing is done.

When the mobile network 1 moves between foreign links of the stationary network, the mobile network 1 operates as in the operation examples of the mobile network 2 shown in FIGS. 38 to 41. When the mobile host moves between foreign links of the mobile network 1, the mobile host operates as in (1) and (2) above.

Figure 49:
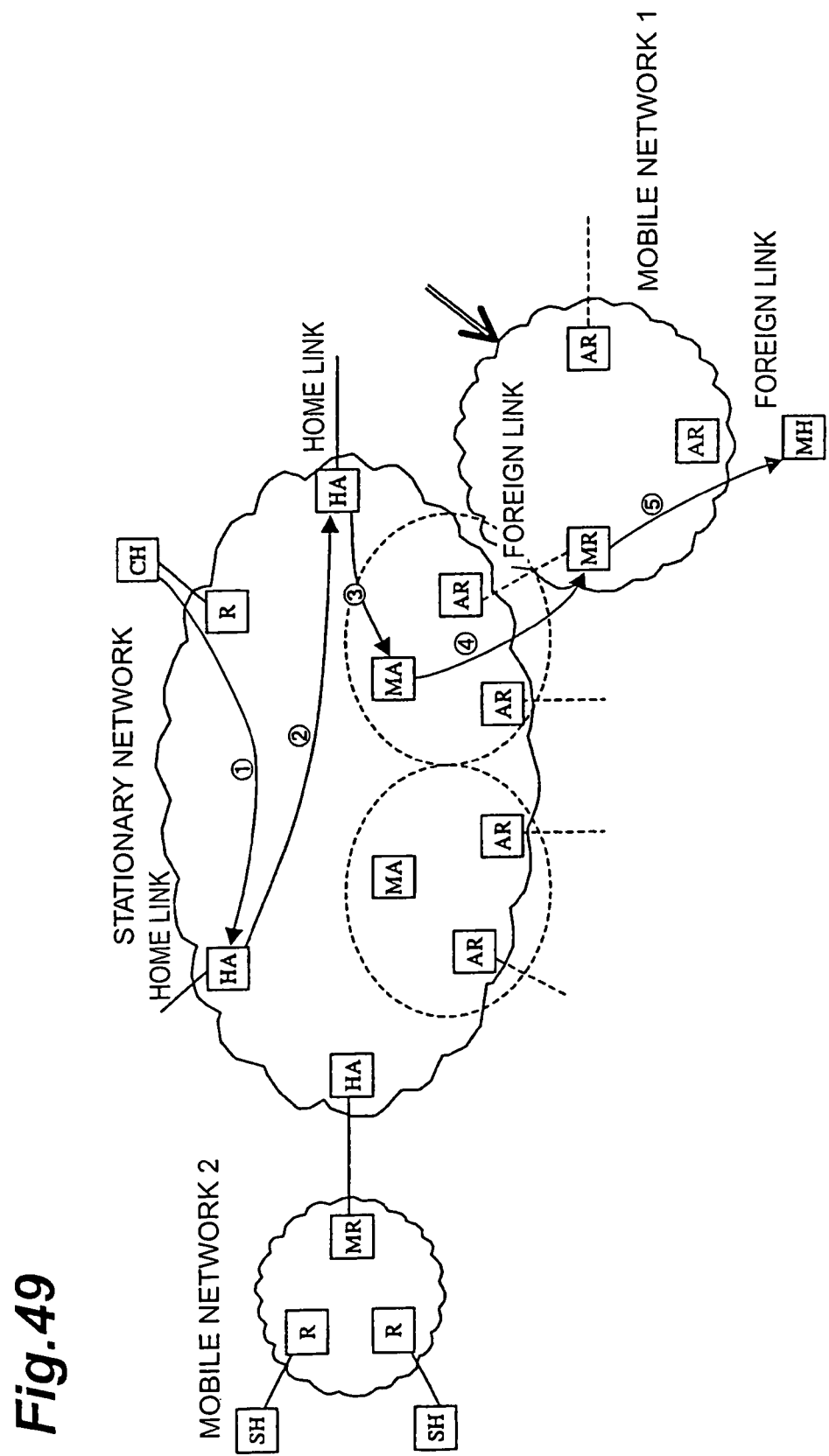
FIG. 49 is an example of operation carried out when in the active mode the correspondent host sends a packet to the mobile host.

FIG. 49 is an example of operation carried out when in the active mode the correspondent host sends a packet to the mobile host present at the foreign link of the mobile network 1. The operation example will be described below on the basis of FIG. 49.

(1) The correspondent host sends the packet the destination of which is the home address of the mobile host. The packet is routed to the home link of the mobile host by the routers in the stationary network.

(2) When the destination of the packet is the home address of the mobile host, the home agent of the home link of the mobile host receives the packet instead of the mobile host, generates a tunneling packet the destination of which is the c/o address of the mobile host of the binding, puts the received packet into the payload of the tunneling packet, and sends it. The tunneling packet is routed to the home link of the mobile network 1 by the routers in the stationary network.

(3) When the Subnet-prefixes in the destination of the packet are those in the binding, the home agent of the home link of the mobile network 1 receives the packet instead of the mobile router, generates a tunneling packet the destination of which is the mobility agent address of the binding, puts the received tunneling packet into the payload of the tunneling packet, and sends it. This tunneling packet is routed to the mobility agent by the routers in the stationary network.

(4) Receiving the tunneling packet from the home agent, the mobility agent extracts the packet included therein. When the Subnet-prefixes in the destination of the extracted packet match with those in the binding, the mobility agent puts the packet into the payload of a tunneling packet the destination of which is the c/o address of the binding, and sends the tunneling packet. The tunneling packet is routed to the mobile router by the routers in the stationary network.

(5) Receiving the tunneling packet from the mobility agent, the mobile router extracts the tunneling packet from the payload. When the Subnet-prefixes in the destination match with those of the links in the mobile network 1, the mobile router sends the tunneling packet into the mobile network 1. The packet is routed to the mobile host by the routers in the mobile network 1. Receiving the tunneling packet directed to the c/o address, the mobile host extracts the packet from the payload to receive the packet directed to its own home address at last.

Figure 50:
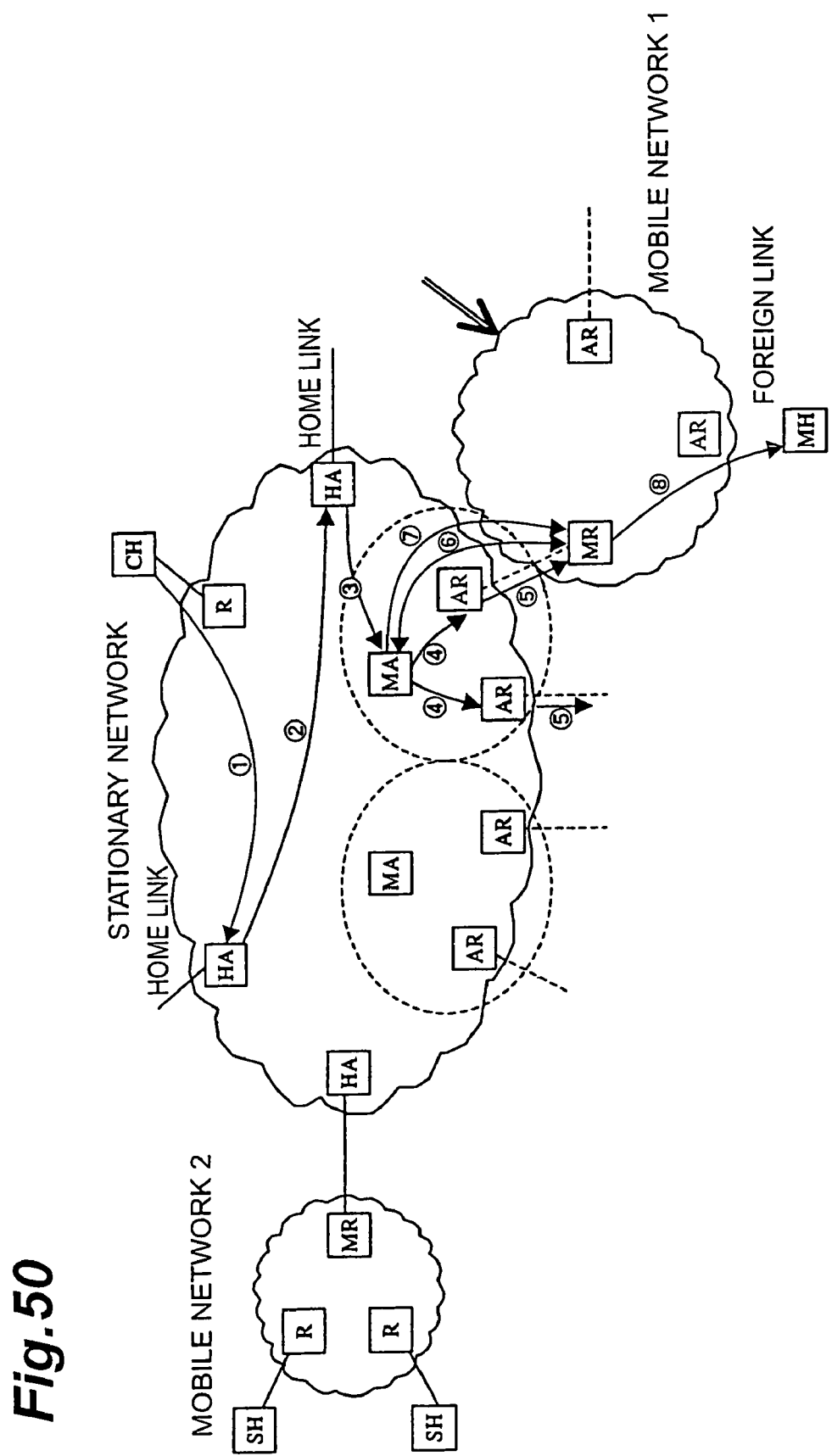
FIG. 50 is an example of operation carried out when in the idle mode the correspondent host sends a packet to the mobile host.

FIG. 50 is an example of operation carried out when in the idle mode the correspondent host sends a packet to the mobile host present at the foreign link of the mobile network 1. The operation example will be described below on the basis of FIG. 50.

(1) The correspondent host sends the packet the destination of which is the home address of the mobile host. The packet is routed to the home link of the mobile host by the routers in the stationary network.

(2) When the destination of the packet is the home address of the mobile host, the home agent of the home link of the mobile host receives the packet instead of the mobile host, generates a tunneling packet the destination of which is the c/o address of the mobile host of the binding, puts the received packet into the payload of the tunneling packet, and sends it. The tunneling packet is routed to the home link of the mobile network 1 by the routers in the stationary network.

(3) When the Subnet-prefixes in the destination of the packet are those in the binding, the home agent of the home link of the mobile network 1 receives the packet instead of the mobile router, generates a tunneling packet the destination of which is the mobility agent address of the binding, puts the received tunneling packet into the payload of the tunneling packet, and sends it. The tunneling packet is routed to the mobility agent by the routers in the stationary network.

(4) The mobility agent receives the tunneling packet from the home agent and then extracts the tunneling packet from the payload. When the destination of the extracted tunneling packet matches with the Subnet-prefixes of the binding, the mobility agent buffers the tunneling packet and sends the Subnet-prefix Paging Request including the Subnet-prefixes, to the access routers in the area.

(5) Receiving the Subnet-prefix Paging Request from the mobility agent, the access routers send to their foreign links the Subnet-prefix Paging Notification in which the home address included in the Subnet-prefix Paging Request is set. The mobile router receives the Subnet-prefix Paging Notification from the access router.

(6) The mobile router judges whether the received Subnet-prefix Paging Notification includes the Subnet-prefixes of the links in the belonging mobile network 1. Without inclusion, the mobile router discards the received Subnet-prefix Paging Notification. With inclusion, the mobile router sends the Subnet-prefix Binding Update packet including the binding between the Subnet-prefixes and the c/o address and indicating that the operating mode is the active mode and that there is no need for the buffering of packet. Receiving the Subnet-prefix Binding Update packet, the mobility agent stores the binding between the Subnet-prefixes and the c/o address, the operating mode being the active mode, and no need for the buffering of packet, and then sends the Subnet-prefix Binding Acknowledgement packet to the mobile router. Receiving the Subnet-prefix Binding Acknowledgement packet, the mobile router recognizes that the Subnet-prefix Binding Update packet has arrived at the mobility agent and that normal processing is done.

(7) The mobility agent puts each buffered tunneling packet into the payload of a tunneling packet the destination of which is the c/o address of the binding, and sends it. The tunneling packet is routed to the mobile router by the routers in the stationary network.

(8) Receiving the tunneling packet from the mobility agent, the mobile router extracts the tunneling packet from the payload. When the Subnet-prefixes in the destination match with those of the links in the mobile network 1, the mobile router sends the tunneling packet into the mobile network 1. The tunneling packet is routed to the mobile host by the routers in the mobile network 1. Receiving the tunneling packet directed to the c/o address, the mobile host extracts the packet from the payload to receive the packet directed to its own home address at last.

Described on the basis of FIGS. 48 to 50 above were the operation examples where the mobile host moved to the foreign link of the mobile network 1 in the packet communication system of the present invention. Since the operation associated with the movement of the mobile network 1 is independent of the operation associated with the movement of the mobile host, when the mobile network 1 moves together with the mobile host between foreign links of the stationary network, the mobile host does not have to send the Binding Update packet to the home agent of the mobile host.

Figure 51:
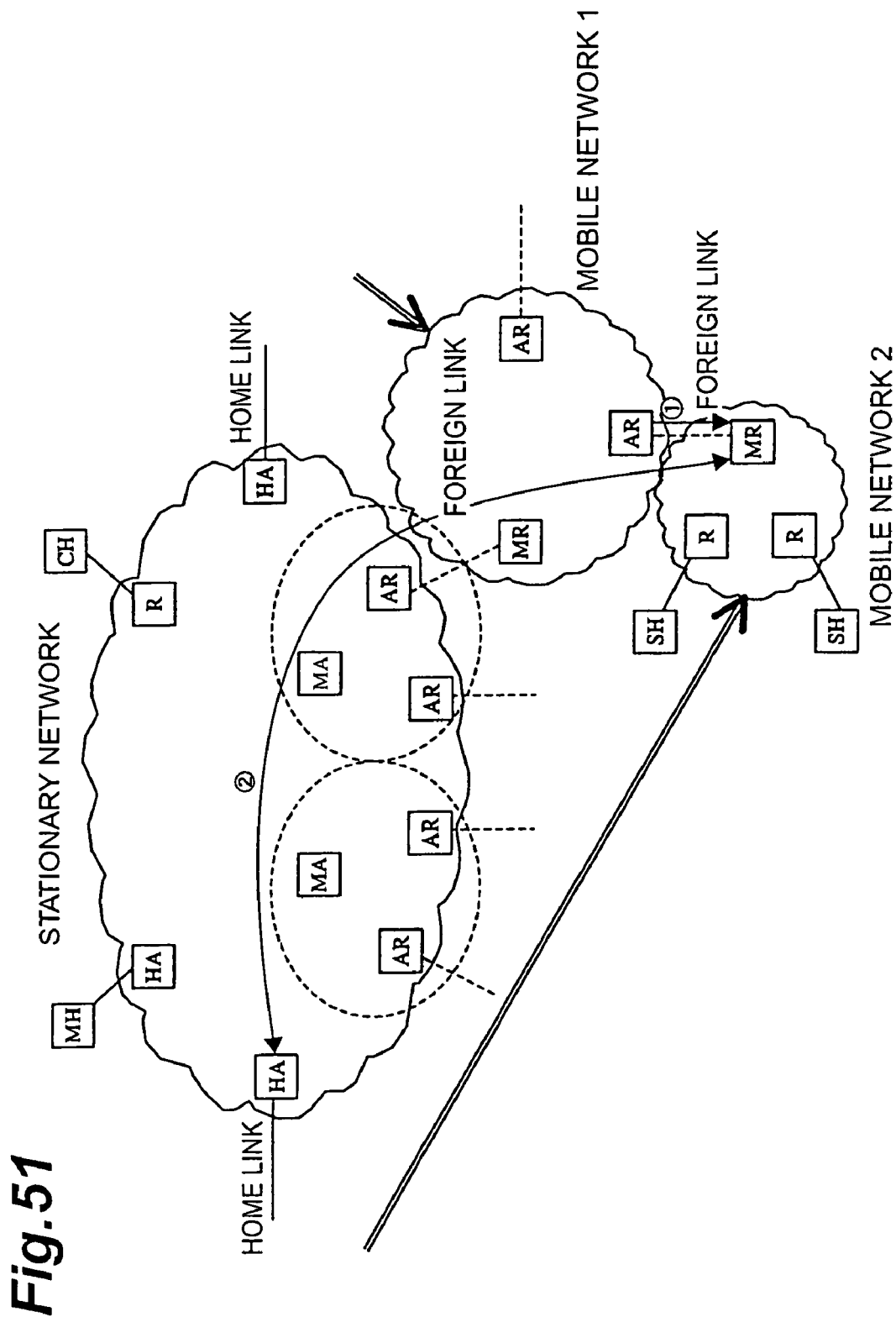
FIG. 51 is an example of operation carried out when the mobile network 1 moves from its home link to a foreign link and when the mobile network 2 moves from its home link to a foreign link.

FIG. 51 is an example of operation carried out when the mobile network 1 moves from its home link to the foreign link and when the mobile network 2 moves from its home link to a foreign link of the mobile network 1. Since the operation of the mobile network 1 is the same as in the operation examples of the mobile network 1 shown in FIGS. 33 to 47, the description thereof is omitted herein.

(1) After the mobile network 2 has moved from the home link to the foreign link of the mobile network 1, the mobile router of the mobile network 2 acquires a c/o address from an access router.

(2) The mobile router of the mobile network 2 sends to the home agent of the mobile network 2 the Binding Update packet including the binding between the home address and the c/o address. Receiving the Binding Update packet, the home agent stores the binding between the home address and the c/o address and sends the Binding Acknowledgement packet to the mobile router. Receiving the Binding Acknowledgement packet, the mobile router recognizes that the Binding Update packet has arrived at the home agent and that normal processing is done. The mobile router of the mobile network 2 further sends to the home agent of the home link of the mobile router of the mobile network 2 the Subnet-prefix Binding Update packet including the binding between the Subnet-prefixes of the links included in the mobile network 2 and the c/o address. Receiving the Subnet-prefix Binding Update packet, the home agent of the home link of the mobile router of the mobile network 2 stores the binding between the Subnet-prefixes and the c/o address, and sends the Subnet-prefix Binding Acknowledgement packet to the mobile router of the mobile network 2. Receiving the Subnet-prefix Binding Acknowledgement packet, the mobile router of the mobile network 2 recognizes that the Subnet-prefix Binding Update packet has arrived at the home agent of the home link of the mobile router of the mobile network 2 and that normal processing is done.

When the mobile network 1 moves between foreign links of the stationary network, the mobile network 1 operates as in the operation examples of the mobile network 2 shown in FIGS. 43 to 46. When the mobile network 2 moves between foreign links of the mobile network 1, the mobile router of the mobile network 2 operates as in (1) and (2) above.

Figure 52:
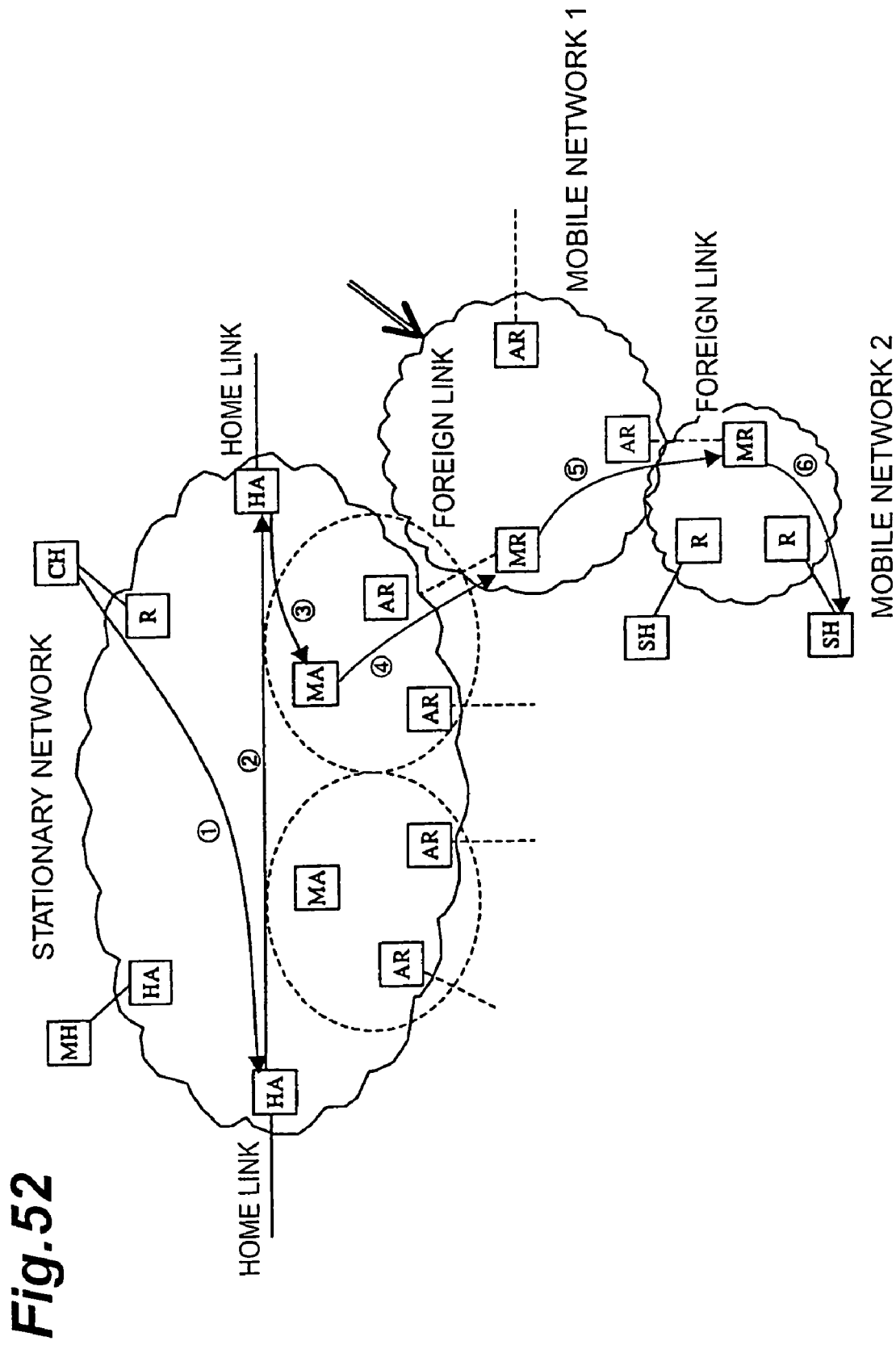
FIG. 52 is an example of operation carried out when in the active mode the correspondent host sends a packet to the stationary host.

FIG. 52 is an example of operation carried out when in the active mode the correspondent host sends a packet to the stationary host of the mobile network 2 present at the foreign link of the mobile network 1. The operation example will be described below on the basis of FIG. 52.

(1) The correspondent host sends the packet the destination of which is the address of the stationary host. The packet is routed to the home link of the mobile network 2 where the stationary host is present, by the routers in the stationary network.

(2) When the Subnet-prefixes in the destination of the packet are those in the binding, the home agent of the home link of the mobile network 2 receives the packet instead of the mobile router of the mobile network 2, generates a tunneling packet the destination of which is the c/o address of the mobile router of the binding, puts the received packet into the payload of the tunneling packet, and sends it. The tunneling packet is routed to the home link of the mobile network 1 by the routers in the stationary network.

(3) When the Subnet-prefixes in the destination of the tunneling packet are those in the binding, the home agent of the home link of the mobile network 1 receives the tunneling packet instead of the mobile router of the mobile network 1, generates a tunneling packet the destination of which is the mobility agent address of the binding, puts the received tunneling packet into the payload of the tunneling packet, and sends it. The tunneling packet is routed to the mobility agent by the routers in the stationary network.

(4) Receiving the tunneling packet from the home agent of the mobile network 1, the mobility agent extracts the tunneling packet included in the payload. When the Subnet-prefixes in the destination of the extracted tunneling packet match with those in the binding, the mobility agent puts the tunneling packet into the payload of a tunneling packet the destination of which is the c/o address of the binding, and sends it. The tunneling packet is routed to the mobile router of the mobile network 1 by the routers in the stationary network.

(5) Receiving the tunneling packet from the mobility agent address, the mobile router of the mobile network 1 extracts the tunneling packet from the payload. When the Subnet-prefixes in the destination match with those of the links in the mobile network 1, the mobile router of the mobile network 1 sends the tunneling packet into the mobile network 1. The packet is routed to the mobile router of the mobile network 2 by the routers in the mobile network 1.

(6) Receiving the tunneling packet, the mobile router of the mobile network 2 extracts the packet from the payload. When the Subnet-prefixes in the destination match with those of the links in the mobile network 2, the mobile router of the mobile network 2 sends the packet into the mobile network 2. The packet is routed to the stationary host by the routers in the mobile network 2. The stationary host receives the packet directed to its own address at last.

Figure 53:
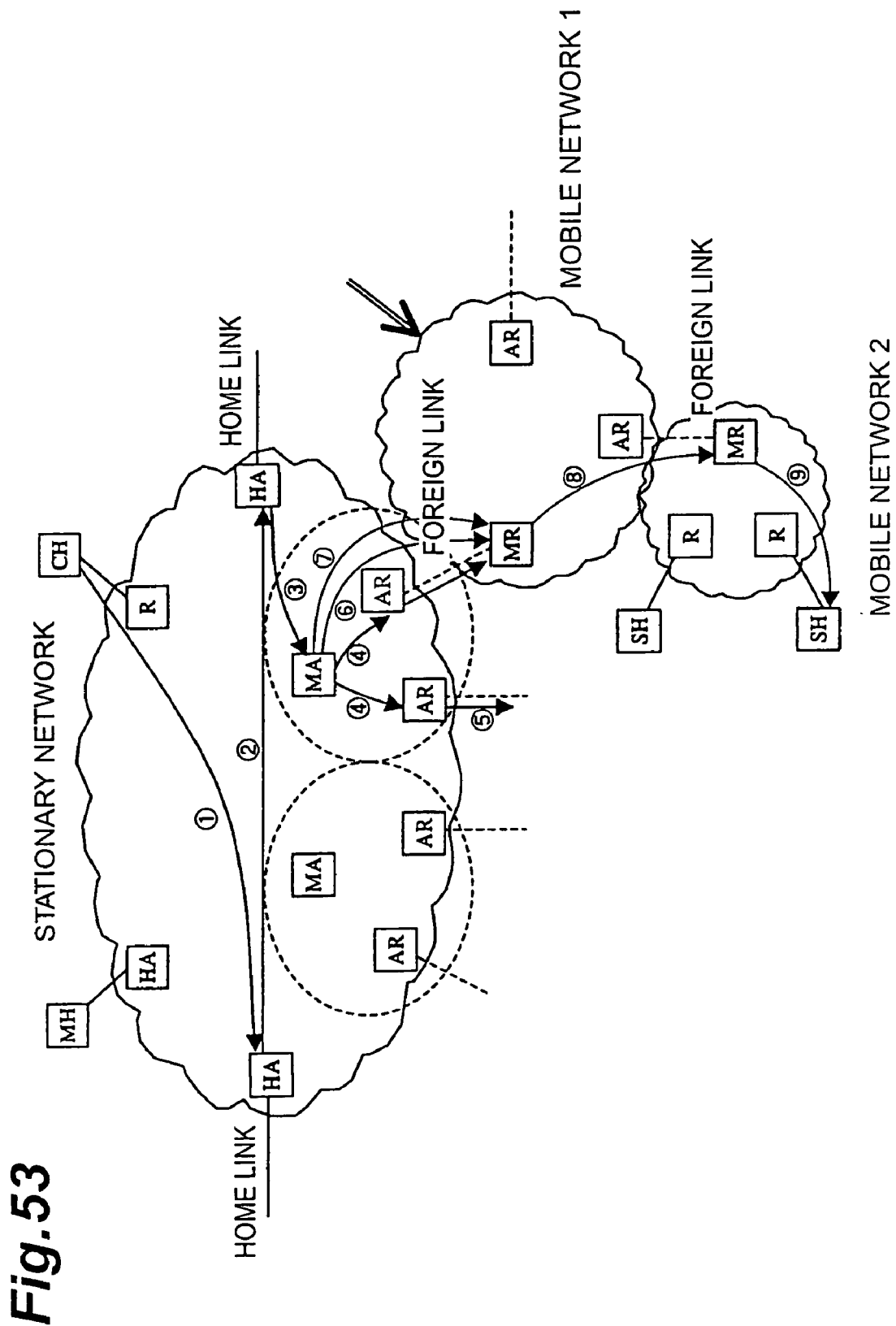
FIG. 53 is an example of operation carried out when in the idle mode the correspondent host sends a packet to the stationary host.

FIG. 53 is an example of operation carried out when in the idle mode the correspondent host sends a packet to the stationary host of the mobile network 2 present at the foreign link of the mobile network 1. The operation example will be described below on the basis of FIG. 53.

(1) The correspondent host sends the packet the destination of which is the address of the stationary host. The packet is routed to the home link of the mobile network 2 at which the stationary host is present, by the routers in the stationary network.

(2) When the Subnet-prefixes in the destination of the packet are those in the binding, the home agent of the home link of the mobile network 2 receives the packet instead of the mobile router of the mobile network 2, generates a tunneling packet the destination of which is the c/o address of the mobile router of the binding, puts the received packet into the payload of the tunneling packet, and sends it. The tunneling packet is routed to the home link of the mobile network 1 by the routers in the stationary network.

(3) When the Subnet-prefixes in the destination of the tunneling packet are those in the binding, the home agent of the home link of the mobile network 1 receives the tunneling packet instead of the mobile router of the mobile network 1, generates a tunneling packet the destination of which is the mobility agent address of the binding, puts the received tunneling packet into the payload of the tunneling packet, and sends it. The tunneling packet is routed to the mobility agent by the routers in the stationary network.

(4) The mobility agent receives the tunneling packet from the home agent and extracts the tunneling packet from the payload. When the destination of the extracted tunneling packet matches with the Subnet-prefixes of the binding, the mobility agent buffers the tunneling packet and sends the Subnet-prefix Paging Request including the Subnet-prefixes, to the access routers in the area.

(5) Receiving the Subnet-prefix Paging Request from the mobility agent, the access routers send to their foreign links the Subnet-prefix Paging Notification in which the home address included in the Subnet-prefix Paging Request is set. The mobile router receives the Subnet-prefix Paging Notification from the access router.

(6) The mobile router of the mobile network 1 judges whether the received Subnet-prefix Paging Notification includes the Subnet-prefixes of the links in the belonging mobile network 1. Without inclusion, the mobile router discards the received Subnet-prefix Paging Notification. With inclusion, the mobile router sends the Subnet-prefix Binding Update packet including the binding between the Subnet-prefixes and the c/o address and indicating that the operating mode is the active mode and that there is no need for the buffering of packet. Receiving the Subnet-prefix Binding Update packet, the mobility agent stores the binding between the Subnet-prefixes and the c/o address, the operating mode being the active mode, and no need for the buffering of packet, and then sends the Subnet-prefix Binding Acknowledgement packet to the mobile router. Receiving the Subnet-prefix Binding Acknowledgement packet, the mobile router recognizes that the Subnet-prefix Binding Update packet has arrived at the mobility agent and that normal processing is done.

(7) The mobility agent puts each buffered tunneling packet into the payload of a tunneling packet the destination of which is the c/o address of the binding. The tunneling packet is routed to the mobile router of the mobile network 1 by the routers in the stationary network.

(8) Receiving the tunneling packet from the mobility agent, the mobile router of the mobile network 1 extracts the tunneling packet from the payload. When the Subnet-prefixes in the destination match with those of the links in the mobile network 1, the mobile router of the mobile network 1 sends the packet into the mobile network 1. The tunneling packet is routed to the mobile router of the mobile network 2 by the routers in the mobile network 1.

(9) Receiving the tunneling packet from the mobility agent, the mobile router of the mobile network 2 extracts the packet from the payload. When the Subnet-prefixes in the destination match with those of the links in the mobile network 2, the mobile router of the mobile network 2 sends the packet into the mobile network 2. The packet is routed to the stationary host by the routers in the mobile network 2. The stationary host receives the packet directed to its own address at last.

Described on the basis of FIGS. 51 to 53 above were the operation examples where the mobile network 2 moved to the foreign link of the mobile network 1 in the packet communication system of the present invention. Since the operation associated with the movement of the mobile network 1 is independent of the operation associated with the movement of the mobile network 2, when the mobile network 1 moves together with the mobile network 2, the mobile router of the mobile network 2 does not have to send the Binding Update packet to the home agent of the mobile network 2.

Figure 54:
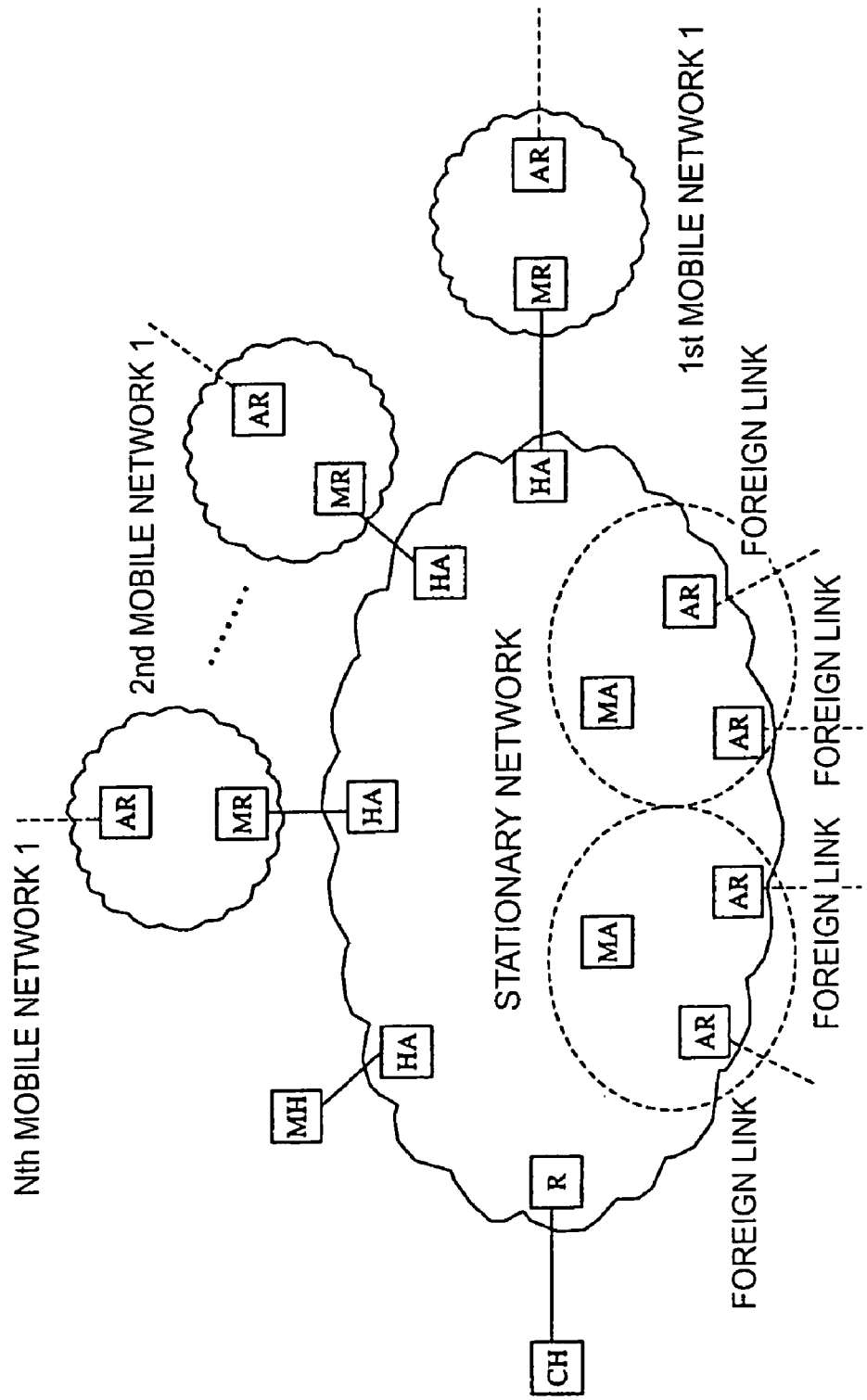
FIG. 54 is a configuration example of a packet communication system including a plurality of mobile networks 1.

FIG. 54 is a configuration example of a packet communication system where N mobile networks 1 exist. In FIG. 54, MH represents a Mobile Host, CH a Correspondent Host, each MR a Mobile Router, each HA a Home Agent, and R a Router. The configuration of each mobile network 1 is the same as in FIG. 28, and has a home link and a home agent in the stationary network. The N mobile networks 1 are allowed to move to a foreign link of the stationary network or to a foreign link of another mobile network 1.

Figure 55:
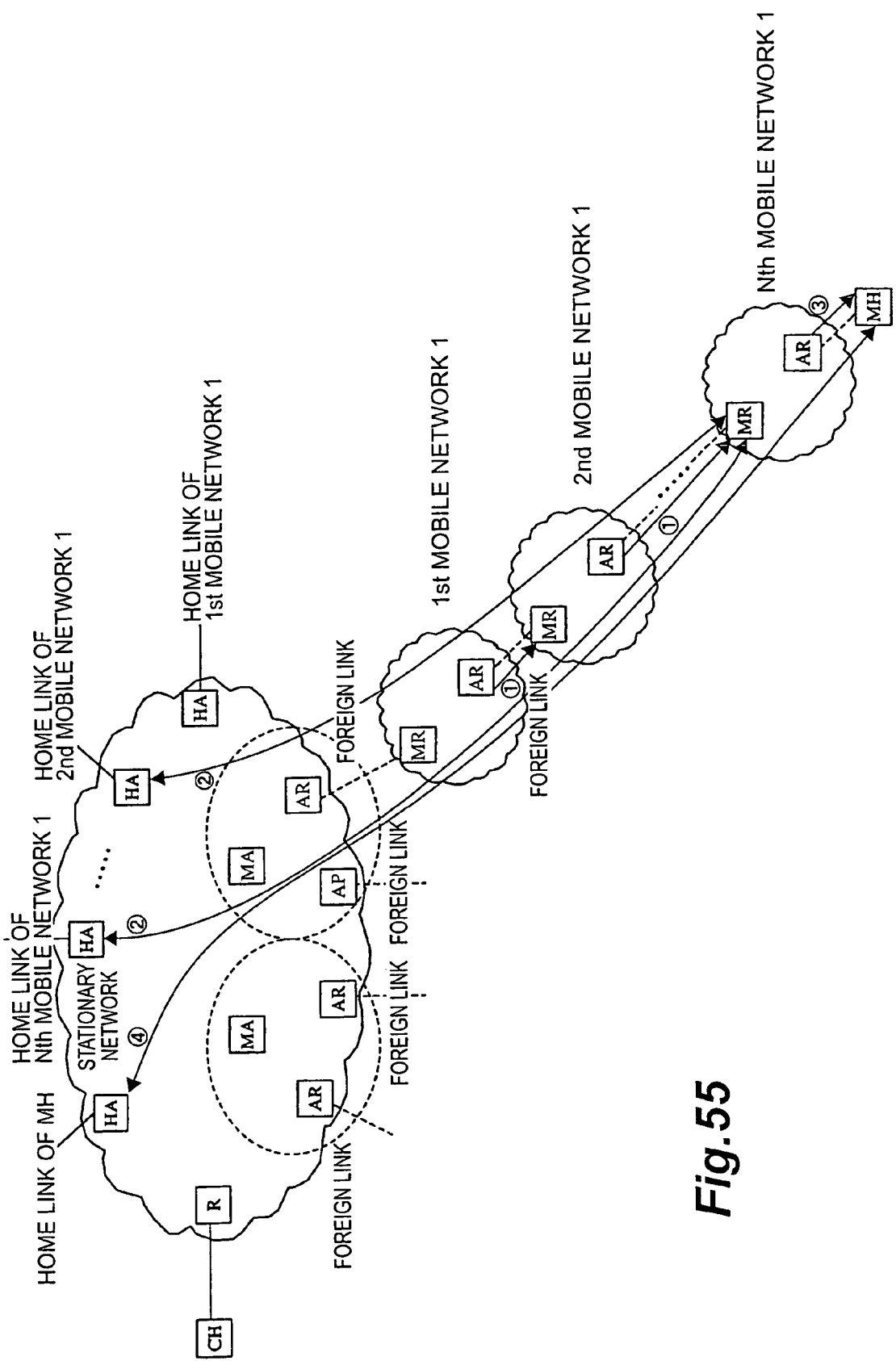
FIG. 55 is an example of operation carried out when the mobile networks 1 and the mobile host are connected like chain.

FIG. 55 is an example of operation carried out when the N mobile networks 1 and the mobile host are connected like chain. Since the first mobile network 1 stays at a foreign link of the stationary network, the operation of the mobile router of the first mobile network 1 is the same as in FIGS. 33 to 47. The description thereof is omitted accordingly.

(1) The mobile routers of the second to Nth mobile networks 1 acquire a c/o address after movement to a foreign link of another mobile network 1.

(2) The mobile routers of the second to Nth mobile networks 1 send the Binding Update packet including the binding between the home address and the c/o address and others, to the home agents of the respective mobile networks 1. Each home agent stores the binding and others, and then sends the Binding Acknowledgement packet to the corresponding mobile router. Receiving the Binding Acknowledgement packet, each of the mobile routers determines that normal processing is done. The mobile routers of the second to Nth mobile networks 1 further send to the home agents of the respective mobile networks 1, the Subnet-prefix Binding Update packet including the binding between the Subnet-prefixes of the links in each mobile network 1 and the c/o address and others. Each home agent stores the binding and others, and then sends the Subnet-prefix Binding Acknowledgement packet to the corresponding mobile router. Receiving the Subnet-prefix Binding Acknowledgement packet, each of the mobile routers determines that normal processing is done.

(3) When the mobile host moves to a foreign link of the Nth mobile network, it acquires a c/o address.

(4) The mobile host sends to its own home agent the Binding Update packet including the binding between the home address and the c/o address. The home agent stores the binding and sends the Binding Acknowledgement packet to the mobile host. Receiving the Binding Acknowledgement packet, the mobile host determines that normal processing is done.

The above operation example does not depend upon whether the N mobile networks 1 and the mobile host are connected simultaneously or sequentially.

Figure 56:
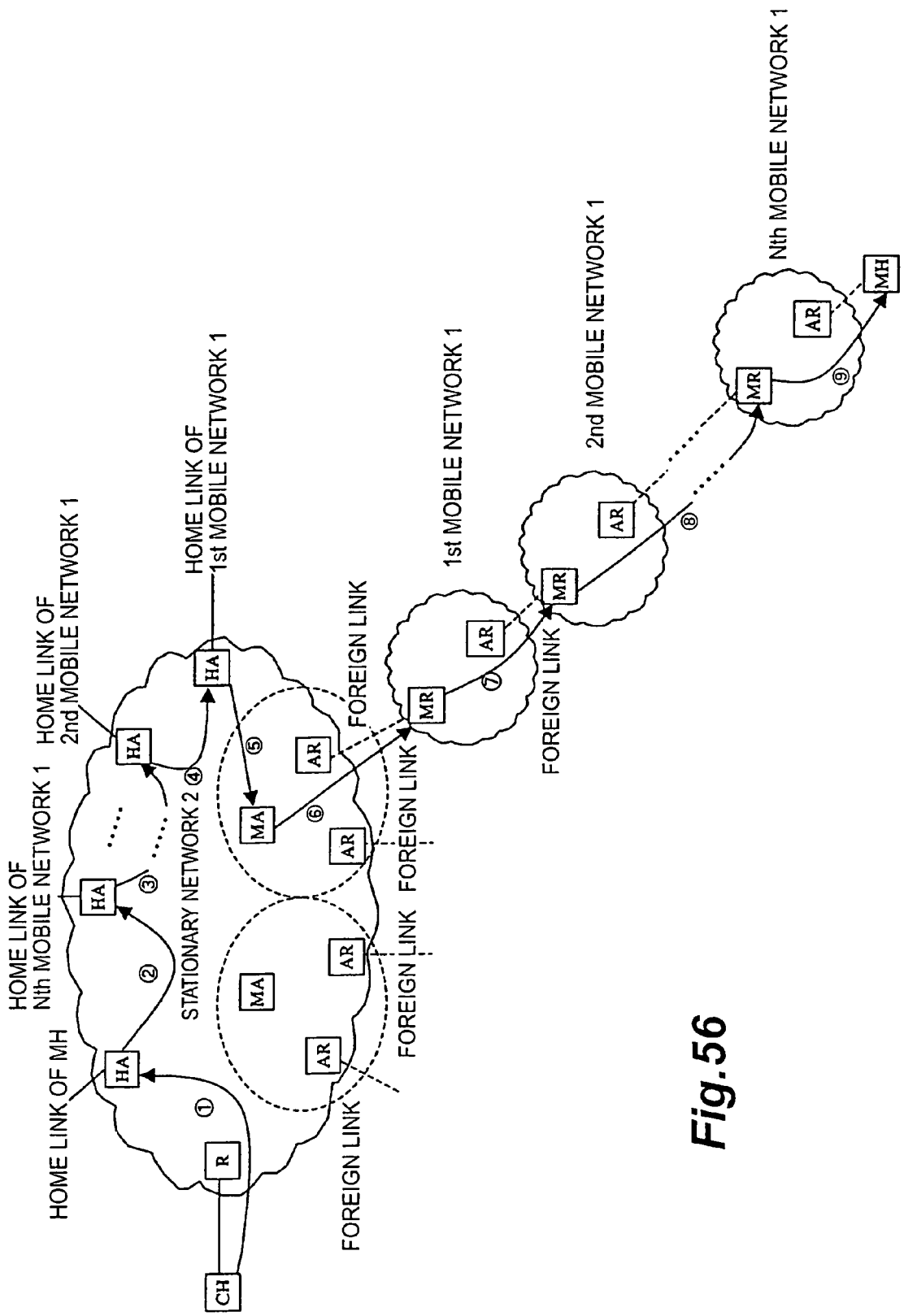
FIG. 56 is an example of operation carried out when the correspondent host sends a packet to the mobile host.

FIG. 56 is an example of operation carried out when during the chainlike connection of the N mobile networks 1 and the mobile host the correspondent host sends a packet to the mobile host.

(1) The correspondent host sends the packet the destination of which is the home address of the mobile host. The packet is routed to the home link of the mobile host by the routers in the stationary network.

(2) Receiving the packet, the home agent at the home link of the mobile host generates a tunneling packet the destination of which is the c/o address of the mobile host indicated by the binding, puts the received packet into the payload of the tunneling packet, and sends it. The tunneling packet is routed to the home link of the Nth mobile network 1, which provided the c/o address for the mobile host, by the routers in the stationary network.

(3) The home agent at the home link of the Nth mobile network 1 receives the tunneling packet, generates a tunneling packet the destination of which is the c/o address of the mobile router of the Nth mobile network 1 indicated by the binding, puts the received tunneling packet into the payload, and sends it. The tunneling packet is routed to the home link of the (N−1)th mobile network 1 by the routers in the stationary network.

(4) The operation described in (2) is repeated before the tunneling packet sent from the home agent at the home link of the second mobile network is routed to the home link of the first mobile network 1. When the tunneling packet is received by the home agent of the first mobile network 1, it includes N-multiplex tunneling packets in which the packet first sent from the correspondent host is the innermost packet and in which the packet generated by the home agent of the second mobile network 1 is the outermost packet.

(5) The home agent of the first mobile network 1 receives the tunneling packet, generates a tunneling packet the destination of which is the mobility agent indicated by the binding, puts the received tunneling packet into the payload, and sends it. The multiplicity of the tunneling packet at this time is (N+1). The tunneling packet is routed to the mobility agent by the routers in the stationary network.

(6) Receiving the tunneling packet, the mobility agent extracts the tunneling packet from the payload, generates a tunneling packet the destination of which is the c/o address of the mobile router of the first mobile network indicated by the binding, and puts the extracted tunneling packet into the payload, and sends it. The multiplicity of the tunneling packet at this time is (N+1). The tunneling packet is routed to the mobile router of the first mobile network 1 by the routers in the stationary network.

(7) Receiving the tunneling packet, the mobile router of the first mobile network 1 extracts the tunneling packet from the payload. When the destination of the extracted tunneling packet matches with the Subnet-prefixes of the links in the first mobile network 1, the mobile router of the first mobile network 1 sends the extracted tunneling packet. The multiplicity of the tunneling packet at this time is one smaller than that of the tunneling packet as received, because the outermost tunneling packet was extracted. The tunneling packet is routed to the mobile router of the second mobile network by the routers in the first mobile network 1.

(8) The operation described in (7) is repeated before the tunneling packet arrives at the mobile router of the Nth mobile network 1.

(9) When the mobile router of the Nth mobile network receives the tunneling packet, it extracts the tunneling packet from the payload, and sends the extracted tunneling packet when the destination of the extracted tunneling packet matches with the Subnet-prefixes of the links in the Nth mobile network 1. The tunneling packet at this time is one the payload of which includes the packet first sent from the correspondent host and the destination of which is the c/o address of the mobile host. The tunneling packet is routed to the mobile host by the routers of the Nth mobile network 1. Receiving the tunneling packet, the mobile host extracts the packet from the payload to receive the packet directed to its own home address at last.

Figure 57:
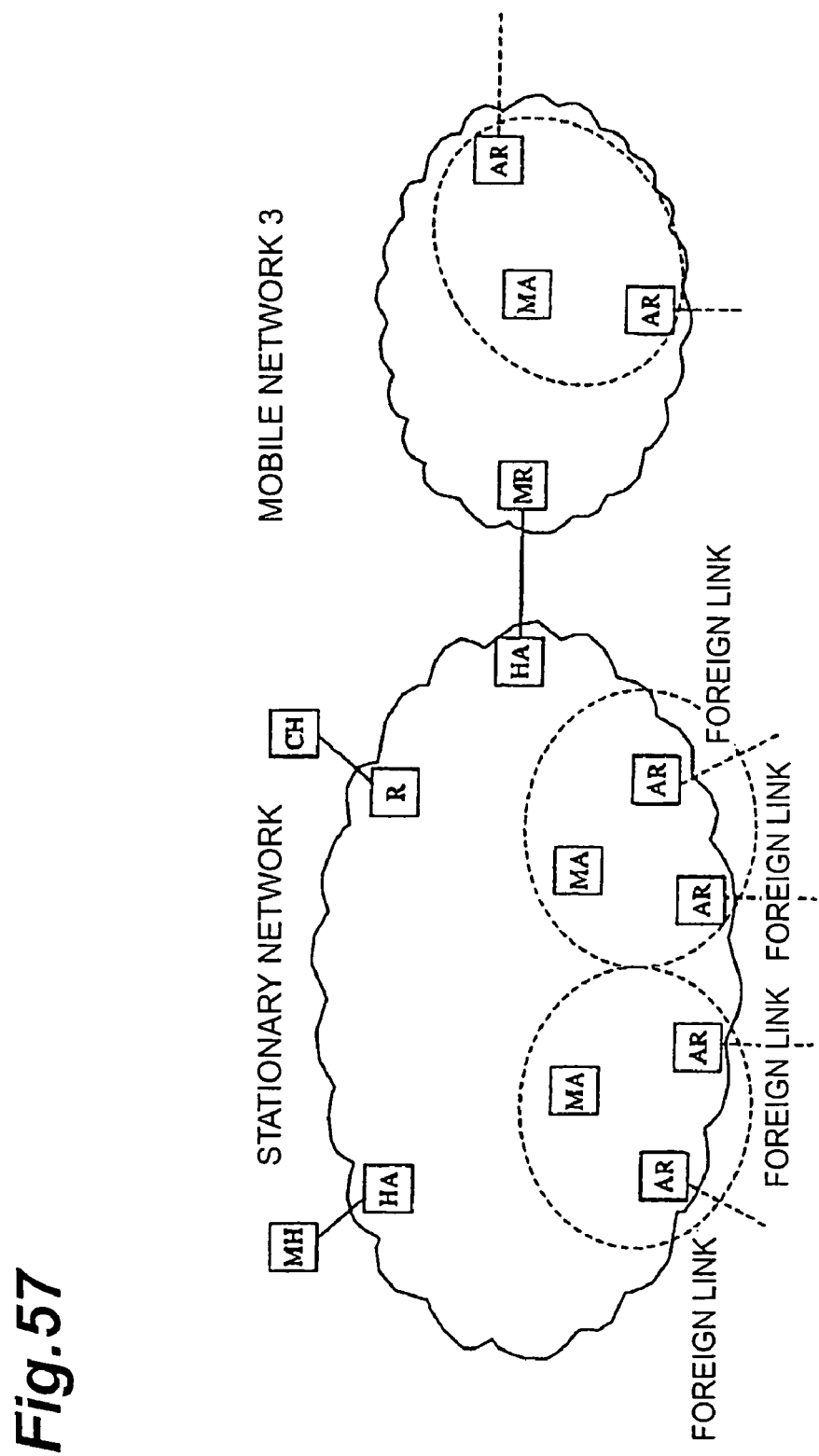
FIG. 57 is a configuration example of a packet communication system where there exist mobile networks 3 and a mobility agent.

FIG. 57 is a configuration example of a packet communication system where there exists a mobile network 3 having a mobility agent inside. In FIGS. 33 to 56, only the stationary network included the mobility agents, but the mobile networks included no mobility agent. However, the mobile network may include a mobility agent. When a mobility agent included in a certain mobile network performs the operation of the mobility agent described in FIGS. 33 to 56, it can provide the operating modes of the buffering of packet, the active mode, the idle mode, and so on for the mobile host and another mobile network moving between foreign links provided by the mobile network.

Figure 58:
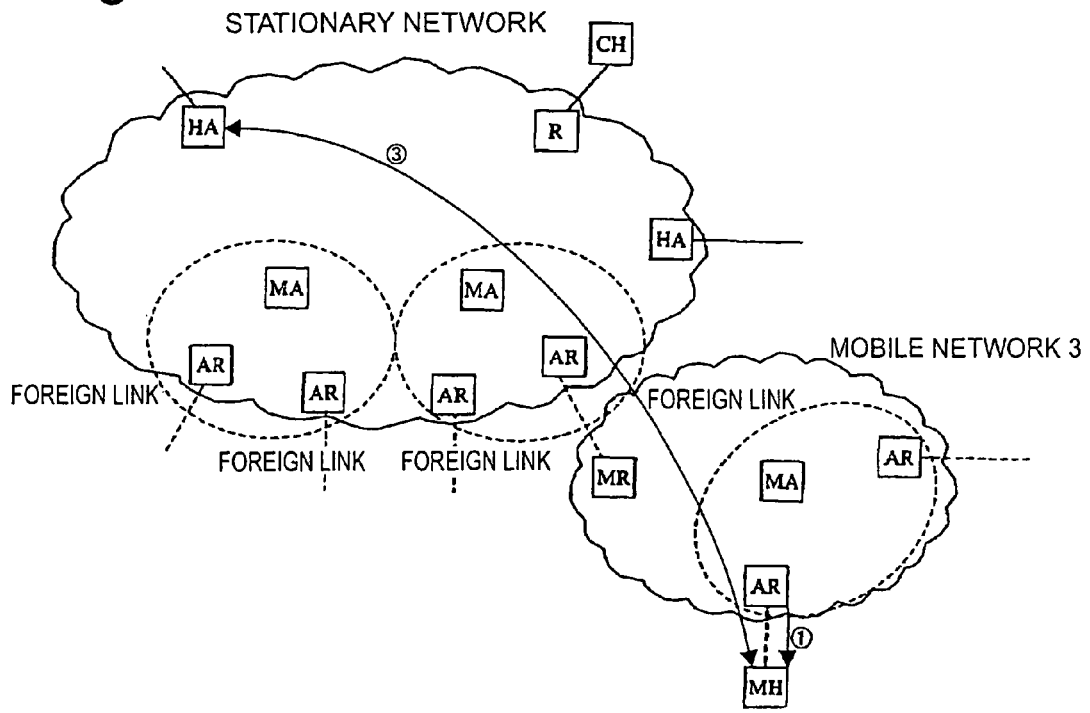
FIG. 58 is a diagram showing the operation of the mobile host carried out after the mobile network has moved to a foreign link and when the mobile host moves to the mobile network.

FIG. 58 is a diagram to show the operation of the mobile host which is carried out after the mobile network 3 has moved to a foreign link and when the mobile host moves to the mobile network.

(1) After the mobile host has moved from the home link to a foreign link of the mobile network 3, it acquires a c/o address and an address of a mobility agent from an access router.

(2) The mobile host sends to the mobility agent the Binding Update packet including the binding between the home address and the c/o address. The mobility agent stores the binding and sends the Binding Acknowledgement packet to the mobile host.

(3) The mobile host sends to its own home agent the Binding Update packet including the binding between the home address and the mobility agent address. The home agent stores the Binding and sends the Binding Acknowledgement packet to the mobile host.

Figure 59:
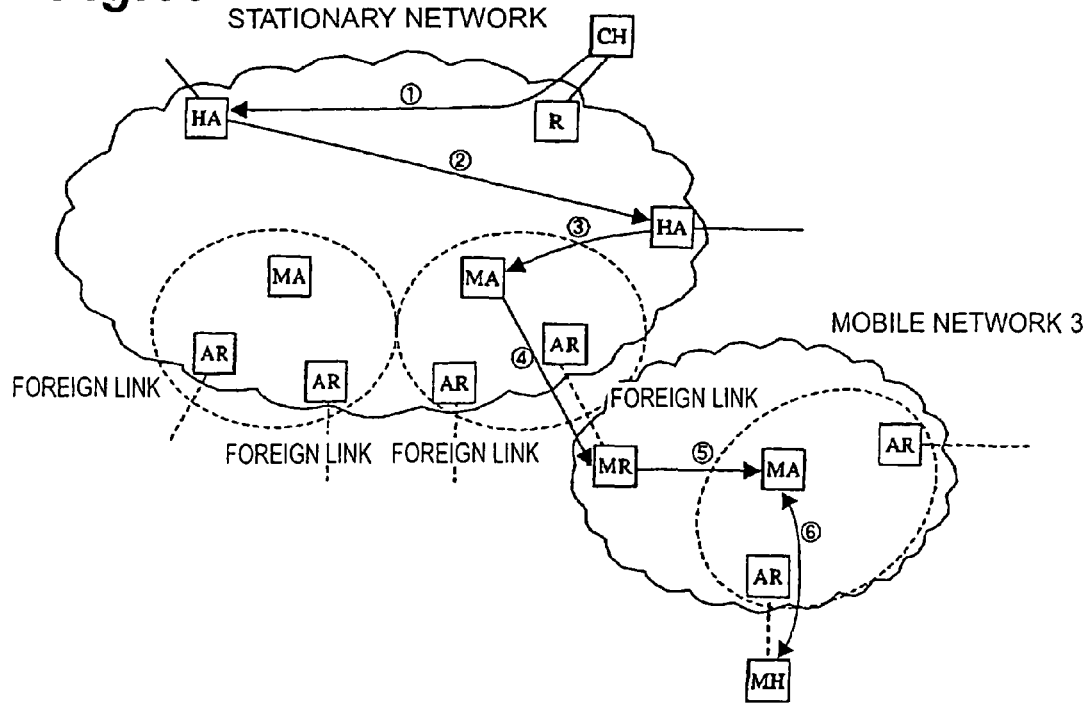
FIG. 59 is a diagram showing the operation of forwarding a packet addressed to the mobile host, sent from the correspondent host.

FIG. 59 is a diagram to show the operation of forwarding the packet addressed to the mobile host, sent from the correspondent host.

(1) The correspondent host sends the packet the destination of which is the home address of the mobile host. The packet is routed to the home link of the mobile host by the routers in the stationary network.

(2) When the destination of the packet is the home address of the mobile host, the home agent at the home link of the mobile host receives the packet instead of the mobile host, generates a tunneling packet the destination of which is the mobility agent address in the mobile network 3 for the mobile host in the binding, puts the received packet into the payload of the tunneling packet, and sends it. The tunneling packet is routed to the home link of the mobile network 3 by the routers in the stationary network.

(3) When the Subnet-prefixes in the destination of the packet are those in the binding, the home agent at the home link of the mobile network 3 receives the packet instead of the mobile router, generates a tunneling packet the destination of which is the mobility agent address of the binding, puts the received tunneling packet into the payload of the tunneling packet, and sends it. This tunneling packet is routed to the mobility agent by the routers in the stationary network.

(4) The mobility agent receives the tunneling packet from the home agent and extracts the packet included therein. When the Subnet-prefixes in the destination of the extracted packet match with those in the binding, the mobility agent puts the packet into the payload of a tunneling packet the destination of which is the c/o address of the binding, and sends it. The tunneling packet is routed to the mobile router by the routers in the stationary network.

(5) Receiving the tunneling packet from the mobility agent, the mobile router extracts the tunneling packet from the payload and sends the tunneling packet into the mobile network 3 when the Subnet-prefixes in the destination match with those of the links in the mobile network 3. The packet is routed to the mobility agent by the routers in the mobile network 3. Receiving the tunneling packet directed to the c/o address, the mobility agent extracts the packet from the payload to receive the packet directed to its own home address at last.

(6) The mobility agent receives the tunneling packet from the mobile router and extracts the packet included therein. When the destination address of the extracted packet matches with the c/o address of the binding, the mobility agent puts the packet into the payload of a tunneling packet the destination of which is the c/o address of the binding, and sends it. The tunneling packet is routed to the mobile host by the routers in the mobile network 3. Receiving the tunneling packet from the mobility agent, the mobile host extracts the packet from the payload to receive the packet directed to its own home address at last.

Figure 60:
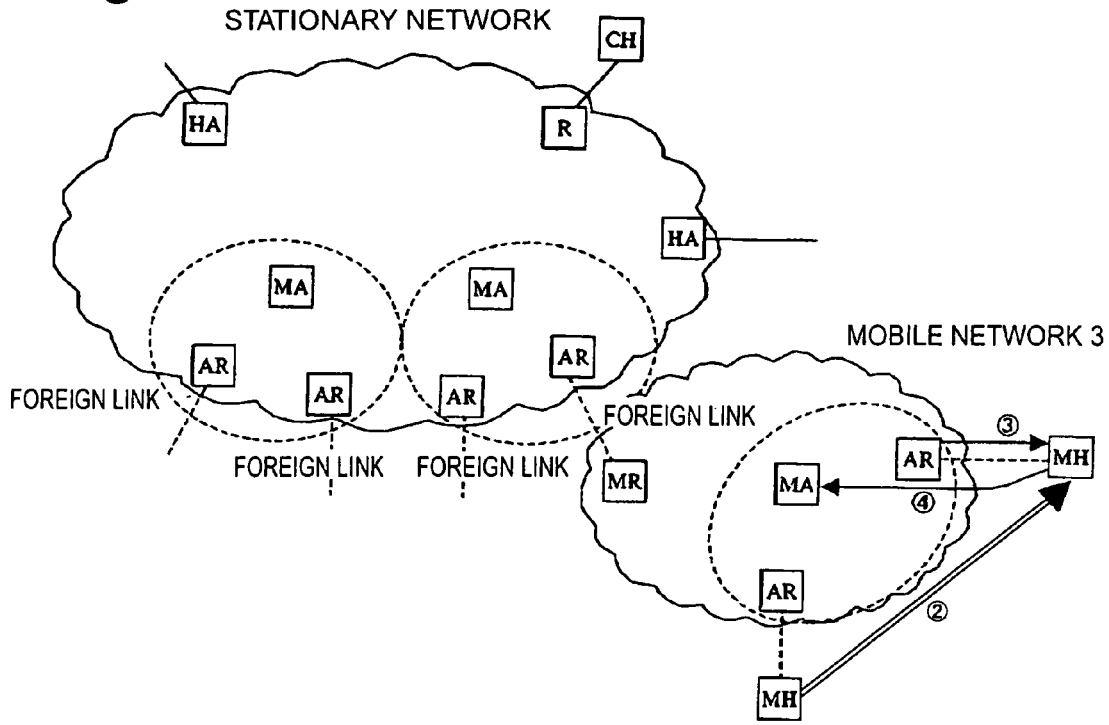
FIG. 60 is an example of operation carried out when in the active mode the mobile host moves between foreign links provided by access routers in an area of an identical mobility agent.

FIG. 60 is an example of operation carried out when in the active mode the mobile host moves between foreign links provided by access routers in the area of the same mobility agent.

(1) Before moving to another foreign link, the mobile host sends to the mobility agent the Binding Update packet including the binding between the home address and the c/o address and indicating that the operating mode is the active mode and that the buffering of packet is necessary. Receiving the Binding Update packet, the mobility agent stores the binding between the home address and the c/o address, the operating mode being the active mode, and the need for the buffering of packet, and then sends the Binding Acknowledgement packet to the mobile host. Receiving the Binding Acknowledgement packet, the mobile host recognizes that the Binding Update packet has arrived at the mobility agent and that normal processing is done. When the mobility agent is notified of the necessity for the buffering of packet by the mobile host and thereafter receives an applicable packet from the home agent or the correspondent host, the mobility agent buffers the packet directed to the mobile host.

(2) The mobile host moves between foreign links.

(3) After the mobile host has moved to another foreign link, it acquires a c/o address and an address of a mobility agent from an access router.

(4) The mobile host determines whether there is change in the mobility agent address. Without change, the mobile host sends to the mobility agent the Binding Update packet including the binding between the home address and the c/o address and indicating that the operating mode is the active mode and that there is no need for the buffering of packet. Receiving the Binding Update packet, the mobility agent stores the binding between the home address and the c/o address, the operating mode being the active mode, and no need for the buffering of packet, and then sends the Binding Acknowledgement packet to the mobile host. Receiving the Binding Acknowledgement packet, the mobile host recognizes that the Binding Update packet has arrived at the mobility agent and that normal processing is done. When the mobility agent bears buffered packets, it sequentially sends the buffered packets to the mobile host according to the operation similar to FIG. 10 or FIG. 11.

In the above description the mobility agents were described using only their fundamental form, but other forms are also conceivable. Namely, a conceivable form is such that service areas of mobility agents overlap with each other and access routers located in the overlapping region can utilize a plurality of mobility agents.

Figure 61:
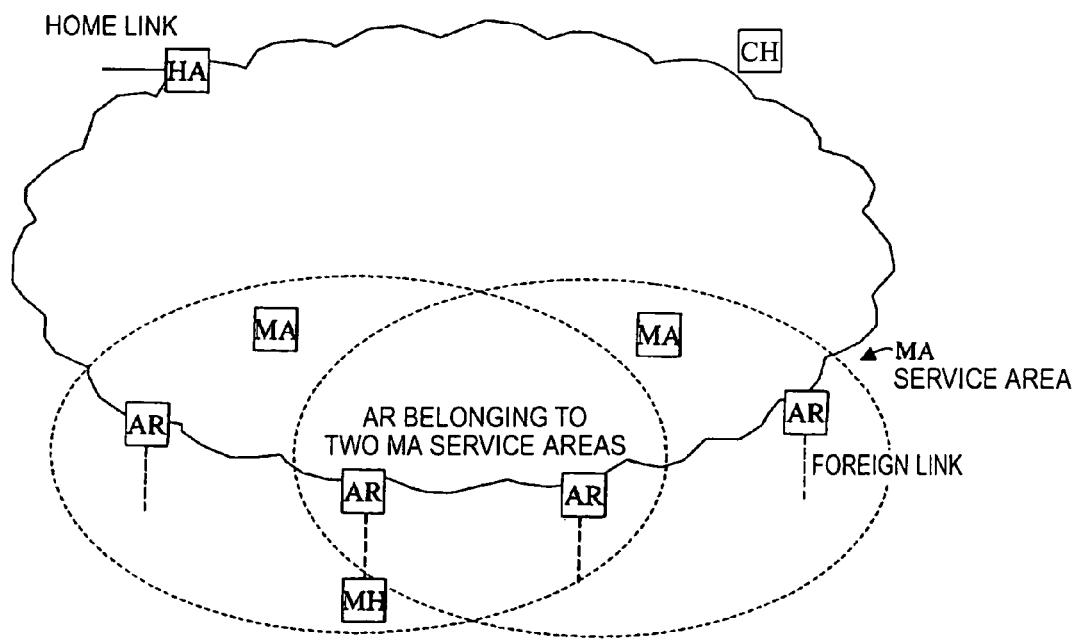
FIG. 61 is a diagram showing an example of operation of access routers belonging to service areas of plural mobility agents.

FIG. 61 is a diagram to show an example of operation of access routers belonging to service areas of plural mobility agents. The access routers notifies the mobile host of availability of plural mobility agents. Further, the access routers may notify the mobile host of numbers of hops to the mobility agents and selection priorities thereof. For example, as to the selection priorities, high selection priorities are notified of for mobility agents with low traffic applied, but low selection priorities for mobility agents with high traffic applied.

The mobile host selects one mobility agent according to either of (1) a method of selecting a mobility agent at random, (2) a method of preferentially selecting a mobility agent with the smaller number of hops to the mobility agent, (3) a method of selecting one mobility agent according to the selection priorities, and so on, and sends the Binding Update packet to the selected mobility agent.

This permits the following operation: when one mobility agent suffers an abnormal stop due to trouble or the like, the mobile host can continue communications by switching to another mobility agent. It also becomes feasible to distribute the traffic to a plurality of mobile hosts present at a foreign link of one access router, among a plurality of mobility agents.

Figure 62:
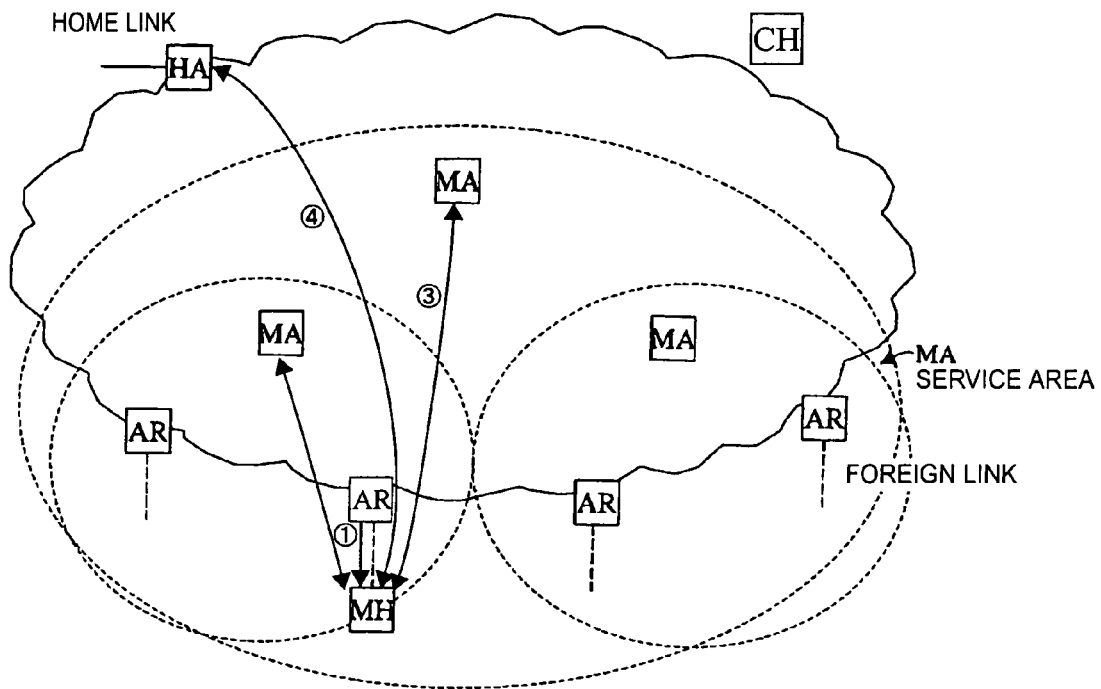
FIG. 62 is a diagram showing an example of operation where the mobile host uses a plurality of mobility agents.

FIG. 62 is a diagram to show an example of operation where the mobile host uses a plurality of mobility agents.

(1) An access router located in service areas of plural mobility agents assigns a c/o address to the mobile host and notifies the mobile host of information on the mobility agents. The information includes the numbers of hops to the access routers and others, in addition to the addresses of the mobility agents. The mobile host selects two mobility agents present on paths from the home agent to the access router.

(2) The mobile host sends to the mobility agent the Binding Update packet including the binding between the home address and the c/o address and indicating that the operating mode is the active mode and that there is no need for the buffering of packet. Receiving the Binding Update packet, the mobility agent stores the binding between the home address and the c/o address, the operating mode being the active mode, and no need for the buffering of packet, and then sends the Binding Acknowledgement packet to the mobile host. Receiving the Binding Acknowledgement packet, the mobile host recognizes that the Binding Update packet has arrived at the mobility agent and that normal processing is done.

(3) The mobile host sends to the other mobility agent the binding between the home address and the address of the mobility agent to which the Binding Update packet was sent in (2).

(4) The mobile host sends to the home agent the binding between the home address and the address of the mobility agent to which the Binding Update packet was sent in (3).

Figure 63:
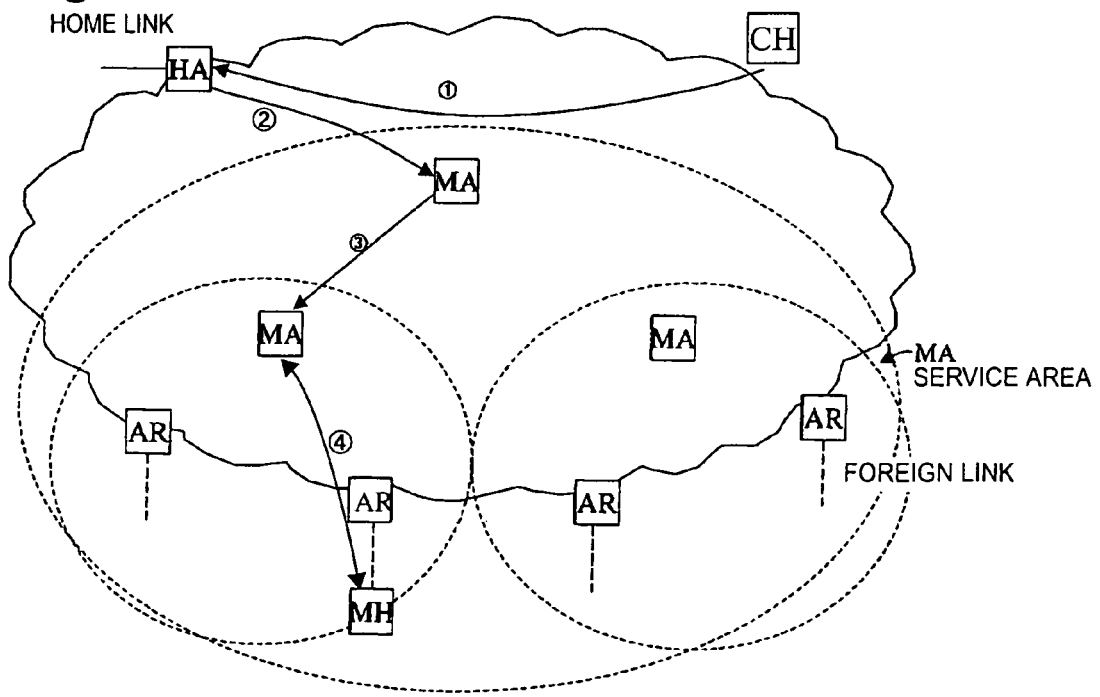
FIG. 63 is a diagram showing an example of operation carried out when the correspondent host sends a packet addressed to the mobile host.

FIG. 63 is a diagram to show an example of operation carried out when the correspondent host sends a packet addressed to the mobile host.

(1) The correspondent host sends the packet the destination of which is the home address of the mobile host. The packet is routed to the home link by the routers in the network.

(2) When the destination of the packet is the home address of the binding, the home agent of the home link receives the packet instead of the mobile host, generates a tunneling packet the destination of which is the address of the first mobility agent in the binding, puts the received packet into the payload of the tunneling packet, and sends it. The tunneling packet is routed to the first mobility agent by the routers in the network.

(3) The first mobility agent receives the tunneling packet from the home agent and extracts the packet included therein. When the destination of the extracted packet matches with the home address of the binding, the first mobility agent puts the packet into the payload of a tunneling packet the destination of which is the address of the second mobility agent of the binding, and sends it. The tunneling packet is routed to the second mobility agent by the routers in the network.

(4) The second mobility agent receives the tunneling packet from the home agent and extracts the packet included therein. When the destination of the extracted packet matches with the home address of the binding, the second mobility agent puts the packet into the payload of a tunneling packet the destination of which is the c/o address of the binding, and sends it. The tunneling packet is routed to the mobile host by the routers in the network. Receiving the tunneling packet from the second mobility agent, the mobile host extracts the packet from the payload to receive the packet directed to its own home address at last.

In the present invention the number of mobility agents used is not limited to two. Namely, the number of mobility agents used may be three or more. For example, where the distance (the number of hops) from a foreign link where the mobile host moves, to the home link is long and where the mobile host moves between foreign links in a wide range, it becomes feasible to decrease the number of Binding Update transmissions to the home agent, by connecting and using a greater number of mobility agents.

Figure 64:
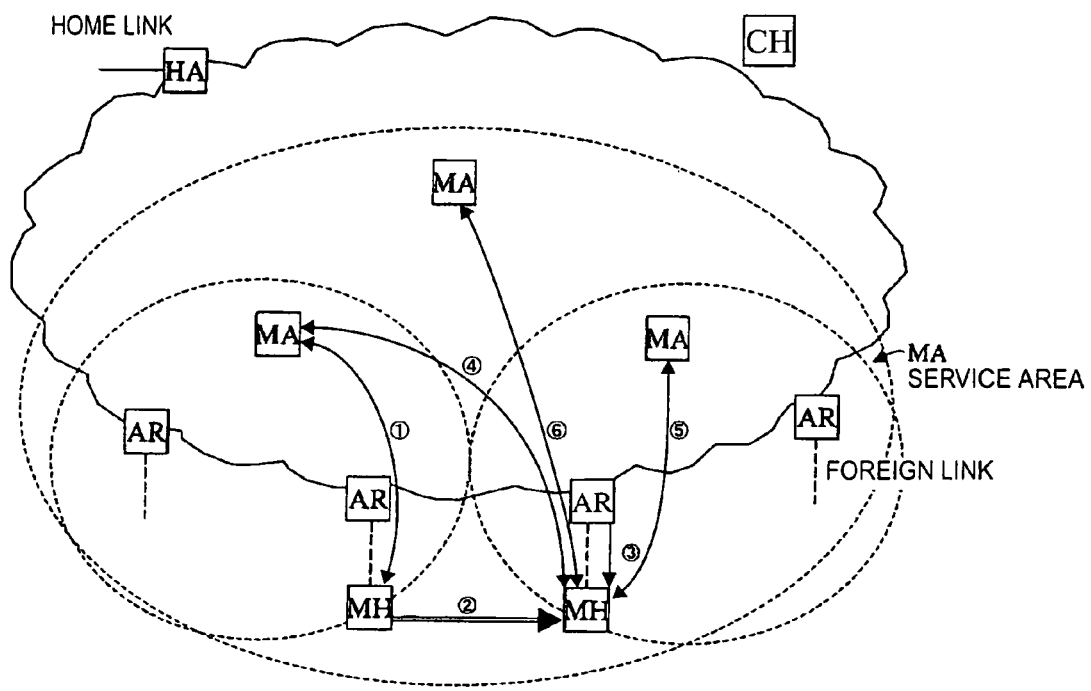
FIG. 64 is a diagram showing an example of operation carried out when the mobile host moves between areas of mobility agents.

FIG. 64 is a diagram to show an example of operation carried out when the mobile host moves between areas of mobility agents.

(1) Before moving to another foreign link, the mobile host sends to the mobility agent the Binding Update packet including the binding between the home address and the c/o address and indicating that the operating mode is the active mode and that the buffering of packet is necessary. Receiving the Binding Update packet, the mobility agent stores the binding between the home address and the c/o address, the operating mode being the active mode, and the necessity for the buffering of packet, and then sends the Binding Acknowledgement packet to the mobile host. Receiving the Binding Acknowledgement packet, the mobile host recognizes that the Binding Update packet has arrived at the mobility agent and that normal processing is done. When the mobility agent is notified of the necessity for the buffering of packet by the mobile host and thereafter receives an applicable packet from the home agent or the correspondent host, the mobility agent buffers the packet addressed to the mobile host.

(2) The mobile host arrives at a foreign link.

(3) An access router located in service areas of plural mobility agents assigns a c/o address to the mobile host and notifies the mobile host of the information on the mobility agents.

(4) The mobile host judges whether there is change in the mobility agent address. With change, the mobile host sends to the previous mobility agent the Binding Update packet including the binding between the home address and the c/o address and indicating that the operating mode is the active mode and that there is no need for the buffering of packet. Receiving the Binding Update packet, the previous mobility agent stores the binding between the home address and the c/o address, the operating mode being the active mode, and no need for the buffering of packet, and then sends the Binding Acknowledgement packet to the mobile host. Receiving the Binding Acknowledgement packet, the mobile host recognizes that the Binding Update packet has arrived at the previous mobility agent and that normal processing is done. When the mobility agent bears buffered packets, it sequentially sends the buffered packets to the mobile host according to the operation similar to FIG. 10 or FIG. 11.

(5) The mobile host sends to the mobility agent the Binding Update packet including the binding between the home address and the c/o address and indicating that the operating mode is the active mode and that there is no need for the buffering of packet. Receiving the Binding Update packet, the mobility agent stores the binding between the home address and the c/o address, the operating mode being the active mode, and no need for the buffering of packet, and then sends the Binding Acknowledgement packet to the mobile host. Receiving the Binding Acknowledgement packet, the mobile host recognizes that the Binding Update packet has arrived at the mobility agent and that normal processing is done.

(6) The mobile host detects that the mobility agent now under use can be used continuously, and sends to the mobility agent the Binding Update packet including the binding between the home address and the address of the mobility agent after the change.

This can decrease the transmission frequency of Binding Update packets to the home agent and decrease the circuit capacity in the network consumed by the Binding Update packets even if the home agent is very far from the foreign link where the mobile host is located, i.e., even if the number of hops is large. In the configuration using one mobility agent, the mobile host has to send the Binding Update packet to the home agent when moving between service areas of mobility agents, whereas in the configuration using a plurality of mobility agents, the mobile host is required only to send the Binding Update packet to the mobility agents nearer than the home agent, which makes it feasible to decrease the transmission frequency of Binding Update packets to the home agent.

An example of the mobile network 1 is a network in a moving object such as a train or the like. The network in the moving object can connect mobile hosts owned by in-vehicle users through foreign links and move between foreign links provided by the external stationary network. On the other hand, a conceivable example of the mobile network 2 is a network put on a user's body (body network) carrying a plurality of nodes connected by local wireless or wire links. The body network can move between foreign links provided by the external stationary network and move to a foreign link provided by the mobile network 1.

In Second Embodiment, the substantial functions of mobility agent and mobile host are the same as those of First Embodiment, and the structures thereof is the same as those of Fist Embodiment. Therefore, detail explanation about them is omitted. It is easily understandable by replacing home address and forwarding destination address of with Subnet prefixes 1-N that First Embodiment that these functions are substantially same to among them. The Second Embodiment is different from the First Embodiment in use of mobile router. The structure and operations of the mobile router will be explained below.

Figure 65:
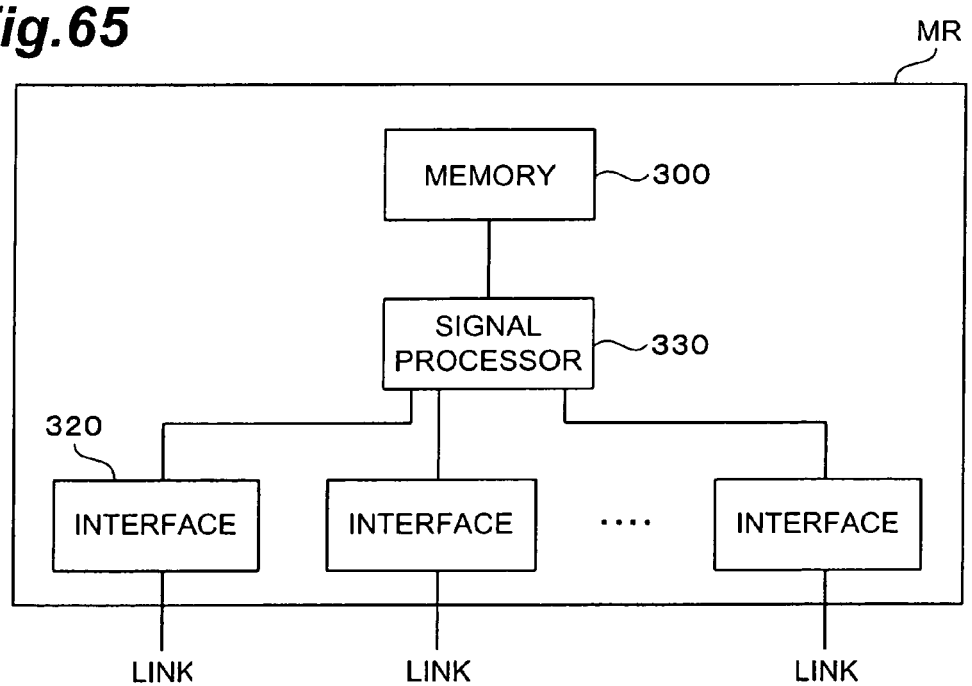
FIG. 65 is a diagram showing a configuration of a mobile router used in the packet communication system of the embodiment according to the present invention.

FIG. 65 shows a configuration of mobile router. As shown in FIG. 65, mobile router MR used in the packet communication system of the present invention comprises a memory 300 for storing the correspondence between home address of the mobile router and c/o address, the correspondence between all Subnet-prefixes used in mobility network to which the mobile router belongs, and c/o address of the mobile route, operation mode of the mobile router and whether or not buffering of mobility agent using the mobile router is necessary, interface 320 for performing reception of a packet from a link which the mobile router connects, and sending the packet to the link, and signal processor 330 for controlling the interface 320 and the memory 300 to perform processes of Binding Update Packet, Binding Acknowledgement Packet, Subnet-Prefixes Binding Update Packet and Subnet-prefixes Binding Acknowledgement packet, and generation/reception of packet.

Figure 66A:
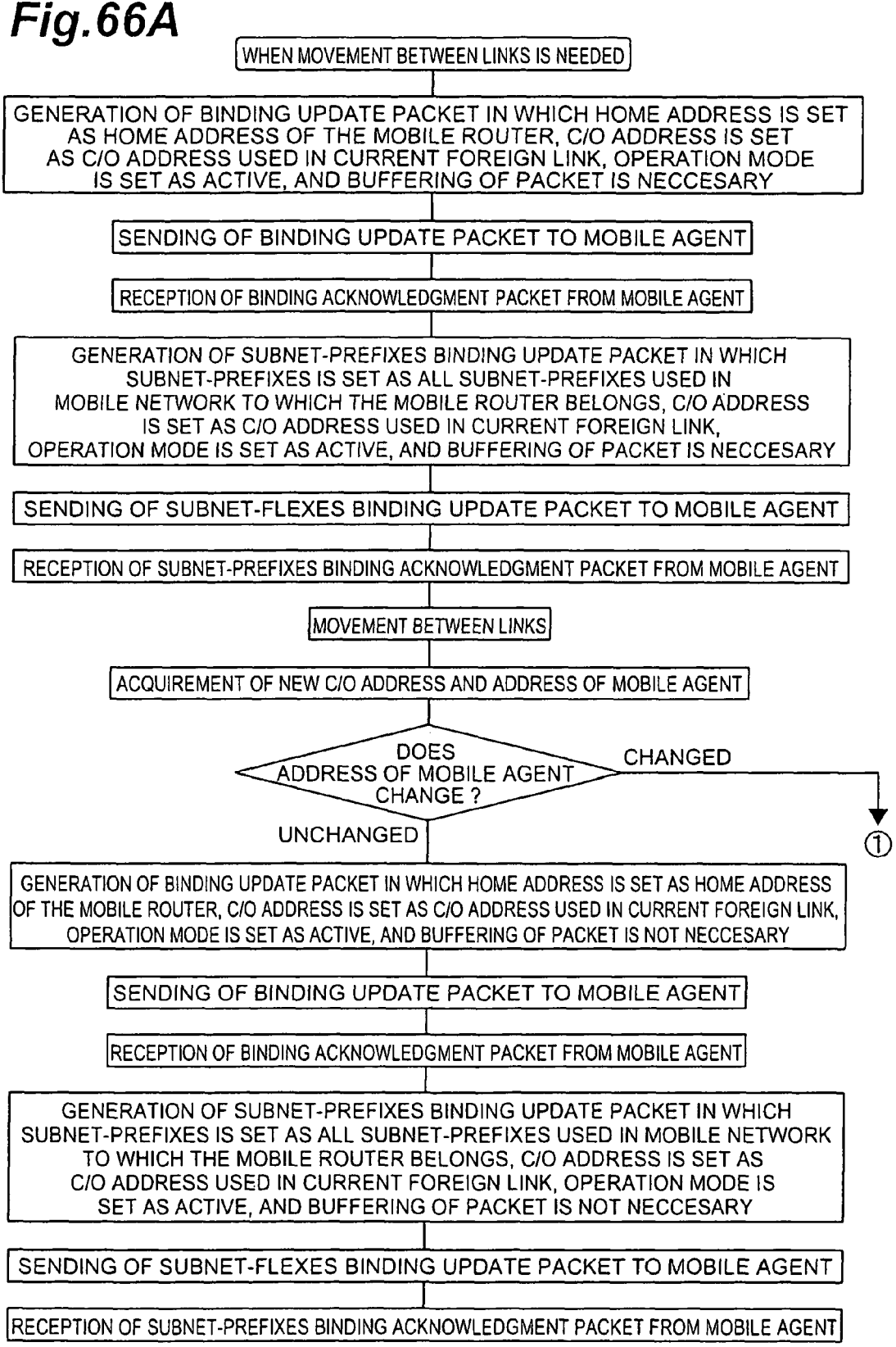
FIGS. 66A, 66B and 66C are flow-charts of the operation of the mobile router.
Figure 66B:
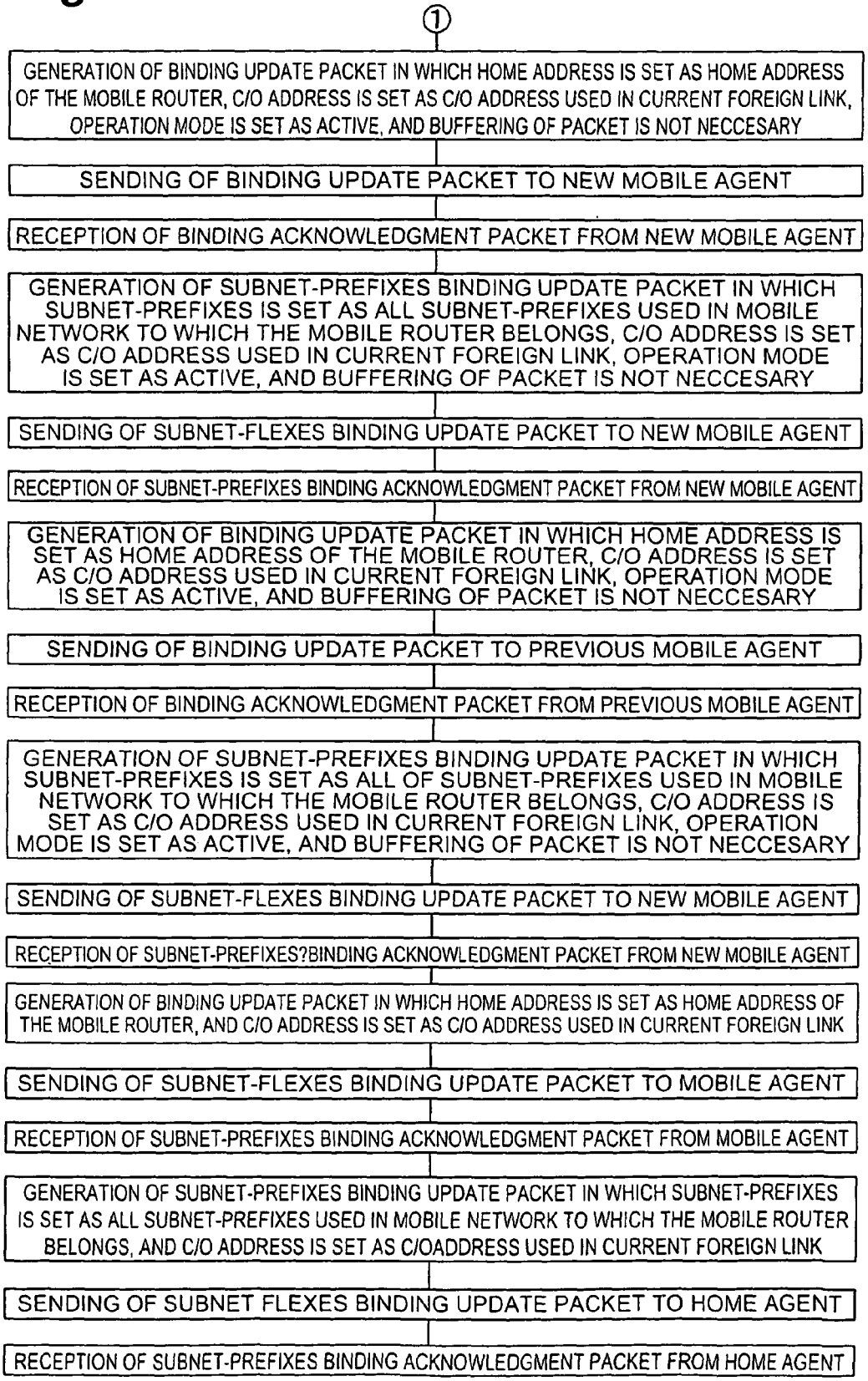
Figure 66C:
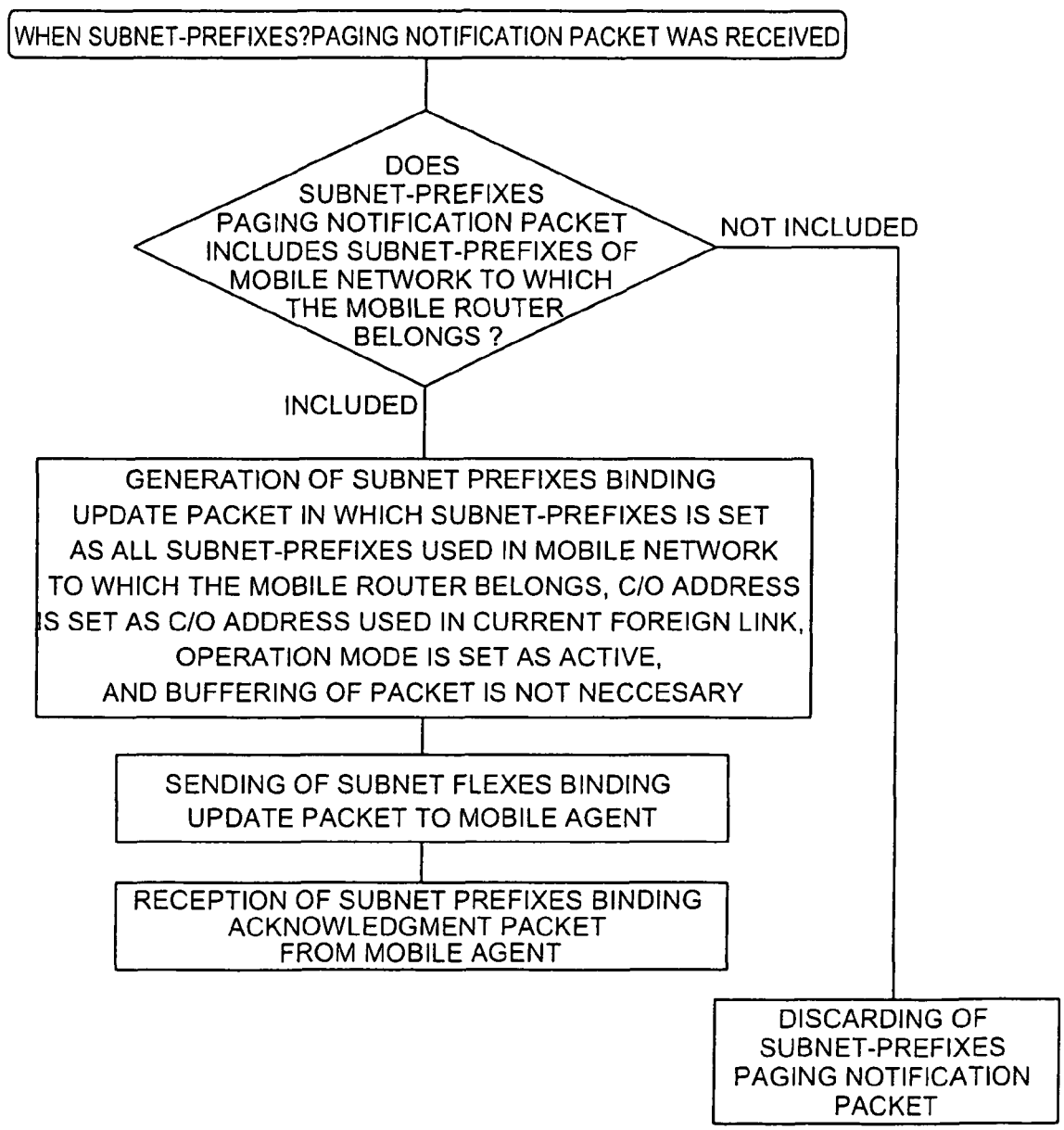

FIGS. 66A, 66B and 66C are flowchart of the operations of the mobile router. As shown in FIGS. 66A, 66B and 66C, the operations of the mobile router are divided into operations in movement between links and operations in reception of Subnet-prefixes Notification Packet. Before movement between links, the mobile router generates Binding Update Packet in which home address is set as the home address of the mobile router, c/o address is set as c/o address used in current foreign link, operation mode is set as active, buffering of packet is necessary, sends the Binding Update Packet to the mobility agent in an area in which the mobile router is, and receives Binding Acknowledgment Packet from the mobility agent. Further the mobile router generates Subnet-prefixes binding Update Packet in which Subnet-flexes is set as all Subnet-prefixes which mobile network to which the mobile router belongs, uses, forwarding destination address is set as c/o address used in the current foreign link, operation mode is set as active, and buffering of packet is necessary, sends the Subnet-prefixes Binding Update Packet to mobility agent in an area in which the mobile router is, and receive Subnet-prefixes Binding Acknowledgement Packet from the mobility agent.

After movement of the mobile router to another link in the movement between links, the mobile router acquires new c/o address and address of mobility agent from a link to which the mobile router moved, and judges whether or not the address of the mobility agent is different from address of mobility agent which is used in a link which the mobile router was in before the movement thereof.

1) In case that address of mobility agent changes:

The mobile router generates Binding Update Packet in which home address is set as the home address of the mobile router, c/o address is set as c/o address used in current foreign link, operation mode is set as active, buffering of packet is not necessary, sends the Binding Update Packet to the mobility agent in an area in which the mobile router is, and receives Binding Acknowledgment Packet from the mobility agent. Further, the mobile router generates Subnet-prefixes Binding Update Packet in which Subnet-prefixes is set as all Subnet-prefixes which mobile network to which the mobile router belongs, uses, forwarding destination address is set as c/o address used in current foreign link, operation mode is set as active, buffering of packet is not necessary, sends the Subnet-prefixes Binding Update Packet to the mobility agent in an area in which the mobile router is, and receives Subnet-prefixes Binding Acknowledgment Packet from the mobility agent.

Next, the mobile router generates Binding Update Packet in which home address is set as the home address of the mobile router, forwarding destination address is set as c/o address used in current foreign link, operation mode is set as active, buffering of packet is not necessary, sends the Binding Update Packet to the mobility agent in an area in which the mobile router was before the mobile router moved, and receives Binding Acknowledgment Packet from the mobility agent. Further, the mobile router generates Subnet-prefixes Binding Update Packet in which Subnet-prefixes is set as all Subnet-prefixes which mobile network to which the mobile router belongs, uses, forwarding destination address is set as c/o address used in current foreign link, operation mode is set as active, buffering of packet is not necessary, sends the Subnet-prefixes Binding Update Packet to the mobility agent in an area in which the mobile router was before the mobile router moved, and receives Subnet-prefixes Binding Acknowledgment Packet from the mobility agent.

Further the mobile router generates Binding Update Packet in which home address is set as the home address of the mobile router, and forwarding destination address is set as c/o address used in current foreign link, sends the Binding Update Packet to home agent, and receives Binding Acknowledgment Packet from the home agent. Further, the mobile router generates Subnet-prefixes Binding Update Packet in which Subnet-prefixes is set as all Subnet-prefixes which mobile network to which the mobile router belongs, uses, sends the Subnet-prefixes Binding Update Packet to home agent, and receives Subnet-prefixes Binding Acknowledgment Packet from the home agent.

2) In case that address of mobility agent does not change:

The mobile router generates Binding Update Packet in which home address is set as the home address of the mobile router, forwarding destination address is set as c/o address used in current foreign link, operation mode is set as active, buffering of packet is not necessary, sends the Binding Update Packet to the mobility agent in an area in which the mobile router is, and receives Binding Acknowledgment Packet from the mobility agent. Further, the mobile router generates Subnet-prefixes Binding Update Packet in which Subnet-prefixes is set as all Subnet-prefixes which mobile network to which the mobile router belongs, uses, forwarding destination address is set as c/o address used in current foreign link, operation mode is set as active, buffering of packet is not necessary, sends the Subnet-prefixes Binding Update Packet to the mobility agent in an area in which the mobile router is, and receives Subnet-prefixes Binding Acknowledgment Packet from the mobility agent.

Next, operations of the mobile router when the mobile router receives Subnet-prefixes Paging Notification Packet will be explained.

When the mobile router receives Subnet-prefixes Paging Notification Packet, the mobile router judges whether or not the received Subnet-prefixes Paging Notification Packet includes Subnet-prefixes which mobile network to which the mobile router belongs, uses.

1) In the case that the received Subnet-prefixes Paging Notification Packet includes Subnet-prefixes which mobile network to which the mobile router belongs, uses;

The mobile router generates Subnet-prefixes binding Update Packet in which Subnet-flexes is set as all Subnet-prefixes which mobile network to which the mobile router belongs, uses, forwarding destination address is set as c/o address used in the current foreign link, operation mode is set as active, and buffering of packet is necessary, sends the Subnet-prefixes Binding Update Packet to mobility agent in an area in which the mobile router is, and receive Subnet-prefixes Binding Acknowledgement Packet from the mobility agent.

2) In the case that the received Subnet-prefixes Paging Notification Packet does not includes Subnet-prefixes which mobile network to which the mobile router belongs, uses;

The mobile router discards the received Subnet-prefixes Paging Notification Packet.

Further, although in the above embodiment, the mobile host or mobility agent sends binding of home address and c/o address to the previous agent in the case that the mobile host or mobility agent moves between the mobility agents, the mobile router may binding of address of new mobility agent instead of the c/o address.

INDUSTRIAL APPLICABILITY

As apparent from the above description, the present invention provides the following effects.

(1) Even if the mobile host frequently moves between foreign links, the buffering of packet at the mobility agent can prevent the loss of the packet sent from the correspondent host to the mobile host. A conceivable case where the mobile host frequently moves between foreign links is a situation in which the access routers in the packet communication system are the base stations in the mobile telecommunications system, the mobile hosts the mobile stations, and the foreign links radio links between the base stations and the mobile stations. In this case, the movement of the mobile station between base stations, i.e., between radio links is called handover. When the present invention is applied to the mobile telecommunications system, it is feasible to prevent the loss of the packet sent from the correspondent host to the mobile station.

(2) Even if the mobile host frequently moves between foreign links, the mobile host is required merely to send the Binding Update packet to only the mobility agent. Therefore, when the mobility agent is located nearer to the mobile host than the home agent and the correspondent host are, it is feasible to reduce the traffic of Binding Update packets appearing in the packet communication system. This effect can also be attained in the foregoing mobile telecommunications system.

(3) When the time is long without transmission of any packet at the mobile host, the idle mode is used whereby it is feasible to reduce the traffic of Binding Update packets appearing in the packet communication system. Further, since the transmission frequency of Binding Update packets from the mobile host can be reduced, the invention also provides the effect of decreasing the power consumption of the battery at the mobile host. This effect is also achieved in the foregoing mobile telecommunications system.

(4) The invention presents the effect that the correspondent host can send the packet whose destination is the stationary host or the mobile host located at the mobile network. This effect is not enjoyed only when the packet has the destination of a node located at a network connected to the stationary network, but is also enjoyed similarly when the packet has the destination of a stationary host or a mobile host located at a mobile network connected to another mobile network.

The invention claimed is:

1. A mobility agent for forwarding a received packet to a mobile host on the basis of a forwarding destination address included in the received packet, comprising:
 a memory configured to store data included in a signal sent from the mobile host, the data representing correspondence between a home address of the mobile host and the forwarding destination address of the mobile host, an operation mode of the mobile host, and whether packet buffering is requested for the mobile host;
 a transmitter configured to send a reception acknowledgement signal to the mobile host when the memory has stored the data: and
 processor configured to control sending of the received packet to the mobile host based on a correspondence between the home address of the mobile host corresponding to a destination address included in the received packet and the forwarding destination address, the operation mode of the mobile host, and whether packet buffering is requested for the mobile host.

2. The mobility agent according to claim 1, wherein the processor is configured to control transmission of the received packet to the forwarding destination address of the mobile host when the operation mode of the mobile host is active and packet buffering is not requested for the mobile host.

3. The mobility agent according to claim 1, wherein the processor is configured to control the memory to store the received packet when the operation mode of the mobile host is active and packet buffering is requested for the mobile host.

4. The mobility agent according to claim 1, wherein the processor is configured to control the memory to store the received packet and to control the transmitter to notify notifies the mobile host of the arrival of the packet when the operation mode of the mobile host is idle and packet buffering is requested for the mobile host.

5. A method of controlling a mobility agent forwarding a received packet to a mobile host based on a forwarding destination address in the packet, comprising:
   receiving data included in a signal sent from the mobile host, the data representing a correspondence between a home address of the mobile host and the forwarding destination address of the mobile host, an operation mode of the mobile host, and whether buffering of the packet is requested for the mobile host;
   storing the data received during the receiving;
   sending a reception acknowledgement signal to the mobile host when the storing is completed; and
   controlling sending of the received packet to the mobile host based on a correspondence between the home address of the mobile host corresponding to a destination address included in the received packet and the forwarding destination address, the operation mode of the mobile host, and whether packet buffering is requested for the mobile host.

6. A non-transitory medium configured to store a computer program, which when executed by a mobility agent, causes the mobility agent to perform a method of forwarding a received packet to a mobile host based on a forwarding destination address in the packet, the method comprising:
   receiving data included in a signal sent from the mobile host, the data representing a correspondence between a home address of the mobile host and the forwarding destination address of the mobile host, an operation mode of the mobile host, and whether buffering of the packet is requested for the mobile host;
   storing the data received during receiving;
   sending a reception acknowledgement signal to the mobile host when the storing is completed; and
   controlling sending of the received packet to the mobile host based on a correspondence between the home address of the mobile host corresponding to a destination address included in the received packet and the forwarding destination address, the operation mode of the mobile host, and whether packet buffering is requested for the mobile host.

7. A mobility host which performs the packet communication between a mobile host and a correspondence host, comprising:
   a transmitter configured to transmit data representing correspondence between a home address of the mobile host and a forwarding destination address, an operation mode, either one of active mode or idle mode of the mobile host, and data requesting whether packet buffering is necessary in a packet to be received at the mobile host, to the mobility agent; and
   a receiver configured to receive a reception acknowledgement signal sent by the transmitter.

8. The mobility host according to claim 7, wherein the transmitter is configured to transmit correspondence between the home address of the mobile host and an address of a mobility agent which uses the mobile host, to a home agent which the mobile host uses.

9. The mobility host according to claim 7, further comprising:
   a processor configured to change the operation mode of the mobile host to an active mode, when in idle mode operation of the mobile host, the mobile host receives a paging notification signal including the home address of the mobile host; and
   the transmitter configured to send a signal representing that the operation mode of the mobile host changed to active mode, to a mobility agent sending the paging notification signal.

10. The mobility host according to claim 7, wherein the processor is configured to, in the case that the mobile host moves between foreign links in an area of a predetermined mobility agent, control the transmitter to transmit a signal indicating correspondence between home address and c/o address of the mobile host and that the operation mode of the mobile host is active and requesting packet buffering of a received packet to a predetermined mobility agent before the mobile host moves to a foreign link, and control the transmitter to transmit a signal indicating correspondence between home address of the mobile host and c/o address utilized in the foreign link to which the mobile host moves, in active mode of the mobile host, and no packet buffering, to the predetermined mobility agent after the mobile host has moved to the foreign link.

11. The mobility host according to claim 7, wherein, in the case that the mobile host moves from a first foreign link in an area of a first mobility agent to a second foreign link in an area of a second mobility agent, the processor is configured to control the transmitter to transmit a signal indicating correspondence between home address of the mobility host and c/o address, and that operation mode of the mobile host is active, and requesting no packet buffering, to the first mobility agent, before the mobile host moves from the first foreign link, and control the transmitter to transmit a signal indicating a correspondence between home address of the mobile host and c/o address which is used in the second foreign link to which the mobile host moves, that operation mode of the mobile host is active, and that packet buffering is not necessary, to the first mobility agent, receiving a packet buffered in and sent from the first mobility agent in response to the notification, and control the transmitter to transmit a signal including correspondence between the home address and address of the second mobility agent to the home agent after the mobile host has moved to the second foreign link.

12. A method of controlling a mobile host which performs packet communication to a correspondent host, comprising:
   sending data representing an operation mode of the mobile host, either of an active mode or an idle mode, and data instructing whether packet buffering is requested for a packet to be received at the mobile host, to a mobility agent; and
   receiving a reception acknowledgement date of the data sent during sending.

13. A non-transitory medium configured to store a computer program executable by a computer, wherein the computer program is carried out by a method according to claim 12.

14. A mobile router for forwarding a packet of which a destination address is not an address of the mobile router, to another node, between a mobile network and a stationary network, or between mobile networks, comprising:
   a transmitter configured to send data representing an operation mode, either one of an active mode or an idle mode of the mobile router, and data instructing whether packet buffering is requested as to a packet to be received at the mobile router, to a mobility agent; and a receiver configured to receive a reception acknowledgement signal sent by the transmitter.

15. The mobile router according to claim 14, wherein the transmitter is configured to send a signal indicating correspondence between a home address of the mobile router and an address of the mobility agent which uses the mobile router, and correspondence between all sub-prefixes which the mobile network to which the mobile router belongs and c/o address of the mobile router to a home agent which the mobile router uses.

16. A method of controlling a mobile router for forwarding a packet of which a destination address is not an address of the mobile router, to another node, between a mobile network and a stationary network, or between stationary networks, comprising:

sending data representing an operation mode, either one of an active mode or an idle mode of the mobile router, and data instructing whether packet buffering is requested as to the packet to be received at the mobile router, to a mobility agent; and receiving a reception acknowledgement signal sent during sending.

17. The method of controlling a mobile router according to claim 16, further comprising:

when the mobile router receives a paging notification signal including a home address of the mobile router or subnet-prefixes which a mobile network to which the mobile router belongs to, during an idle mode of the mobile router, judging whether a received subnet-prefixes paging notification packet includes the subnet-prefixes which a mobile network to which the mobile router belongs to, when it is judged that the received subnet-prefixes paging notification packet includes the subnet-prefixes which a mobile network to which the mobile router belongs to, generating a subnet-prefixes binding update packet in which subnet-prefixes is set as all subnet-prefixes which the mobile network to which the mobile router belongs to, uses, forwarding destination address is set as c/o address which the mobile router uses in current foreign link, the operation mode of the mobile router is active, and packet buffering is not requested, and receiving a subnet-prefixes binding acknowledgment packet from the mobility agent, and when it is judged that the received subnet-prefixes paging notification packet does not includes the subnet-prefixes which a mobile network to which the mobile router belongs to, discarding the received subnet-prefixes paging notification packet.

18. The method of controlling a mobile router according to claim 16, further comprising in the case that the mobile router moves between foreign links in an area of a predetermined mobility agent, notifying correspondence between home address of the mobile router and c/o address, correspondence between all subnet-prefixes which a mobile network to which the mobile router belongs and c/o address of the mobile router, uses, that the operation mode of the mobile host is active and request for packet buffering as to a received packet, to a predetermined mobility agent before the mobile router moves to a foreign link, and notifying correspondence between home address of the mobile router and c/o address utilized in the foreign link to which the mobile router moves, in active mode of the mobile router, and no packet buffering, to the predetermined mobility agent after the mobile router has moved to the foreign link.

19. The method of controlling a mobile router according to claim 16, further comprising, in the case that the mobile router moves from a first foreign link in an area of a first mobility agent to a second foreign link in an area of a second mobility agent, notifying a signal representing correspondence between home address of the mobility router and c/o address which the mobile router uses in the first foreign network, correspondence between all subnet-prefixes of the mobile network to which the mobile router belongs and c/o address which the mobile router uses in the first foreign link, and that operation mode of the mobile host is active, and requesting packet buffering, to the first mobility agent, before the mobile router moves from the first foreign link, and notifying correspondence between home address of the mobile router and c/o address which is used in the second foreign link, correspondence between all subnet-prefixes of the mobile network to which the mobile router belongs and c/o address which the mobile router uses in the second foreign link, that operation mode of the mobile router is active, and that packet buffering of the packet is not requested, to the first mobility agent, receiving a packet buffered in and sent from the first mobility agent in response to the notification, and further sending a signal including correspondence between the home address of the mobile router and address of the second mobility agent, and correspondence between all subnet-prefixes and address of the second mobility agent, to the home agent after the mobile host has moved to the second foreign link.

20. A non-transitory medium configured to store a computer program executable by a computer, wherein the computer program is carried out by a method according to claim 16.

21. A packet communication system comprising a home agent for providing a home link for a mobile host, a plurality of access routers for providing foreign links for the mobile host, and a mobility agent including a plurality of access routers in an area thereof, in which a home address is used when the mobile host is present at the home link and in which the home address and a c/o address are used when the mobile host is present at a foreign link, wherein the mobile host comprises:

a transmitter configured to notify the mobility agent of a correspondence between the home address and the c/o address, an operating mode indicating either an active mode or an idle mode, and whether packet buffering is requested; and the transmitter configured to notify the home agent of a correspondence between the home address and an address of the mobility agent, wherein the home agent comprises:

a transmitter configured of forward a packet directed to the home address, received from a correspondent host, to the address of the mobility agent notified of by the mobile host, wherein the correspondent host comprises a transmitter configured to send a packet directed to the home address, to the address of the mobility agent notified of by the mobile host, wherein the mobility agent comprises:

a transmitter configured to forward a packet received from the home agent or the correspondent host, to the mobile host;

a buffer configured to buffer a packet; and the transmitter configured to notify the mobile host of arrival of a packet, wherein the mobility agent is configured so that in the active mode and without necessity for packet buffering, the mobility agent forwards a packet received from the home agent or the correspondent host, to the mobile host, so that in the active mode and with necessity for packet buffering, the mobility agent buffers a packet, and so that in the idle mode the mobility agent buffers a packet and notifies the mobile host of arrival of the packet.

* * * * *

UNITED STATES PATENT AND TRADEMARK OFFICE
CERTIFICATE OF CORRECTION

PATENT NO. : 7,881,250 B2  
APPLICATION NO. : 10/466518  
DATED : February 1, 2011  
INVENTOR(S) : Ichiro Okajima et al.

Page 1 of 1

It is certified that error appears in the above-identified patent and that said Letters Patent is hereby corrected as shown below:

On the title page, Item (86), the PCT information is incorrect. Item (86) should read:

-- (86) PCT No.:     PCT/JP02/00350

§ 371 (c)(1),  
    (2), (4) Date:     Jan. 8, 2004 --

Signed and Sealed this  
Tenth Day of May, 2011

David J. Kappos  
*Director of the United States Patent and Trademark Office*